No. 713,497. Patented Nov. 11, 1902.
H. A. ROWLAND, Dec'd.
H. H. ROWLAND, Administratrix.
TELEGRAPHY.
(Application filed June 4, 1900.)
(No Model.) 19 Sheets—Sheet 1.
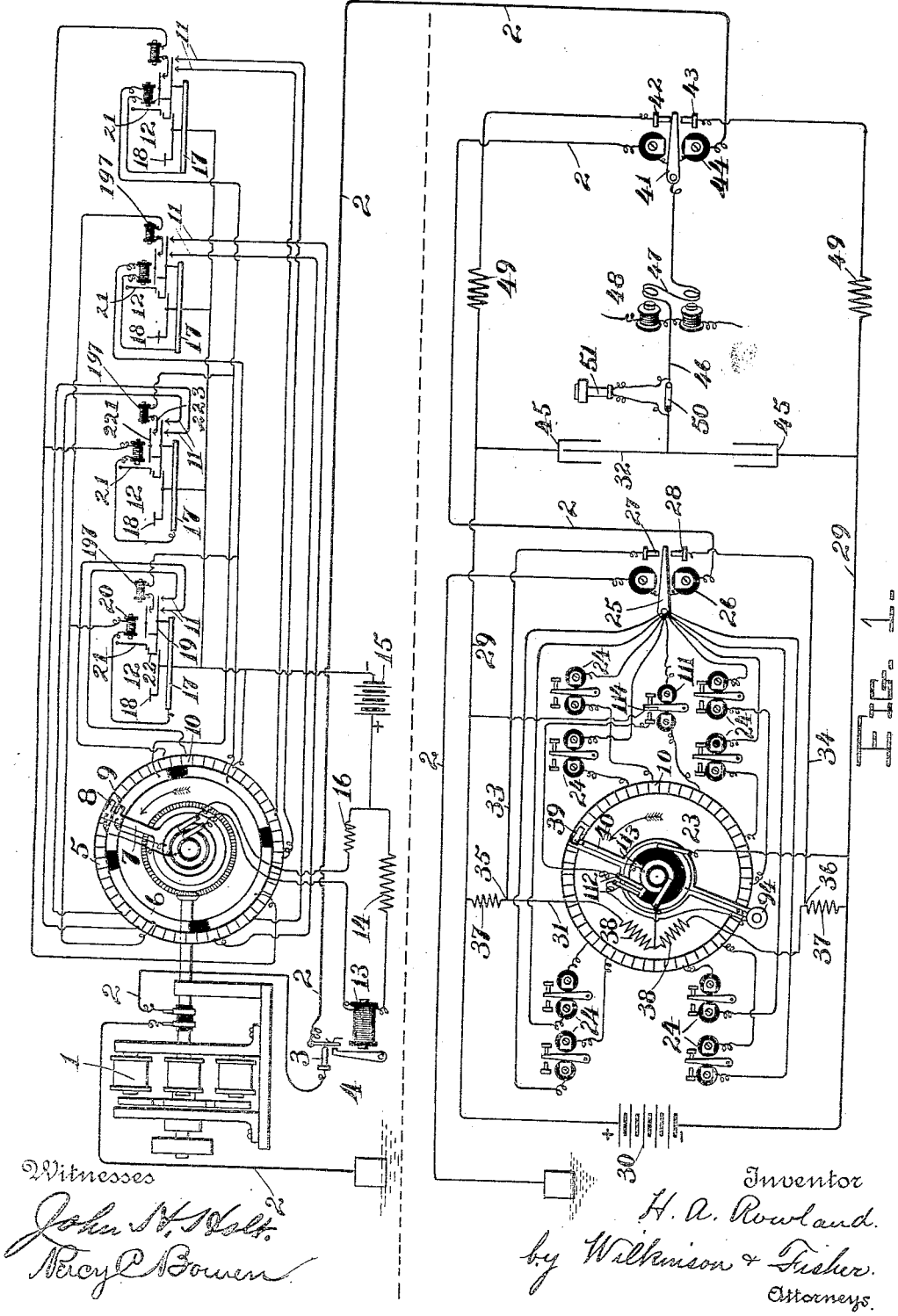
Witnesses
John N. Holt
Percy C. Bowen
Inventor
H. A. Rowland
by Wilkinson & Fisher
Attorneys

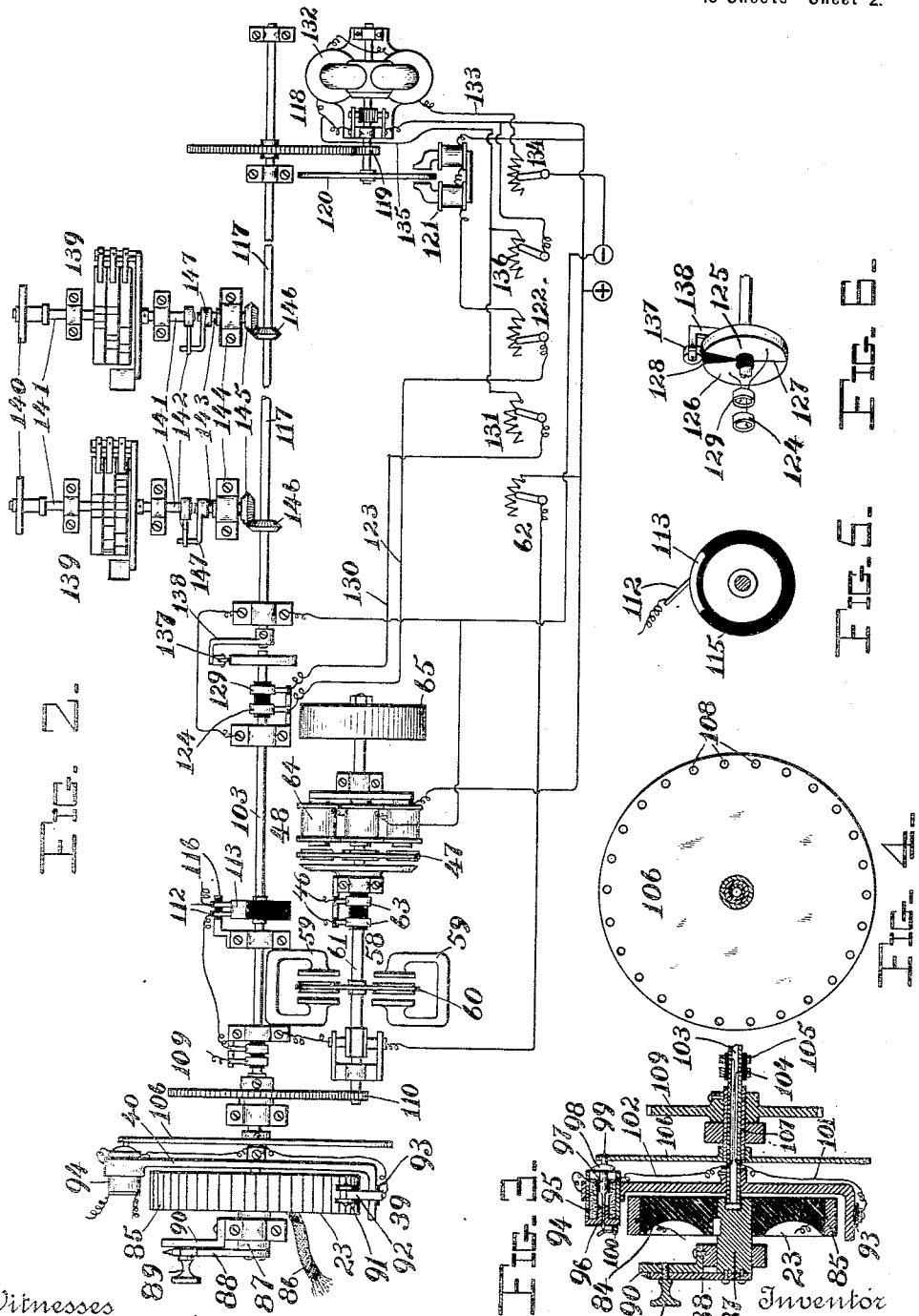

No. 713,497. Patented Nov. 11, 1902.
H. A. ROWLAND, Dec'd.
H. H. ROWLAND, Administratrix.
TELEGRAPHY.
(Application filed June 4, 1900.)
(No Model.) 19 Sheets—Sheet 3.
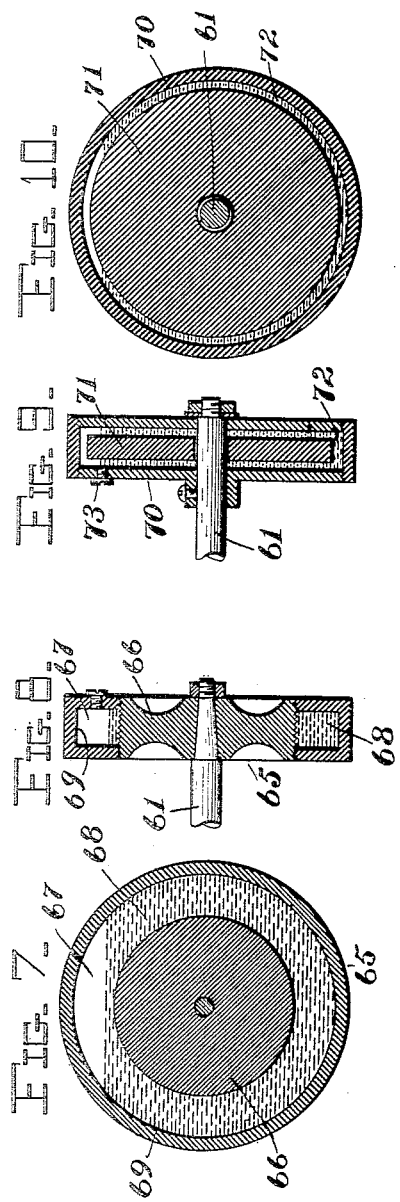
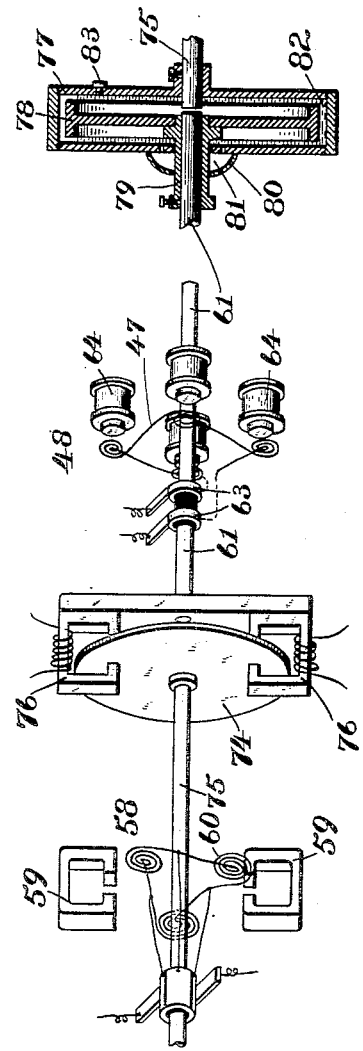
Witnesses
John H. Holt
Percy C. Bowen
Inventor
H. A. Rowland.
by Wilkinson & Fisher.
Attorneys.

No. 713,497. Patented Nov. 11, 1902.
H. A. ROWLAND, Dec'd.
H. H. ROWLAND, Administratrix.
TELEGRAPHY.
(Application filed June 4, 1900.)
(No Model.) 19 Sheets—Sheet 4.
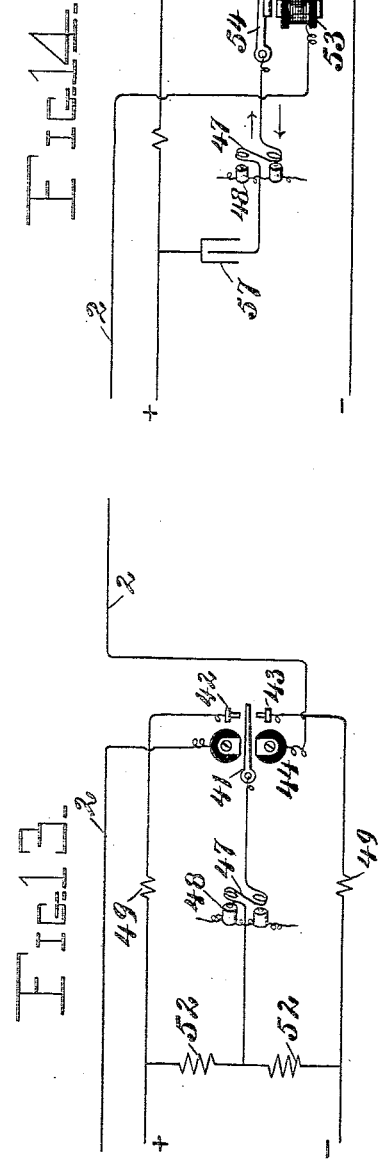
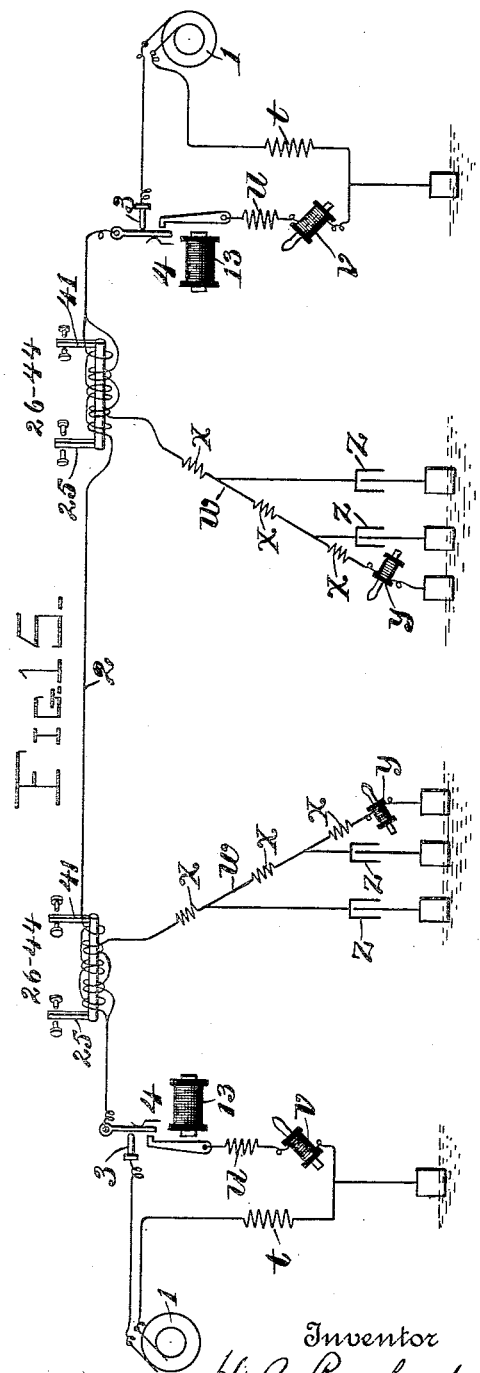
Witnesses
John H. Holt.
Percy C. Bowen.
Inventor
H. A. Rowland.
by Wilkinson & Fisher
Attorneys.

No. 713,497.  
H. A. ROWLAND, Dec'd.  
H. H. ROWLAND, Administratrix.  
TELEGRAPHY.  
(Application filed June 4, 1900.)  
Patented Nov. 11, 1902.
(No Model.)  
19 Sheets—Sheet 5.
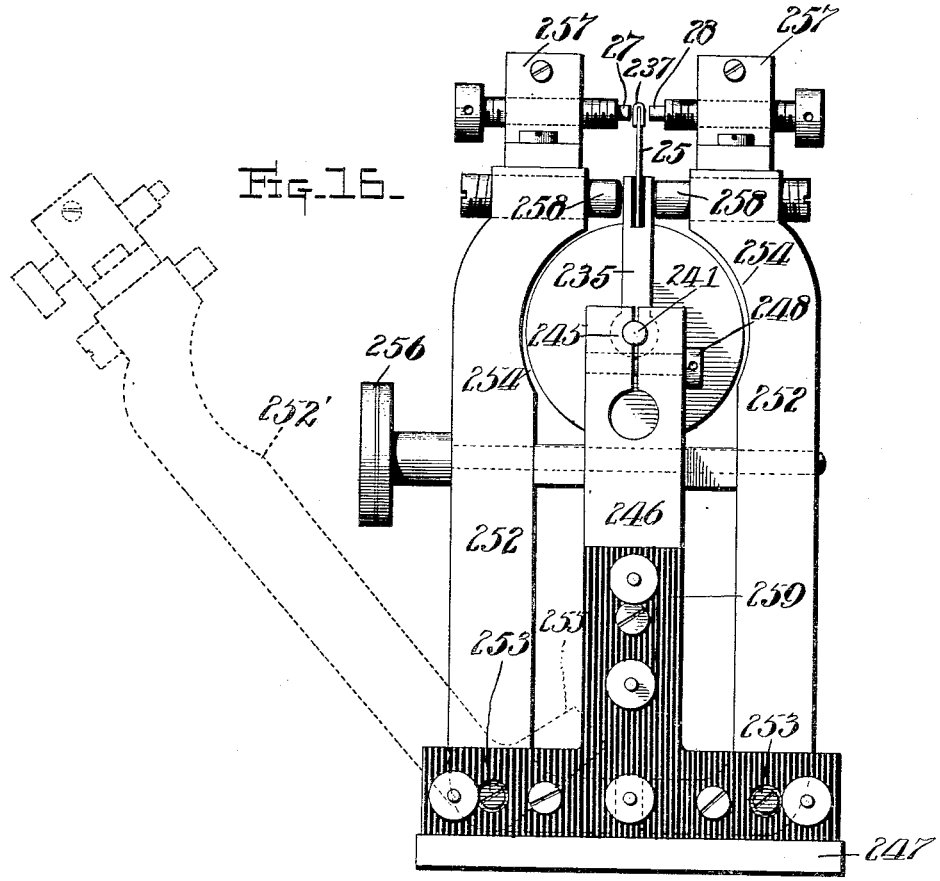
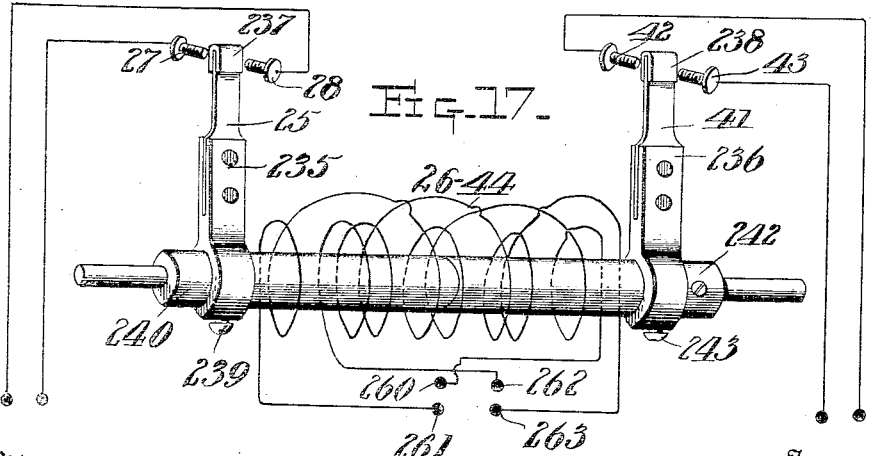
Witnesses  
L. C. Hills  
John N. Holt
Inventor  
H. A. Rowland.  
by Wilkinson & Fisher  
Attorneys.

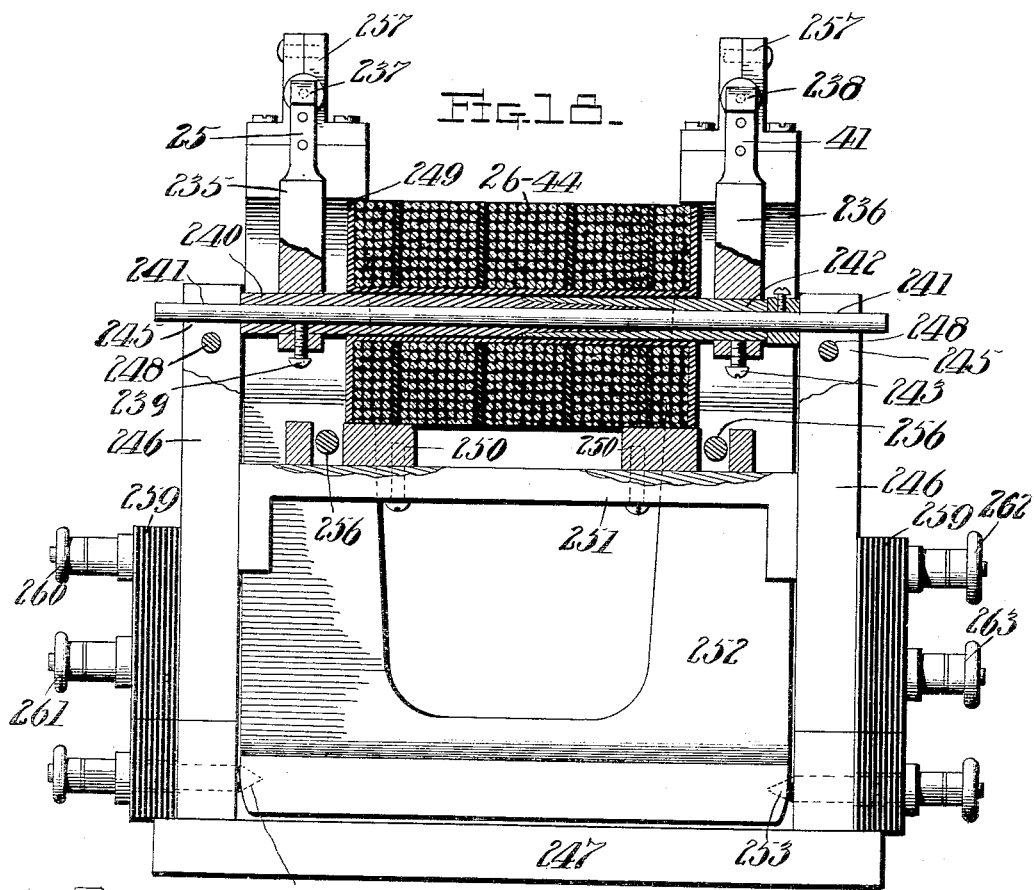
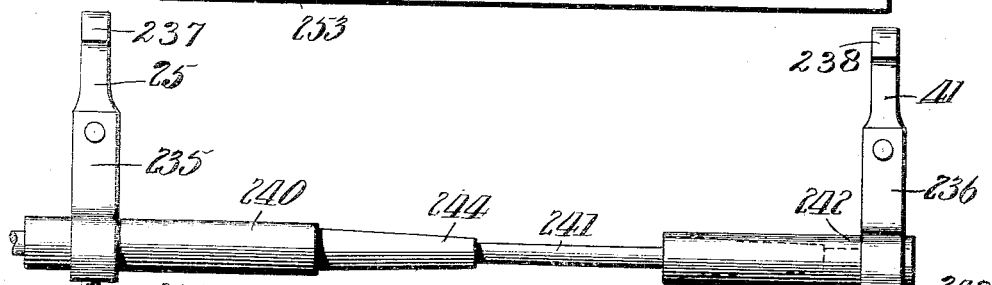

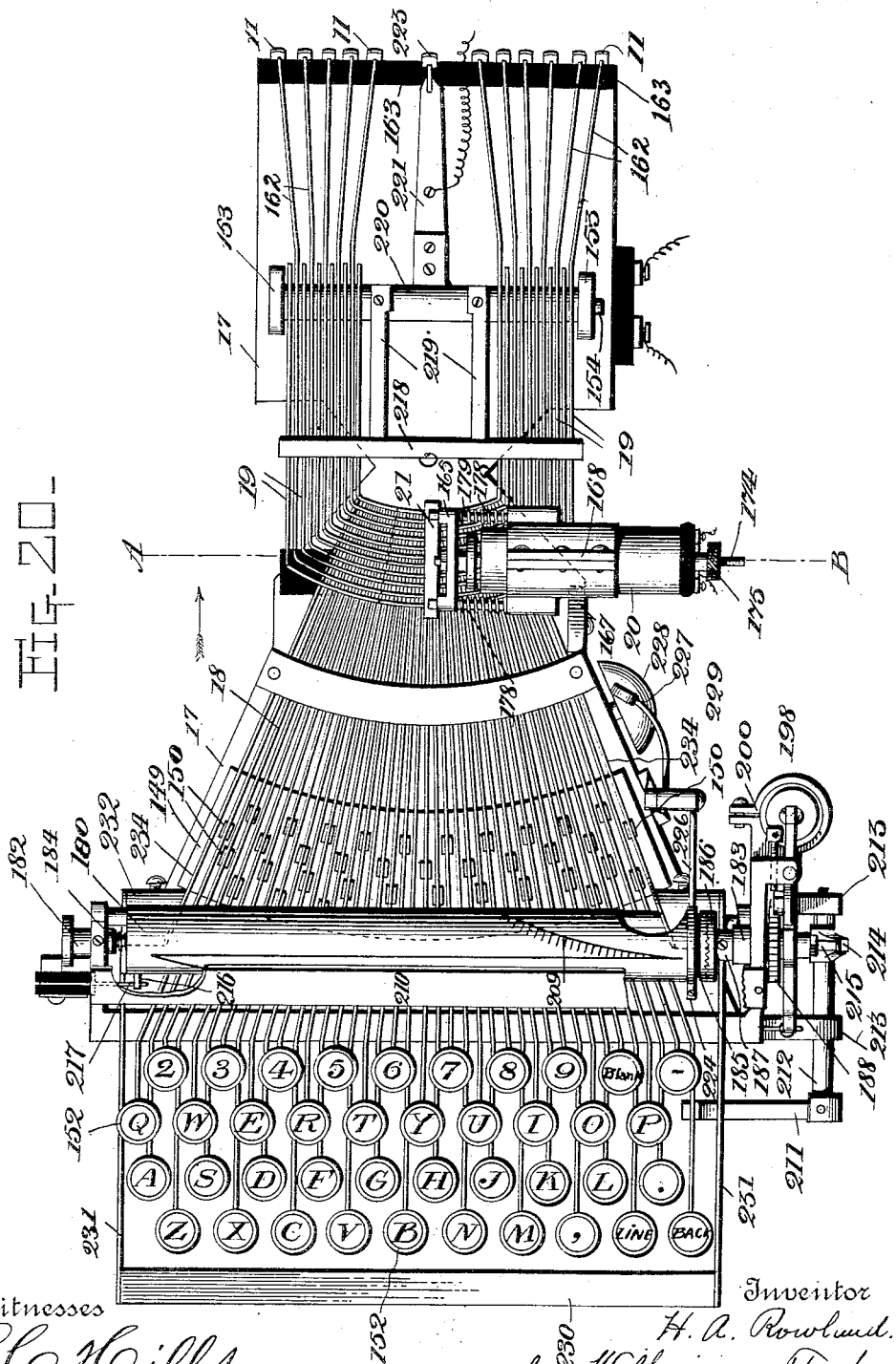

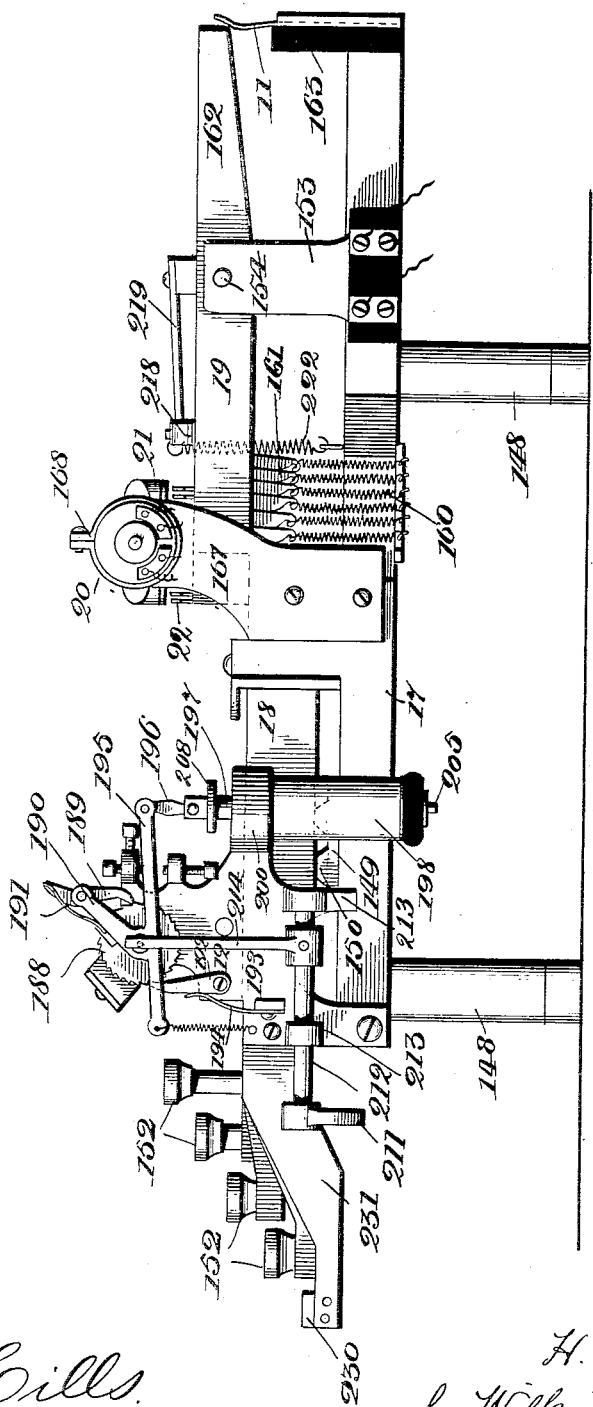

No. 713,497. Patented Nov. 11, 1902.
H. A. ROWLAND, Dec'd.
H. H. ROWLAND, Administratrix.
TELEGRAPHY.
(Application filed June 4, 1900.)
(No Model.) 19 Sheets—Sheet 9.
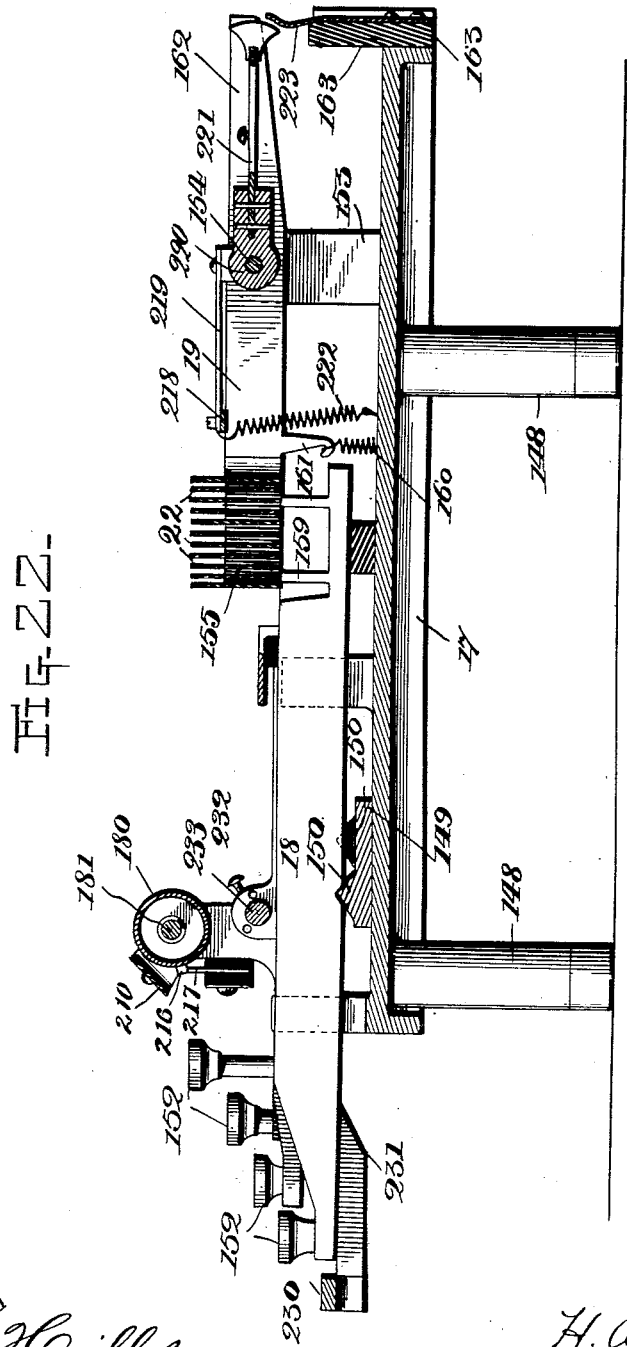

No. 713,497. Patented Nov. 11, 1902.
H. A. ROWLAND, Dec'd.
H. H. ROWLAND, Administratrix.
TELEGRAPHY.
(Application filed June 4, 1900.)
(No Model.) 19 Sheets—Sheet 10.
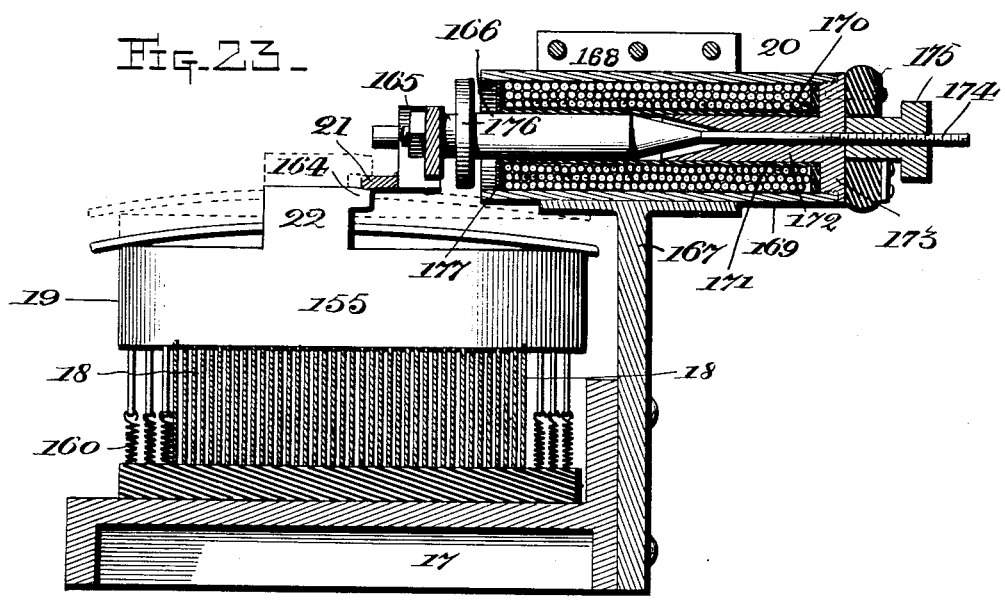
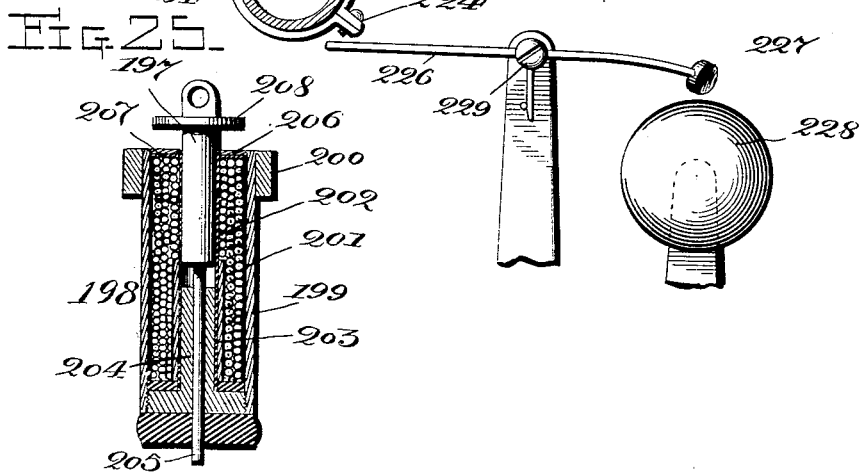
Witnesses
L. C. Hills.
John H. Holt.
Inventor
H. A. Rowland.
by Wilkinson & Fisher
Attorneys.

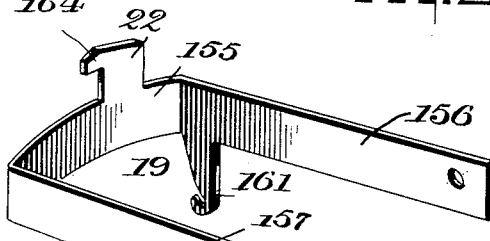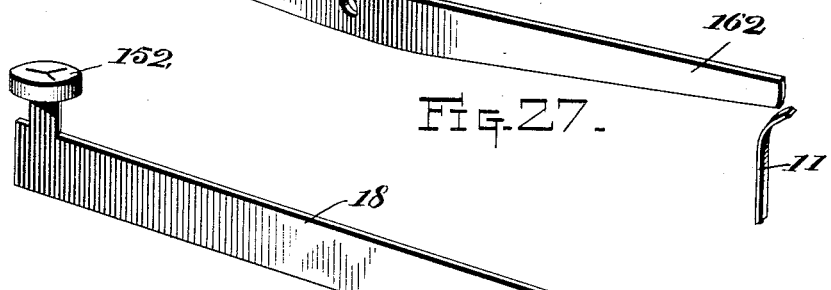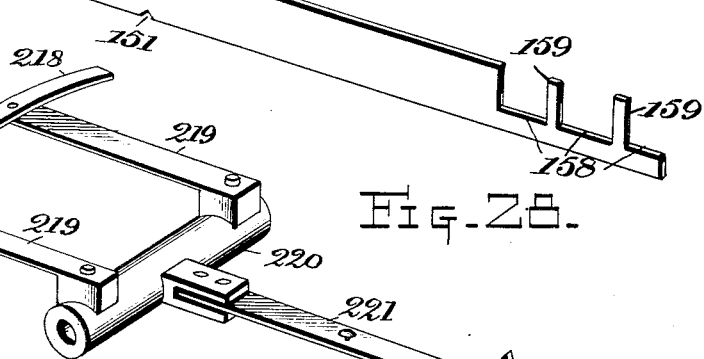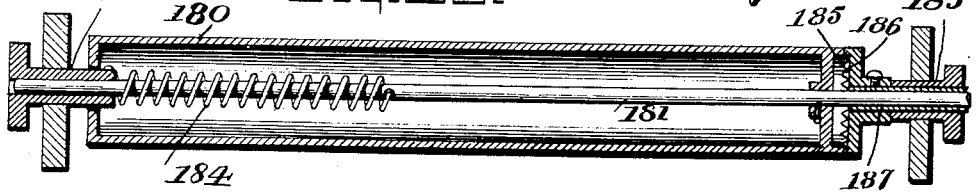

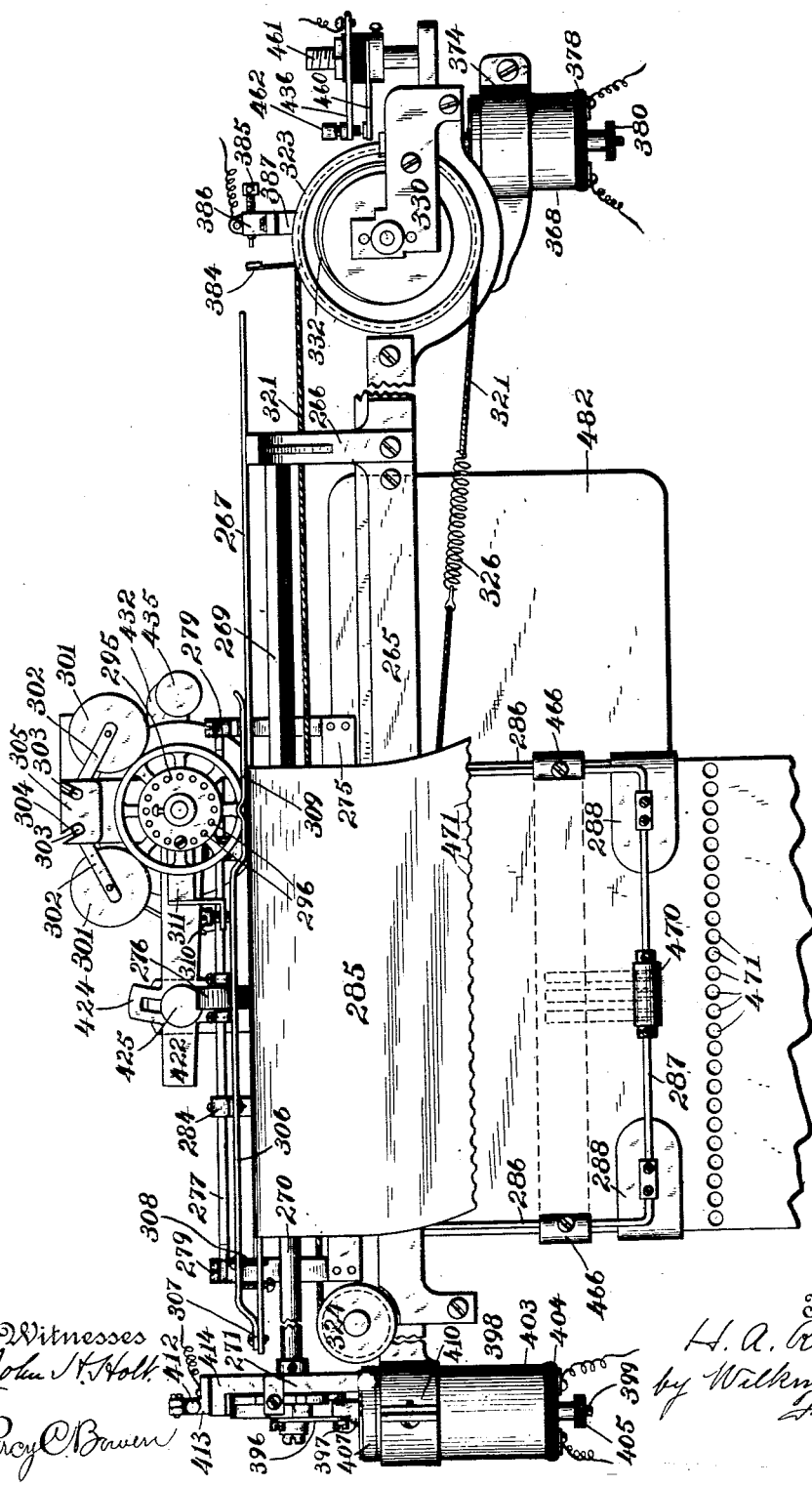

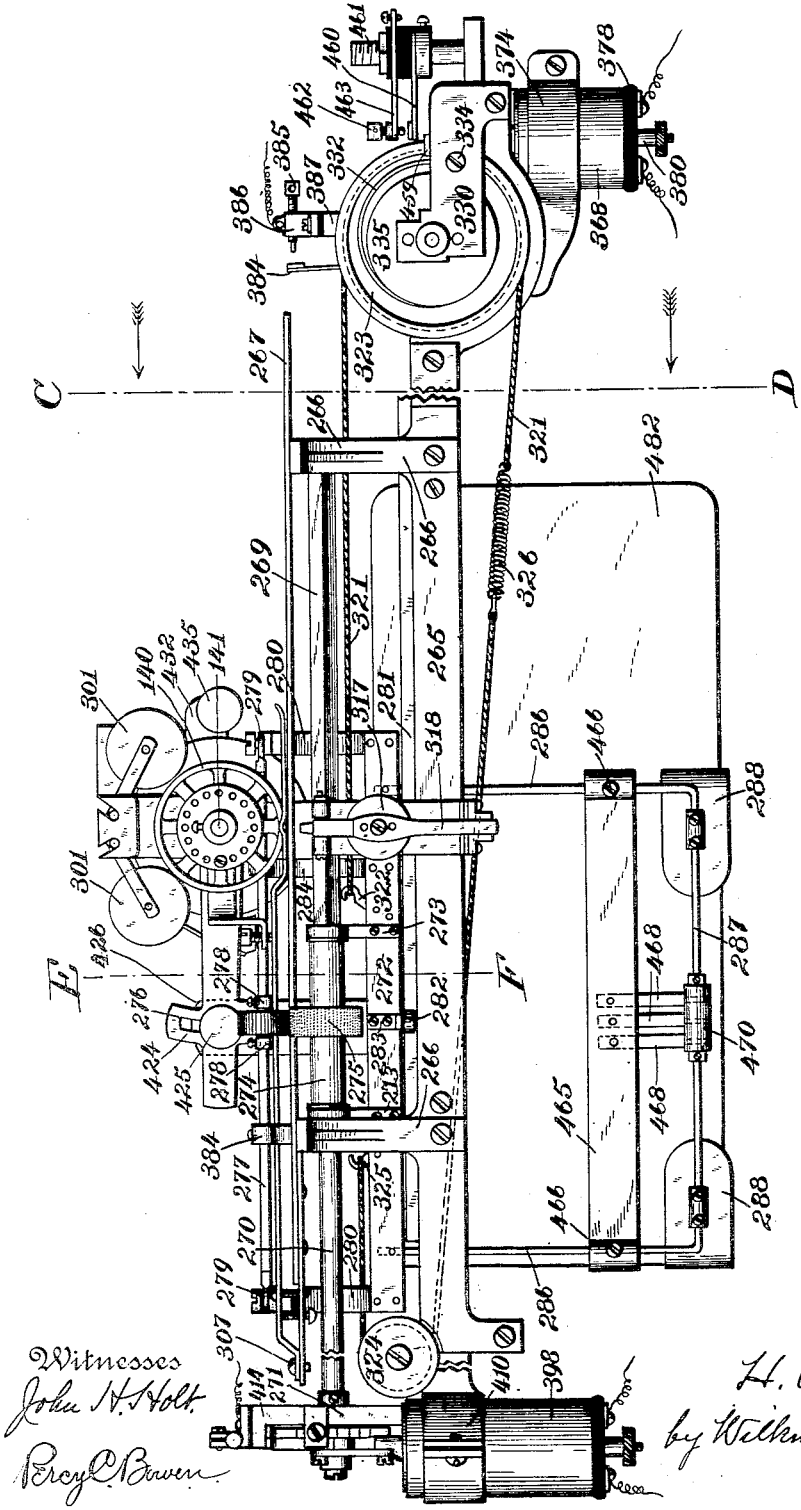

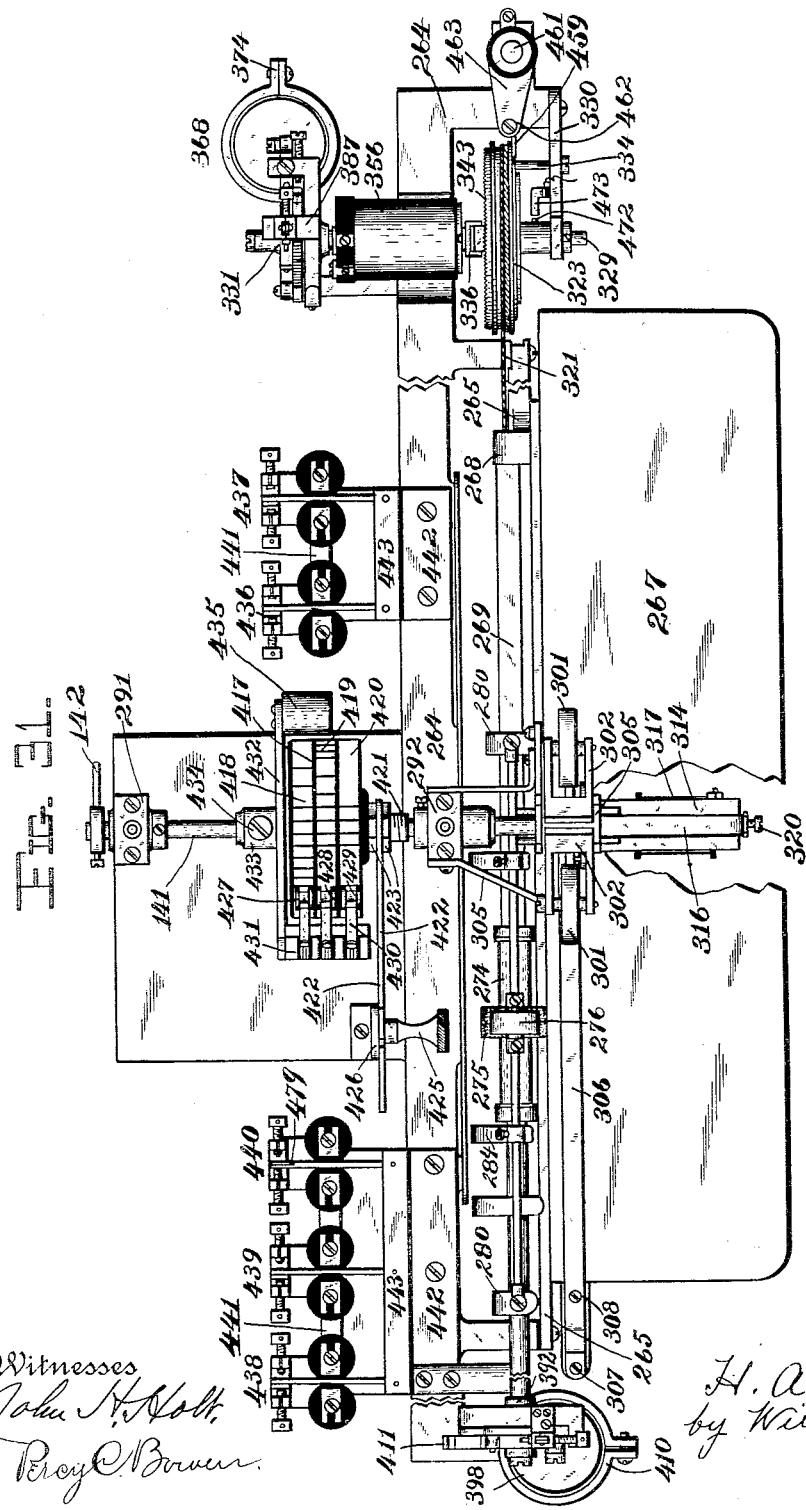

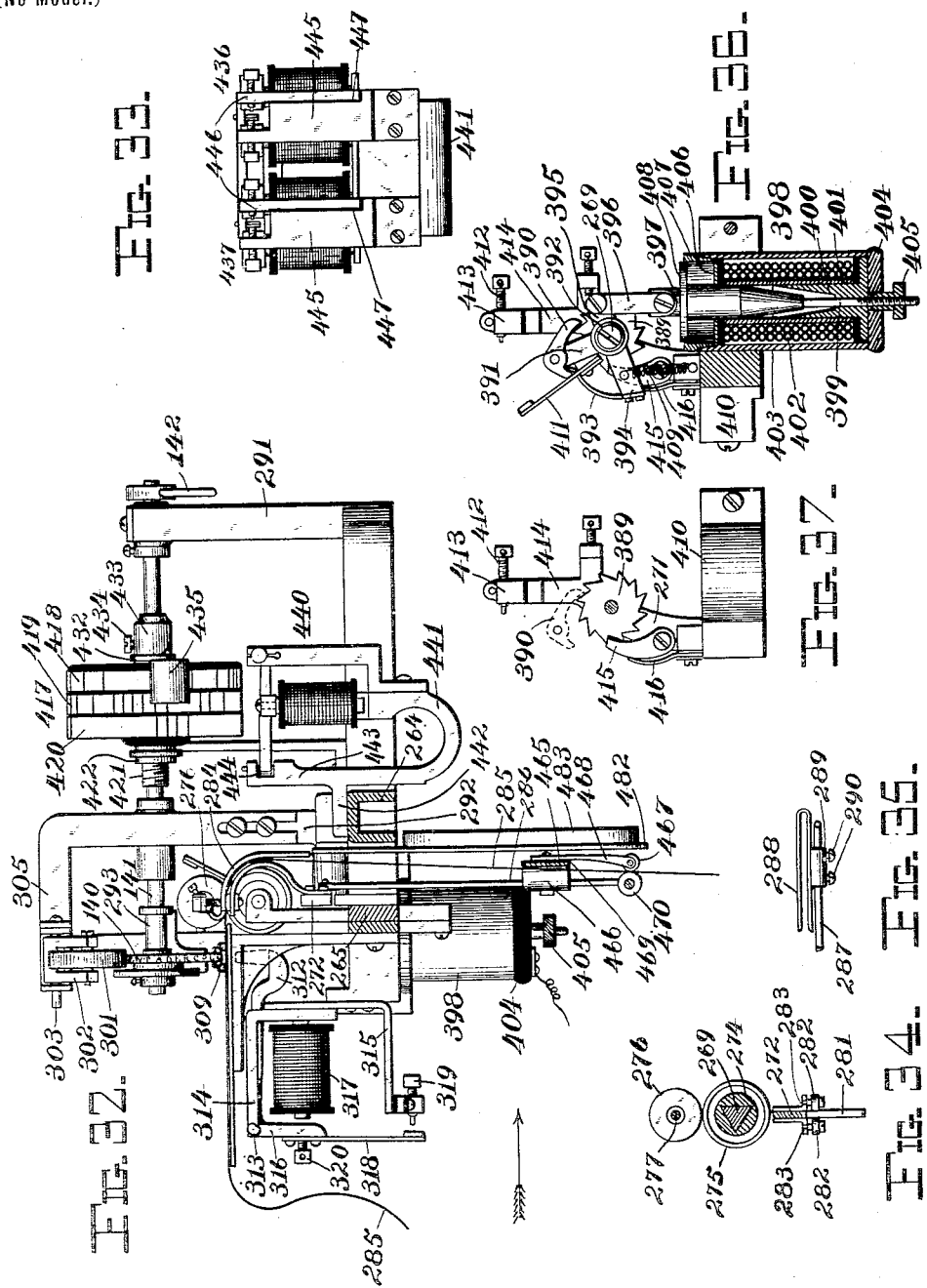

No. 713,497.  
H. A. ROWLAND, Dec'd.  
H. H. ROWLAND, Administratrix.  
TELEGRAPHY.  
(Application filed June 4, 1900.)  
Patented Nov. 11, 1902.  
(No Model.)  
19 Sheets—Sheet 16.
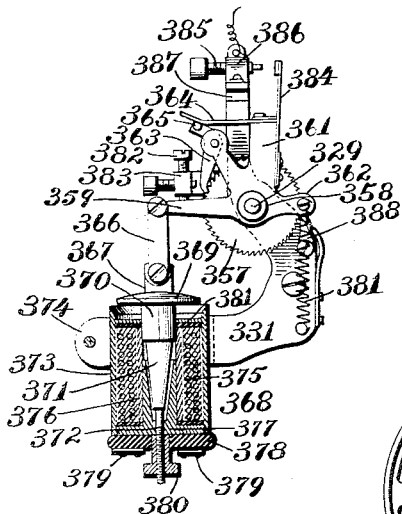
FIG. 38.
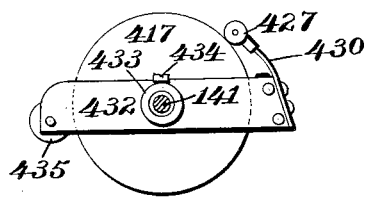
FIG. 39.
FIG. 41.
FIG. 40.
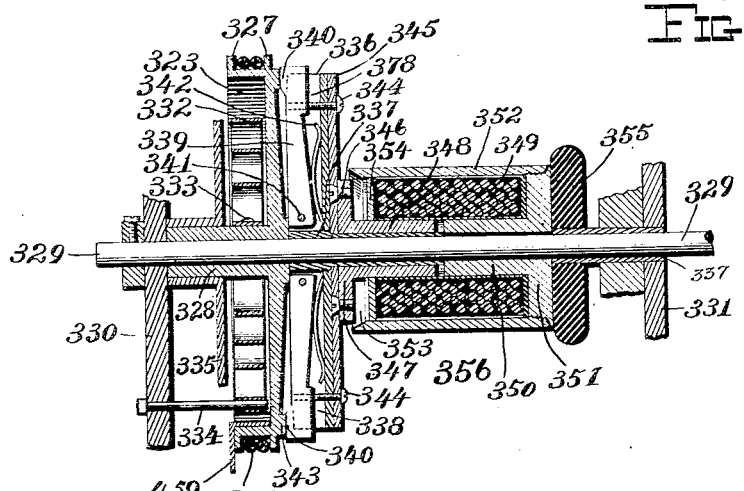
FIG. 42.
Witnesses  
L. C. Hills  
John N. Holt
Inventor  
H. A. Rowland  
by Wilkinson & Fisher  
Attorneys No. 713,497.  
H. A. ROWLAND, Dec'd.  
H. H. ROWLAND, Administratrix.  
TELEGRAPHY.  
(Application filed June 4, 1900.)  
Patented Nov. 11, 1902.
(No Model.) 19 Sheets—Sheet 17.
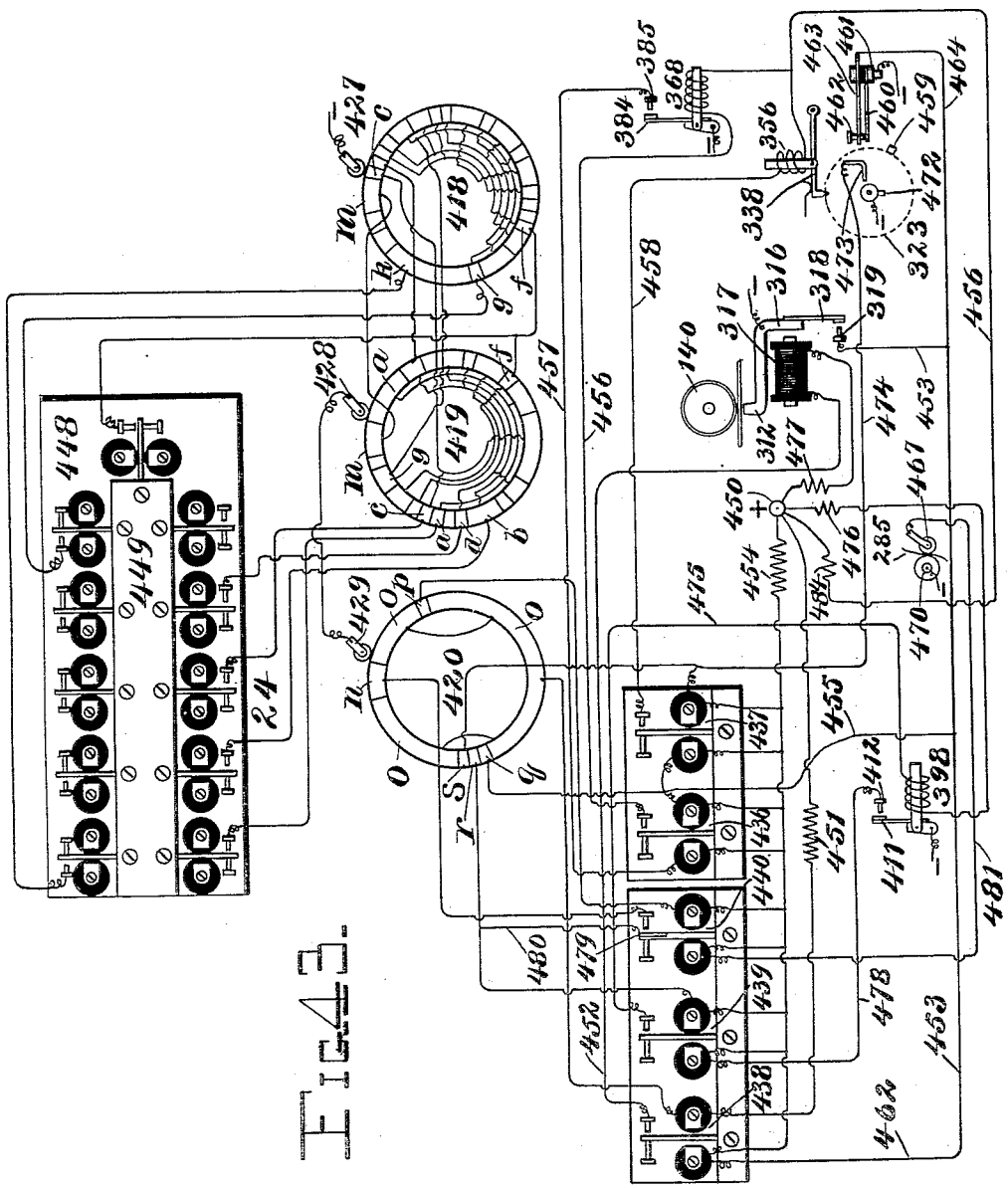
Witnesses  
John N. Holt.  
Percy C. Bowen.
Inventor  
H. A. Rowland.  
by Wilkinson & Fisher,  
Attorneys.

No. 713,497. Patented Nov. 11, 1902.
H. A. ROWLAND, Dec'd.
H. H. ROWLAND, Administratrix.
TELEGRAPHY.
(Application filed June 4, 1900.)
(No Model.) 19 Sheets—Sheet 18.
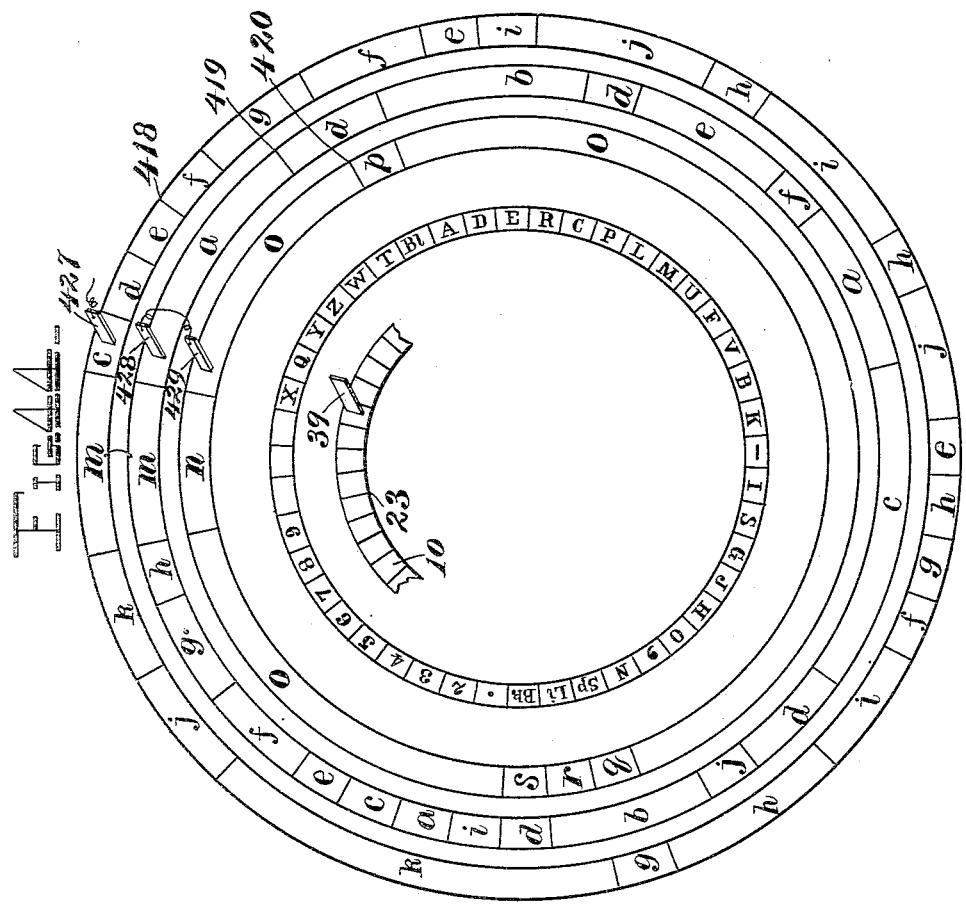

No. 713,497.　　　　H. A. ROWLAND, Dec'd.　　　Patented Nov. 11, 1902.
H. H. ROWLAND, Administratrix.
TELEGRAPHY.
(No Model.)　　　(Application filed June 4, 1900.)　　　19 Sheets—Sheet 19.
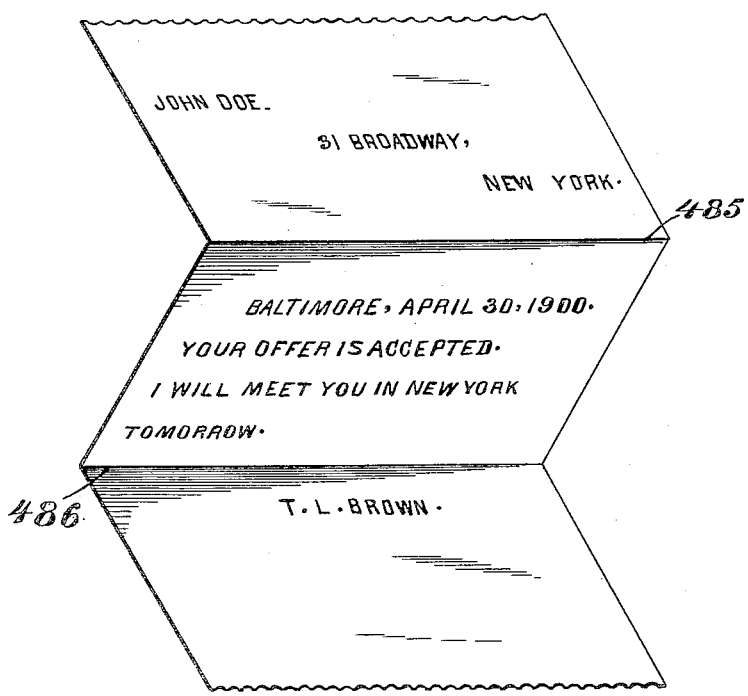
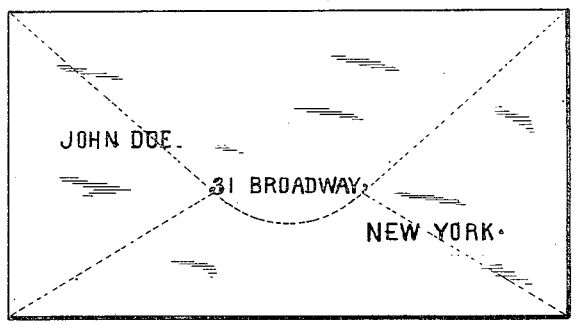

UNITED STATES PATENT OFFICE.

HENRY A. ROWLAND, OF BALTIMORE, MARYLAND; HENRIETTA H. ROWLAND ADMINISTRATRIX OF SAID HENRY A. ROWLAND, DECEASED.

TELEGRAPHY.

SPECIFICATION forming part of Letters Patent No. 713,497, dated November 11, 1902.

Application filed June 4, 1900. Serial No. 19,070. (No model.)

*To all whom it may concern:*

Be it known that I, HENRY A. ROWLAND, a citizen of the United States, residing at Baltimore city, in the State of Maryland, have invented certain new and useful Improvements in Telegraphy; and I do hereby declare the following to be a full, clear, and exact description of the invention, such as will enable others skilled in the art to which it appertains to make and use the same.

This invention relates to improvements in electric telegraphs, and more especially to that class of telegraphs known as "synchronous multiplex printing-telegraphs," in which a number of messages may be sent over a single line simultaneously and automatically printed in typographical characters.

The principal objects of this invention are, first, to increase the capacity of telegraph-lines by enabling one line-wire to do the work of a large number of wires; second, to facilitate telegraphic communication generally by simplifying the work of the transmitting operator and supplanting the receiving operator entirely by a machine which will automatically record the messages in printed characters and in page form; third, to render possible the transmission of telegraphic messages long distances without relaying them, and, fourth, to produce a telegraph system of the class above referred to in which there is no decrease in speed by increasing the length of the line, all of which, together with other objects hereinafter referred to, the said invention is designed to accomplish in a commercially practicable manner.

To these ends the said invention embodies a system of telegraphy in which the messages are transmitted by impressing an electromotive force rising and falling in value upon a main-line wire and cutting out or otherwise modifying a preselected number and combination of the wave impulses of the current produced by said electromotive force for each character and locating at the receiving-points printers adapted to print the characters represented by the combination of suppressed and unsuppressed line-current impulses. A single main line carrying this signaling-current is made to accommodate a number of messages simultaneously by locating at the different stations synchronously-operating current-distributing apparatus, by which each of a series of local transmitting and receiving instruments is given the use of the main line at regularly-recurring brief periods of time.

In order to maintain the current-distributing devices above referred to as well as other devices in synchronism, this invention embodies a novel system of producing synchronous motion, and though it is herein shown applied specifically, as above mentioned, it is indeed capable of much broader application.

This invention also embodies in connection with the above synchrouous system a system of circuits and connections such that the synchronism of the apparatus remains uninterrupted, notwithstanding the frequent and repeated interruptions of the main-line signaling-current.

In addition to the features above referred to this invention comprises, among other things, an improved form of keyboard for transmitting the messages as described; a damper for damping any motion of an oscillating nature, but here specifically used in conjunction with the synchronizing mechanism; an improvement in the duplexing of a line which adapts it to the system herein described; circuit combining and distributing apparatus operated in conjunction with the printer, and, indeed, many other accessories necessary to the completion of a commercially practicable form of multiplex synchronous telegraph designed to increase the capacity of telegraph-lines and reduce the cost of maintaining the same.

In carrying out this invention the line signaling-current that has been found preferable is the gradually-varying or approximately sine-wave alternating current such as produced by the commercial alternating-current generator, though this invention is not limited to this or any other form of alternating or pulsating current. Thus, for example, such a current as that produced by the Wheatstone transmitter or vibrating current-changer of any desired description may be used, and in any case the current may be derived either directly from the generator or from some secondary source, such as a transformer. It will be assumed, however, for the purpose of the following description that the line signaling-current is produced by an electromotive force of the sine-wave or approximately sine-wave form above referred to.

According to this invention the generator delivers the alternating current to a single main line, and the requisite amount of current is suppressed for any desired character or signal at each transmitting-point by means of a circuit making and breaking device, which will be designated the "transmitter," being essentially a neutral relay, having the main-line circuit normally completed through one of its tongue contacts. This transmitter is operated by local keyboard-circuits, controlled by what is known in this art as a "sunflower" or "current-distributer," comprising a ring having, for example, fifty-two metallic segments and a trailer sweeping over and in contact with them. The segments of this sunflower are divided into a number of groups, and those of each group are connected to a separate keyboard, by which the segment-circuits of any group may be completed through the transmitter-coil circuit at such times as the trailer is passing over that particular group, the trailer being electrically connected to the transmitter-coil. This trailer is driven in synchronism with the alternating-current generator either by being mechanically geared to it or by having its motion governed by the "synchronizer" above referred to.

Each keyboard comprises a plurality of keys, each key of which represents a character or signal, and by operating these keys two sunflower-segments of the group connected to the keyboard operated upon will be partially connected to the transmitter-coil circuit for each individual key operated and will be entirely connected therewith successively as the trailer sweeps over them. This causes the transmitter to break the line contact for the length of time that the trailer is in actual contact with the segments connected to the transmitter, and this will suppress two impulses of the line-current, and thus transmit to a receiving-station the signal which the suppressed impulses represent.

The individual keys of each keyboard are so arranged that each when operated connects in the transmitter-circuit two different segments of the sunflower of the group connected to that keyboard, but not two adjacent segments with the form of apparatus herein shown, for reasons which will hereinafter appear, so that out of a group of eleven impulses or semicycles it is possible to transmit forty-five signals, and as the separate keyboards are connected to independent groups of sunflower-segments and as each is active at such times only as the trailer is passing over a particular group the operators in no way interfere with each other, though all are sending together. Then by a system of duplexing, which forms a part of this invention, these four operators may send messages to any desired point while four operators at that station are sending messages over the same wire in the opposite direction simultaneously, thus multiplexing the system in such a way as to render it possible to make one line conductor carry at one time the messages of eight individual operators. This number of separate messages may be increased or diminished, as will hereinafter appear, the unit of four messages being taken for the purpose of illustration. From what has been said above it may be considered that the line-current is divided into groups of impulses which pass the transmitter respectively as their corresponding groups of sunflower-segments are swept over by the trailer.

At the receiving-station is located a main-line relay of peculiar construction, being essentially a polarized relay having two independently or semi-independently movable tongues operated by the same exciting coil or coils, the said coil or coils being connected in the main-line circuit. One of these line-relay tongues vibrating in unison with the main-line current is connected by resistances and condensers to a local source of continuous current and is made to produce a local synchronizing-current, by which this synchronizer is operated. The function of this synchronizer is, among other things, to keep in synchronism with the transmitting-sunflower trailer a receiving-sunflower trailer, which sweeps over a sunflower having the same number of segments as the transmitting-sunflower and divided into corresponding groups. The synchronizer further governs the speed of all mechanism which at any station operates the printers.

The segments of each group of the receiving-sunflower segments are separately connected to the coils of as many polarized selecting-relays and thence to one of the tongues of the receiving line-relay. The line-relay contacts between which this tongue vibrates and the receiving-trailer are connected through proper resistances to a source of continuous current, so that as the line-relay tongue is vibrated by the line-current an electric impulse will be sent through each of the selecting-relays successively as the trailer passes over the sunflower-segments, a plus impulse passing through one segment and selecting-relay, a negative impulse through the next, a plus impulse through the next, and so on through the series. The impulses of the local current distributed as described do not, however, operate these selecting-relays in such a way as to cause them to close or partly close the local printer-circuits, it being only when this distribution of the current is interrupted that any one of the relays so acts. When, however, the impulses of the line-current are suppressed at the transmitter, as when sending a signal, this interrupts the vibration of the receiving-line-relay tongue connected to the selecting-relays and will send an impulse of the opposite polarity to the normal impulse through that one of the selecting-relays which is connected to the sunflower-segment corresponding to the segment of the transmitting-sunflower which was operated upon at the keyboard, causing the tongue of the selecting-relay receiving the reversed impulse to partially complete a local printer-circuit, and, as was seen from the description of the transmitter, two semicircles of the line-current were suppressed for each signal or character, two of the selecting-relays will be acted upon in a manner similar to that above described for each signal.

The tongues of the local selecting-relays are brought back to the initial position by the normal impulses of the local current—that is, by the impulses that follow the reversed impulses—thus rendering unnecessary the employment of an extra current or device for accomplishing this result. One of the tongue-contacts of each separate relay of each group of these selecting-relays is connected to a corresponding circuit-combining device, which is in turn so connected to an electromagnet which operates the hammer of the printer corresponding to any particular group that as the selecting-relays of any group are operated, as above described, the circuit-combining device corresponding to that group will cause the printer to print the character transmitted. By this arrangement the messages sent by the operator sending on the keyboard connected to group number one of the transmitting-sunflower segments will be received and printed by the printer connected to the selecting-relays operated by group number one of the receiving-sunflower segments, as the trailer of the transmitting and receiving sunflowers move in synchronism, the sunflowers being so constructed that they may be adjusted until the segments of the receiving-sunflower correspond to the exact position of those of the sunflower of the transmitter.

The synchronizer by which the current distributing apparatus at any station is kept in unison with that at any other station comprises a series of movable coils transversed by a synchronizing-current and moving in a magnetic field, being normally driven by a continuous-current motor or other independent motive power which also drives the current-distributer or sunflower-trailer. These coils traversed by the synchronizing-current and moving in a magnetic field constitute a small alternating-current synchronous motor-generator which so long as its motion is in phase with the line-current will neither do nor absorb work; but should the driving-motor have a tendency to get out of step the synchronizer will prevent this, thus maintaining the driving-motor in unison with the line-current. In order to further damp any possible oscillations of the synchronizer and motor, a viscous damper is preferably mounted on the shaft with the synchronizer, and comprises one body fixed to the shaft and a second body connected to the first through a viscous medium, several specific forms of which damper are herein shown.

The main-line current may be made to pass directly through the coils of the synchronizer, and thus act directly as the synchronizing-current; but it has been found preferable to employ a local synchronizing-current. By means of a novel arrangement of circuits, resistances, and condensers it is possible to produce from a source of continuous current, such as from the Edison one-hundred-and-ten-volt circuit or other source, a local synchronizing-current which will be in phase with the line alternating current and which will maintain synchronism regardless of the interruptions in the main-line current, all of which will be hereinafter described in greater detail.

By connecting a telephone-receiver in the synchronizer-circuit, as herein shown, it may be readily determined whether perfect synchronism is maintained or not. If the instruments are in phase—that is, if perfect synchronism is being maintained—the telephone-receiver emits a uniformly-pulsating sound; but if the synchronism is disturbed the regularity of the pulsations of the sound will disappear, which will at once indicate the trouble.

The printer upon which the messages are received embodies a machine by which the messages may be automatically printed in any typographical characters in page form. The paper upon which the messages are printed may be delivered to the printer-carriage either from a roll, in single sheets, or in any convenient manner. The characters are printed by an electrically-operated printing hammer or platen, which is caused to strike the paper and bring it in contact with the proper character on the type-wheel for each combination of signals received. The printer-circuits are combined in order to accomplish this as well as to actuate the spacer, liner, and other electrical devices of the printer by means of circuit-combining devices forming a part of the present invention and which will be hereinafter more fully described. The printer-carriage, actuated by suitable spacing mechanism, moves the paper step by step under a continuously-rotating type-wheel until the end of a line is reached, when by the operation of a proper lining mechanism the paper is fed up, a new line is formed, and the carriage is returned to its original position, though the carriage may be caused to reverse its motion or return to its original position at any desired point in its travel. An important feature of this printer is the construction of the carriage and the paper-guiding devices attached thereto, by which the paper is held straight, insuring thereby a good alinement of the printed characters. Moreover, the lightness of the carriage enables it to be moved with much greater speed than has hitherto been possible with carriages of this general class of printers.

When the paper is fed to the printer from a roll or in long sheets, the paper is perforated transversely at intervals, so that it may be easily torn apart into separate sheets as the messages are printed upon them, and when this form of paper is used the printer carries a novel attachment whereby when the required number of lines have been printed upon any sheet or space between two rows of perforations the paper will be automatically fed up until the sheet having the printed message upon it is in a position to be torn off and the next succeeding blank sheet is in a position to receive the printed characters.

This invention, moreover, embodies many other novel features and combinations of parts, hereinafter more particularly described, and in order that the same may be more clearly understood it will be described in detail, having reference to the accompanying drawings, which form a part of this specification, and in which similar letters and numerals of reference will be employed to indicate the same parts throughout the several views.

Figure 1 is a diagram representing the principle of transmitting and receiving messages according to this invention. Fig. 2 is a semi-diagrammatic top plan view showing some of the apparatus at a receiving-station, the electric circuits of the same, and the mode of driving the receiving apparatus and maintaining the same in synchronism with that at a transmitting-station. Fig. 3 is a vertical central section of the receiving sunflower and trailer, the misplaced letter-finder carried thereby, and the gearing by which the trailer is driven. Fig. 4 represents in front elevation the disk by which the receiving-trailer is driven. Fig. 5 represents in detail a side elevation of the rotating contact-maker operated in connection with the misplaced letter-finder. Fig. 6 is a detail perspective view of the rotating contact-maker for regulating the speed of the printer driving-motor by which the said motor is kept in synchronism with the rest of the apparatus. Fig. 7 represents a central vertical section of a mercury viscous damper for damping the oscillations of motion. Fig. 8 represents a central vertical section of the same, taken through a plane at ninety degrees from that through which the section Fig. 7 is taken. Fig. 9 represents a vertical central section of another form of damper. Fig. 10 represents a vertical section of same, taken through a plane at ninety degrees to that through which the section Fig. 9 is taken. Fig. 11 represents in perspective a form of viscous damper in which the viscosity is produced by rotating a metallic disk in a magnetic field. Fig. 12 represents a vertical central section of another form of viscous damper comprising two movable members, one adapted to drive the other through a medium of oil or other liquid. Fig. 13 is a diagram showing the connections for substituting resistances for the condensers shown in Fig. 1 in producing a local synchronizing-current. Fig. 14 is a diagram showing a method of producing the local synchronizing-current by replacing the line polarized relay by a neutral relay and employing only one condenser. Fig. 15 is a diagram showing the connections for duplexing this system. Fig. 16 is an end elevation of the line polarized receiving-relay. Fig. 17 is a diagrammatic perspective view showing the connections of this relay. Fig. 18 is a central vertical section of the said relay, partly in elevation. Fig. 19 is a detail view of the relay-tongues in side elevation, showing how they are mounted. Fig. 20 is a top plan view of the keyboard. Fig. 21 is a side elevation of the same. Fig. 22 is a central longitudinal section of the same. Fig. 23 is a section of the keyboard, taken along the line A B, Fig. 20, and looking in the direction of the arrow in that figure. Fig. 24 is an enlarged detail view showing the means for operating the indicating-bell on the keyboard. Fig. 25 is a detail central sectional view of the counter-magnet of the keyboard. Fig. 26 is a detail perspective view of one of the key-lever bows. Fig. 27 is a similar view of one of the key-levers. Fig. 28 is a detail perspective view of the lever for holding down the keys and completing the clapper-magnet circuit. Fig. 28ª is a horizontal sectional view of the counter-cylinder, showing the method of mounting the same. Fig. 29 represents in front elevation the printer embodied in this invention, showing the same with the paper in position ready to receive a message. Fig. 30 is a similar view of the same apparatus with the paper detached. Fig. 31 is a top plan view of the printer shown in the preceding views and having the paper removed. Fig. 32 represents a section taken along the line C D, Fig. 30, and looking in the direction of the arrow in that figure. Fig. 33 represents the printer-relays shown on the right in Fig. 31 in front elevation and detached from the printer. Fig. 34 represents a detail sectional view through the printer carriage-bar and shafts carrying the paper-feed rollers, the section being taken along the line E F, Fig. 30. Fig. 35 is a fragmentary detail view of one of the paper-guides. Fig. 36 is a detail view, partly in section, of the liner magnet and mechanism. Fig. 37 represents the frame carrying the ratchet-and-pawl lining mechanism with parts removed. Fig. 38 represents in end elevation and partly in section the spacer-magnet and its ratchet-and-pawl mechanism. Fig. 39 is a detail view showing the circuit-combining device and trailer in side elevation. Fig. 40 represents a central vertical section of the type-wheel, showing the mode of driving the same. Fig. 41 represents a section taken along the line E F, Fig. 40, and looking in the direction of the arrow in that figure. Fig. 42 represents a horizontal central sectional view of the carriage-returning mechanism. Fig. 43 is a diagram showing the electrical connections of the printer. Fig. 44 is a diagram showing the method of combining the printer-circuits as accomplished by the circuit-combining apparatus herein described. Fig. 45 is a diagram further illustrating the system of combinations. Fig. 46 represents in perspective a sheet having a message printed upon it and partly folded, and Fig. 47 represents the sheet folded and placed in a transparent envelop ready for delivery.

Referring first to Fig. 1, that part of the diagram above the central broken line represents a station from which the messages are sent and that below the broken line a station at which they are received, and although this diagram represents two stations only my invention is not confined to simply transmitting messages between two terminal stations, for as many intermediate stations may be used as may be desired.

The numeral 1 represents an alternating-current generator of any approved form and having a frequency of about ninety cycles a second. This generator delivers a normally uninterrupted alternating electric current to the main-line conductor or wire 2. The main-line circuit is normally closed through the contact 3 of the transmitter 4 and passes thence to a receiving-station. The terminals of the main line may be grounded, as shown, or a return metallic circuit may be employed, as is obvious.

The transmitting current distributer or sunflower comprises a ring 5, having, for example, fifty-two insulated metallic segments of equal width and a keyboard-clapper circuit-ring 6, having four insulated metallic segments of equal width. Over both of these rings sweeps the sunflower-trailer, comprising an arm 7, having brushes 8 and 9, which make contact with the segments of the rings 5 and 6, respectively. This trailer is driven at the generating-station by the alternator 1, being geared thereto in any convenient manner and is driven at such a speed that the trailer makes one revolution for every fifty-two wave impulses or semicycles of the current developed by the alternating-current generator. This is the most convenient way of driving the transmitting-trailer; but it may also be driven in a way similar to that in which the receiving-trailer is driven.

From the segments of the ring 5 four groups of eleven segments each are selected, the first group, composed of the first to eleventh segments, inclusive, beginning to count at the segment indicated by the numeral 10, the second group of the thirteenth to the twenty-third, the third group of the twenty-fifth to the thirty-fifth, and the fourth group of the thirty-seventh to the forty-seventh, leaving eight odd segments, the twelfth, twenty-fourth, and thirty-sixth segments being used to separate the four groups above mentioned, while the other five are used for other purposes hereinafter described. The employment of these separating-segments is rendered necessary on account of the use of a polarized line-relay, which does not allow adjacent segments to be employed on account of the fact that its tongue will remain against the contact to which it was last attracted until an impulse of opposite polarity to the last one arrives. The four groups of eleven segments each are electrically connected to eleven contact-pieces 11 on four corresponding keyboards 12; but in Fig. 1, for the sake of clearness, only two segments of each group are actually shown connected to two contact-pieces of each of the four keyboards, as this is sufficient to explain the principle of the invention, all of the said contacts being shown in the detail drawings of the keyboard. (See Figs. 20 to 28ª.)

The trailer-brush 8 is electrically connected through a collector-ring and brush to the magnet-coil 13 of the transmitter and thence through the resistance 14 to the positive pole of the source of local current 15, which may be either a direct-current dynamo or a battery. The other trailer-brush 9 is electrically connected through a suitable brush and collector-ring to a resistance 16 and thence to the positive pole of the local-current supply 15. The frame 17 of each of the keyboards is electrically connected to the negative pole of the local-current supply. The keyboard nearest the sunflower in the diagram will be considered keyboard number one and the rest numbers two, three, and four, consecutively. The operator at keyboard number one desiring to send a message depresses his key 18, and this will force the metallic lever 19 into engagement with the contacts 11, partially completing the circuits of segments 1 and 3 of the first group to the transmitter-coil, and as the trailer-brush 8 passes over these segments it will successively complete the circuit through the said transmitter-coil as long as it is in contact with the segments. The effect of this will be to cause the transmitter to break the main-line circuit through its contact 3 twice, once as the brush is passing over segment number one and again as it passes over segment number three, and as the segments are of such a width that the time consumed by the brush passing over one of them is equal to the length of an impulse or semicycle of the line-current two impulses of the line-current will be suppressed or cut out, the transmitter breaking the line-circuit at the non-sparking point of the current, which has been found to be at or near the point of zero current, but in practice, as the impulse next succeeding the suppressed impulse is not used, it is not important that the circuit be again established at the point of zero current, but may be completed at some point in the next succeeding impulse. Indeed, two or more whole cycles may be suppressed for each character; but it will be herein assumed that each character or signal is represented by suppressing two impulses only. According to the system of combinations that I have herein shown (see the diagram Fig. 44) the operation of the key which controls the circuits of the first and third segments of the first group and thus suppresses the first and third semicycles of a group of line impulses corresponding to these segments will transmit to the receiver a signal which represents the letter "X." If the operator at keyboard number one desires to transmit any other character, he will operate another key, which will connect in the transmitter-circuit two other segments of the first group, and so on. With the eleven segments he may send forty-five signals, comprising all of the letters of the alphabet, the numerals "1" to "9," punctuation-marks, and other signals, hereinafter more particularly described. The operators at the second, third, and fourth keyboards send their messages in like manner, each of the keyboards being separately connected to its corresponding group of transmitting-segments. As shown in the diagram, the operator at the second keyboard from the transmitter-sunflower by operating his key will connect in the transmitter-circuit the eighth and tenth segments of the second group, which will send a comma, the operator at the third keyboard would connect to the transmitter the fifth and ninth segments of the third group, which would send the letter "M," while the operator at the fourth keyboard by depressing his key would connect the third and seventh segments of the fourth group to the transmitter and would send the letter "S." A complete keyboard is shown in Figs. 20 to 28ª, only one key of each keyboard being indicated in the diagram Fig. 1 for the sake of clearness. It will thus be seen that as the transmitter-segments of any group are active at such times only as the trailer-brush is passing over them the operators of each keyboard are given the exclusive use of the line successively for the intervals of time that the brush is passing over the group of segments to which those keyboards are connected, which will allow several operators the use of the same wire, thus constituting a multiplex system of transmission.

The keys of each keyboard are locked in such a manner that they may be operated at such intervals only as will prevent their operation from interfering with that of any of the rest of the keys and will remain locked after being operated for a fixed length of time. This locking mechanism comprises, among other parts, an electromagnet 20, provided with an armature carrying a clapper 21, which is normally held above a series of lugs 22 on the levers 19 and prevents the keys from being operated except at such times as the magnet 20 is excited and attracts the clapper from engagement with the keys. By connecting the coil of the magnet 20 through one of the clapper-circuit segments of the ring 6 this magnet will be energized once in every revolution of the sunflower-trailer for the length of time that the trailer-brush 9 is upon the segment to which the magnet 20 is connected. From the diagram it will be seen that the clapper-magnet 20 of keyboard number one is connected to the clapper-ring segment approximately opposite the group of transmitting-segments operated by keyboard number two, that the clapper-magnet of keyboard number two is connected to the clapper-segment approximately opposite the set of transmitting-segments operated by keyboard number three, and so on, so that the operator at keyboard number one can operate the keys there at such times as the transmitter is being operated by the keys of keyboard number two—that is to say, the operator holds his finger on the key representing the character to be transmitted. Then as the trailer-brush reaches the clapper-magnet segment of the ring 6, connected to the keyboard number one, the operator will feel his key give way, owing to the removal of the clapper 21. As soon, however, as the trailer-brush passes over the clapper-segment mentioned the clapper 21 will return to its original position and lock the levers 19 in engagement with the contacts 11 until the trailer-brush 8 passes over the group of transmitting-segments connected to the keyboard operated. When the trailer-brush 9 reaches the clapper-circuit segment connected to keyboard number one again, the clapper-magnet will again unlock the levers 19 and allow them to return to their normal positions and the next key to be operated.

The magnet 198 operates a counting mechanism by which the operator at any keyboard is enabled to tell just what position the last character transmitted occupies upon a line at the printer. This mechanism will also be described in the detail description of the keyboard, it being sufficient here to say that the mechanism is operated by the magnet 198 and that these magnets are energized at each time that a key is depressed by connecting them in the clapper-circuit of another keyboard by a pivoted contact-maker 221, operated by each key as it is depressed.

At the station where the messages transmitted, as above described, are to be received is a sunflower device or current-distributer 23, having the same number of segments as the transmitting-sunflower ring 5 and arranged in corresponding groups and order. The receiving-segments of each group are connected to an equal number of polarized selecting-relays 24 and thence to a tongue 25 of the receiving main-line relay, only two selecting-relays of each group being shown in the diagram, as the addition of the others would only tend to confuse the drawings. The coil 26 of the line-relay is connected directly in the main line, the tongue 25 of this relay being kept in a state of vibration between its contacts 27 and 28 in unison with the line-current. The local receiving-circuits derive their current from a main local circuit 29, upon which a continuous direct electromotive force of, for example, one hundred and ten volts is impressed from any desired source 30, and across this main local circuit are connected the shunt-circuits 31 and 32. To the circuit 31 is connected a branch circuit 33 34, as at the points 35 and 36. The circuit 31 is provided with resistances 37 37 and 38 38, the former being connected between the points 35 and 36 and the main local circuit, while the latter are connected in the circuit 31 between those points. The resistances 37 are each, for example, one hundred ohms, while the resistances 38 are each two hundred ohms. The circuit 31 is connected from a point between the resistances 38 to a brush and collector-ring, which are electrically connected to a brush 39 of a trailer 40, which sweeps over the segments of the sunflower 23. This trailer is driven in synchronism with the transmitting-trailer by a small motor regulated by a synchronizer, which will be hereinafter fully described, and the receiving-sunflower is set so that its segments will occupy identical positions with those at the transmitter, the method of thus setting and ascertaining when the sunflowers are properly set being also hereinafter fully described. As the tongue 25 of the receiving line-relay vibrates between its contacts 27 and 28 an electric impulse will be sent through each of the sunflower-segments 85 and selecting-relays 24 as the trailer rotates, the successive impulses being of alternate polarity, so that a plus impulse is sent through one segment and its receiving-relay, a negative impulse through the next segment and its selecting-relay, and so on through the series. The coils of the selecting-relays 24 are, however, so wound that the current impulses distributed as described send their tongues against their back-stops; but when the impulses of the line alternating current are suppressed at the transmitter, as when sending a signal, this interrupts the regular distribution of the current impulses through the selecting-relays by causing the tongue of the line-relay to remain against the contact to which it was last sent, which will send an impulse of the opposite polarity to the normal impulse through that one of the selecting-relays 24 which is connected to the sunflower-segment corresponding to the segment of the transmitting-sunflower which was operated upon at the keyboard, causing the tongue of the selecting-relay receiving the reversed impulse to be sent against its forward contact, and thus to partially complete a printer-circuit, hereinafter described. The selecting-relay tongues are sent back to their back-stops by the succeeding normal impulses, thereby obviating the necessity of employing extra circuits and devices for accomplishing this.

By the arrangement of the circuits as shown in Fig. 1 the messages sent by any operator will be received upon the corresponding receiver or printer at a receiving-station without interfering with any of the others—that is to say, messages sent by the operator sending on the keyboard connected to group number one of the transmitting-sunflower segments, for example, will be received and printed by the printer connected to the selecting-relays operated by group number one of the receiving-sunflower segments, the signals from the second group of transmitting-sunflower segments will be received upon the selecting-relays connected to the second group of receiving-segments, and so on through the series. In thus receiving the messages two of the receiving selecting-relays act for each signal in order to actuate the printer, hereinafter described, when the action of these selecting-relays will also be described more fully.

It will be obvious that the principle of this invention will in no wise be affected if instead of having the sunflower-segments stationary, as above described, they are caused to rotate and the trailers to remain stationary. So, also, the number of segments in each group may be varied without departing from the spirit of this invention.

*The local synchronizing-circuit.*—For the purpose of producing the local synchronizing-current the line receiving-relay is provided with a second tongue 41, which vibrates between the contacts 42 and 43, the main-line circuit traversing the relay-coils 44. In reality, as will hereinafter be shown, the relay-tongues 25 and 41 are parts of a single relay in which both tongues are actuated by the same coil; but for the sake of clearness these two tongues are shown in the diagram as if upon separate relays. In the circuit 32 are connected two or more condensers 45 45, and to a point in this circuit between the condensers is connected one end of a circuit 46, which traverses the coil 47 of the synchronizer 48 and connects at its other end to the relay-tongue 41. This synchronizer regulates the rotation of the sunflower-brush and printer-driving mechanism, and comprises, broadly, movable coils traversed by a synchronizing-current and rotating in a constant magnetic field, it being described in detail hereinafter. This synchronizer 48 receives its regulating-current in the following way: When the relay-tongue 41 makes contact with the stop 42, the condenser connected to stop 43 will charge and the other condenser will discharge in one direction through the synchronizer-coil 47, and when the tongue 41 returns to the stop 43 the condenser connected to stop 42 will charge and the other condenser discharge a current of opposite polarity through the synchronizer-coil. So in this way by an alternate charging and discharging of the condensers currents of alternate polarity and in phase with the line-current will be made to traverse the coils of the synchronizer, and thus regulate it, as hereinafter more particularly described. In order to prevent sparking at the contacts or stops 42 43, two resistances 49 49 are placed in the circuit 29 between the condensers and the stops.

As a ready means for determining whether the synchronizing-current and line-current are in phase or whether the synchronizer is running in synchronism a switch 50 is connected in the synchronizer-circuit 46 and around this switch a telephone-receiver 51. When the switch is opened, the synchronizing-current will be sent through the telephone-receiver, which will emit a uniformly-vibrating sound; but if the phase or synchronism is disturbed the vibrations no longer remain uniform, but a very irregular vibrating sound will be given. The condensers 45 may be replaced by suitable resistances 52, as shown in Fig. 13, in which case the rest of the connections would be the same as shown in Fig. 1. This method of producing a local synchronizing-current is not limited to the use of a polarized relay only, for it will be seen that the desired result may be accomplished with either a polar or a neutral relay, and in either or both cases either one or two of the relay-contacts may be employed.

In Fig. 14 is shown a neutral relay 53 replacing the polar relay and having only one condenser 57 connected in the synchronizer-circuit. The neutral tongue 54 will be kept in a state of vibration between the stops 55 and 56 by the line-current, and when it makes contact with stop 55 the condenser 57 will charge and a current will pass through the synchronizer-coil in the direction of the lower arrow, for example. When the tongue 54 returns to the contact 56, the condenser will discharge and send a current through the synchronizer-coil in the opposite direction, or that of the upper arrow. The period of the vibration of the tongue 54 will, however, be twice as great as that of the polar-relay tongue 41.

*The synchronizer.*—Referring now to Fig. 2, 58 represents a small continuous-current motor having permanent field-magnets 59 and an armature 60 mounted upon a shaft 61. This shaft is geared in a novel way, which will be later described in detail, to the receiving-sunflower trailer 40. One of the armature-brushes of the motor 58 is connected through a rheostat 62 to the plus pole of a source of local continuous current, while the other is connected to the machine-frame, which is connected to the negative pole of the current-supply. Upon the shaft 61 is also mounted the armature-coils 47 of the synchronizer 48, which are connected to suitable collector-rings and brushes 63 for connecting it with the synchronizing-current. The synchronizer-coils 47 being thus driven by the motor 58, rotate in the field of the electromagnets 64, which are excited from a source of local direct current. This synchronizer mounted on a shaft separate from the motor is shown in diagram in Fig. 11.

The armature-coils of the synchronizer being traversed by the synchronizing-current, as explained, will prevent any tendency of the direct-current motor 58 to get out of step, its action being briefly as follows: The armature of the synchronizer being driven by the motor will not do work or absorb work until the motor tends to get out of step, when the synchronizer will do either, as the case may be, and thus maintain the motor in step or in synchronism.

*The viscous damper.*—More perfect synchronism, however, may be obtained by employing in connection with the synchronizer a viscous damper 65, comprising a body fixed to the synchronizer-shaft and connected to another moving body through a viscous medium. One form of this damper 65 is shown in Fig. 2 and in detail in Figs. 7 and 8 and comprises a circular body 66, mounted fast on the shaft 61 and provided with an annular chamber 67, which is almost filled with mercury 68, the mercury being poured into the chamber through an aperture normally closed by a screw-plug. When the damper is rotated by the synchronizer-shaft, the mercury, due to centrifugal force, will form a continuous ring, pressing against the outer wall 69 of the chamber, and by virtue of its viscid connection with the moving receptacle will deaden any vibrations in the motion of the said body, and thus prevent vibrations of the synchronizer-shaft. A form of such damper operating upon the same theory is shown in Figs. 9 and 10, where 70 represents a circular receptacle mounted fast on the shaft 61 and carrying within it a loosely-mounted body 71, surrounded by oil or other liquid 72, the liquid being poured into the receptacle through an aperture normally closed by the screw-plug 73. The loose body 71 has the effect of making a light liquid, such as oil, act as a heavier liquid. This viscous damping effect may be produced in many ways, and the word "viscous" is used in its broadest or generic sense. Thus, for example, the viscous effect may be produced by a disk or its equivalent moving in a magnetic field. A damper constructed to operate upon this principle is shown in Fig. 11, where 74 represents the disk of copper or other conducting material, mounted fast upon the separate shaft 75 of the driving-motor 58 and revolving between the poles of two electromagnets 76, carried by a frame mounted fast upon the shaft 61. I do not, however, in this application claim this specific arrangement. The principle of this damper is in no wise altered and, indeed, the operation is greatly improved if both motor and synchronizer are mounted on the same shaft, as shown in Fig. 2, nor is the principle altered if the number of electromagnets and disks are increased. This magnetic damper may be replaced by the damper shown in Fig. 12, which is another form of oil or other liquid damper and comprises an oil or other liquid receptacle 77, mounted fast upon the shaft 75, and within this receptacle is mounted a flanged disk 78 upon a sleeve 79, which is secured fast to the synchronizer-shaft 61. The sleeve 79 passes through the cup-shaped receptacle 80, which forms a space 81 for catching any oil that might escape along the collar. The disk 78 is surrounded by oil or other liquid 82. The screw-plug 83 closes an opening through which the liquid may be poured into the receptacle. The viscosity between the oil or other liquid and the two moving bodies 77 and 78 damps the vibrations of the latter, as described, and this damper, as was the case with those above described, may be used equally as well by mounting both synchronizer and motor on the shaft 61 and supporting the shaft 75 in a suitable bearing.

*The receiving-sunflower.*—The receiving-current distributer or sunflower 23 (see Figs. 2 and 3) comprises a ring 84, of insulating material, having the segments 85 set around its periphery and the segment-circuit wires leading thereto, preferably through a cable 86. This sunflower is mounted fast on a stud 87, which is mounted to turn in a suitable bearing. The angular position of the sunflower may be adjusted by means of an arm 88, secured fast to the stud 87 and adapted to be held in the desired position by a set-screw 89, carried by a stationary arm 90.

The trailer 40 comprises a rotating arm, upon one end of which is mounted a trailer-contact 39, in practice consisting of two or more small rollers 91, carried by a metal spring 92, secured to a block of insulation 93, carried by the trailer-arm. The other end of the trailer-arm carries a small pot-magnet 94, comprising an iron cylinder 95, within which a coil of wire is wound upon a hollow iron core 96, fixed to the cylinder 95. Inside of this iron core is an iron plunger 97, having an iron head or cap 98, beyond which extends a nipple 99. This plunger terminates at its other end in the form of a pin which extends through the core 96, engaging a small spring 100, which normally presses the plunger outward from the magnet. The wire 101 from the trailer-brush and the wire 102 from the coil of the magnet 94 pass through a hollow shaft 103 to two collector-rings 104 105, mounted on that shaft. The trailer-arm is mounted fast upon this shaft 103, which is driven in the following manner: A bronze disk 106 is mounted fast upon a sleeve 107, which turns on the shaft 103, and the said disk is provided with a series of twenty-six equally-spaced apertures 108 near its periphery. This disk is mounted close to the trailer, so that the nipple 99 of the magnet-plunger 97 may engage the apertures 108. The sleeve 107 then carries a gear-wheel 109, which meshes with a small gear 110 on the motor-shaft 61. By this means of connecting and driving the trailer the angular position thereof may be automatically adjusted to correspond to the exact position of the transmitting-trailer without interrupting the synchronism. The trailer is thus automatically set as follows: One of the extra segments of the receiving-sunflower—segment number 49, for example—is connected to the coils of a polarized relay 111 and thence to a line-relay tongue 25. (See Fig. 1.) This relay 111, unlike the local selecting-relays 24, is so wound that if the line-current impulse corresponding to segment 49 at the transmitter is not cut out its tongue will be sent against its forward contact instead of its back contact. If, however, the impulse corresponding to segment 49 is cut out and the transmitter-trailer arrives upon segment 49 at the same time that the receiving-trailer arrives upon its segment 49, to which the relay 111 is connected, at which time the trailers are properly set, the tongue of that relay will be sent against its back-stop. This segment number 49 at the transmitter-sunflower, which corresponds to the segment at the receiver to which the relay 111 is connected, is permanently connected, as shown in Fig. 1, to the negative pole of the local transmitter-circuit. At each time, therefore, that the trailer sweeps over this segment a semicycle or impulse of the main-line current will be cut out, and if the trailers are properly set—that is, set to correspond with each other—the relay 111 will receive an impulse tending to send its tongue against its back-stop contact. The forward contact of the relay 111 is connected, as shown, to one of two brushes 112, which once in each revolution of the trailer will be short-circuited by a metallic segment 113. (See Figs. 1, 2, and 5.) The other of these two brushes 112 is connected to the terminal wire 102 of the coil of the plunger-magnet 94 through the collector-ring 105, its other terminal being connected to the frame of the machine, which (see Fig. 3) is connected to the negative pole of the source of local-current supply. The tongue of the relay 111 carries upon its contact end an insulated metallic contact-piece 114, which is electrically connected to the positive pole of the local-current circuit, so that if the trailers occupy the same positions with respect to the sunflower-segments and a certain impulse is cut out, as described, once in each revolution of the trailers the relay 111 will receive an impulse tending to send its tongue against its back-stop contact, as described; but this will not complete the circuit through the coils of the magnet 94, as the side of the relay-tongue striking the back-stop contact is not connected in the circuit. When the circuit is completed through the coils of the magnet 94, it draws in its plunger and releases the trailer-arm from the driving-disk 106. The nipple of the plunger of the magnet 94 will therefore remain in engagement with one of the holes of the disk 106 as long as the trailers continue to maintain their proper positions; but if one of these trailers becomes displaced relative to the other the trailer at the transmitting-sunflower will not arrive upon the segment number forty-nine at the same time that the trailer at the receiver arrives upon its segment number forty-nine, the result of which will be that relay 111 will receive an impulse sending its tongue against its forward stop, for it does not receive the cut-out impulse suppressed by segment forty-nine, and this will partially complete the circuit through the coils of the magnet 94, the circuit being wholly completed when the segment 113 short-circuits the brushes 112. The completion of this circuit will cause the magnet 94 to draw back its plunger and disengage its nipple from the aperture of the disk 106. The friction of the rollers will then cause the trailer to drag back, when its nipple will be brought into the next aperture, and if this is not the proper position of the trailer the operation will be repeated until the trailers arrive upon segments number forty-nine simultaneously, when the circuit through the magnet 94 will be broken and the tongue of the relay 111 sent against its forward contact, as the impulse corresponding to the cut-out impulse then falls upon receiving segment 49.

In Figs. 2 and 5, as in practice, the segment 113 is shown mounted upon a disk of insulation 115 and the brushes 112 insulated from the frame of the machine, as at 116.

*The printer-driving mechanism.*—Passing next to the method of driving the printers reference will be had to Fig. 2, where the type-wheels 140 of the printers 139 are shown as driven from a shaft 117, which is in turn driven by a separate motor 118, having its speed governed by the shaft 103, and therefore kept in synchronism with the synchronizer. The shaft of the motor 118 carries a pinion 119, which meshes with a gear-wheel on the shaft 117, and carries also on its shaft a metal disk 120, preferably of copper or aluminium. This disk rotates between the poles of an electromagnet 121, the circuit through the coils of which, beginning at the positive pole of the source of local-current supply, passes through a rheostat 122 and thence by wire 123 through a brush to a collector-ring 124, mounted on and insulated from the shaft 103. This collector-ring 124 is electrically connected to one side 125 of a split metal disk, also mounted on and insulated from the shaft 103. This split disk comprises two metal sections 125 and 126, separated by insulation 127, which at a point 128 becomes broadened. (See Fig. 6.) The section 126 is connected to the ring 129, and the ring 129 is connected through a suitable collector-brush to a wire 130, which passes through a rheostat 131, and thence to the field-coils 132 of the series-wound motor 118. The main motor-circuit 133 passes from the negative pole of the local-current supply through a rheostat 134, while the motor-armature may be shunted by a circuit 135, passing through a rheostat 136. The motor 118 is started by adjusting the rheostats 134 and 136 until the shaft 117 is driven at the same speed as the shaft 103. When, however, the motor 118 drives the shaft 117 faster than the shaft 103, a contact-maker 137, which is mounted on an arm 138, secured fast to the shaft 117, will be sent over in contact with the section 125 of the split disk, which will complete the circuit of the electric brake-magnet 121, thereby offering a resistance to the revolution of the disk 120, which puts an extra load on the motor 118 and causes it to diminish its speed. When the speed of the shaft 117 lags behind that of the shaft 103, the contact-maker 137 will pass over to the section 126 of the split metal disk, completing the circuit 130, which partially short-circuits the field-coils of the motor 118, and thus causes the motor to increase its speed. When the proper speed is attained, as when the shafts 103 and 117 are rotating at the same speed, the contact-maker 137 will rest upon the insulation 128 of the split metal disk, when the normal connections of the motor 118 will be maintained. In practice, however, this contact-maker 137 rocks slowly from one section of the split disk to the other over the insulation 128.

In Fig. 2 two printers 139 139 are shown connected to the driving-shaft 117, though as many more may be similarly connected as it is desired to use, all of which are driven from the shaft 117 in the following manner: Each printer carries a rotating type-wheel 140, mounted upon a shaft 141, which carries an arm 142. A short counter-shaft 143, supported in a proper bearing 144, carries at one end a bevel-gear 145, which meshes with a bevel-gear 146 on the shaft 117. The other end of the shaft 143 carries an arm 147, which is bent at right angles to engage the arm 142 of the type-wheel shaft, and thus imparts rotary motion to it. This method of driving the type-wheel shaft enables a printer to be readily connected or disconnected with the driving mechanism without disturbing the motion of said mechanism.

*The keyboard.*—The transmitting-keyboard is shown in detail in Figs. 20 to 28ª, inclusive. This keyboard comprises, among other parts, a suitable metal base 17, mounted upon the legs 148. Upon the upper face of the base is a plate 149, having a number of rows of triangular lugs 150, upon which the key-levers 18 are pivoted, each lever being notched, as at 151, to receive one of the said lugs. Each key-lever carries at one end a finger-cap 152, upon which appears the character which that key represents, the finger-caps being arranged in four tiers to facilitate their operation. There being forty key-levers, all of the letters of the alphabet, numerals, and various other signs may be transmitted. Near the other end of the keyboard from the key-caps are two uprights 153, which carry a shaft 154, and upon this shaft are loosely mounted a series of eleven U-shaped key-lever bows 19. The portion 155 (see Fig. 26) joining the side members 156 and 157 of each of these bows extends across the ends of the key-levers, which latter have the metal so cut away from one end of each, as at 158, Fig. 27, that two lugs 159 will be left upon the end of each key-lever, and these lugs occupy such positions that by the operation of each key the portion 155 of two separate bows 19 will be engaged by these two lugs and raised. The portion 155 of the bows is normally held down upon the lugs of the key-levers by springs 160, attached to hooked lugs 161 on the bows and to the base or frame of the keyboard. One member 157 of each key-lever bow is prolonged, as at 162, and this prolonged portion normally occupies a position above a corresponding contact-spring 11, so that when the portion 155 of any bow is raised by the operation of its key the end 162 of the bow will be sent into engagement with a contact-spring 11, which will complete an electric circuit from the contact through the key-lever bow to the frame of the printer, as above described with reference to Fig. 1. There are eleven of these contact-springs 11, all insulated from the keyboard-frame, as at 163, and connected to separate segments of the transmitting-sunflower, also as above described with reference to Fig. 1. The portion 155 of each of the bows carries a lug 22, having a lip 164, and normally a clapper 21 extends across the tops of these lugs and prevents them from being raised except at certain intervals, as will be hereinafter more fully described. This clapper 21 is secured to a yoke 165, which is in turn made fast to one end of a plunger 166 of an iron-clad-pot electromagnet 20, which is secured fast in the frame 167 by the split collar 168, while the frame 167 is secured fast to the printer-base. This magnet 20 comprises an outer iron shell 169, which surrounds the magnet-coil 170, the said coil being wound upon and insulated from a brass tube 171. (Shown most clearly in Fig. 23.) Within the tube 171 and extending about half-way of its length is an iron core 172, having a head 173 at one end which is screwed into one end of the shell 169. This core is provided with a central longitudinal opening which passes entirely through it, being conical at its inner end, as shown. The plunger 166 passes into the tube 171 from the end opposite the core, is made cylindrical in cross-section for a part of its length, and then becomes conical, as shown. From this conical portion the diameter of the plunger is reduced to that of a pin 174, which extends entirely through the core and carries at its end outside of the core the adjustable thumb-nut 175. The plunger 166 carries an integral collar or flange 176 just outside of the end of the shell 169 nearest the yoke and is of such a diameter that when the plunger is drawn into the core the collar 176 may pass a short distance into the end of the shell, the latter extending beyond the end of the magnet-coil. A head comprising a small German-silver disk 177 is inserted in this end of the shell and covers the end of the magnet-coil. The plunger is retained in its normal position by two springs 178, carried upon the pins 179, secured to the magnet-yoke. These springs pressing against the yoke and the magnet-frame offer resistance to any force which acts to force the plunger into the magnet. This form of magnet is especially efficient and desirable for the purpose to which it is applied owing to its great initial pull, which is produced by the employment of the iron shell and extending it over the core, as shown, which gives a more complete magnetic circuit than could be obtained with the common form of electromagnet. This magnet 20 is that one referred to in the description of Fig. 1 as the clapper-circuit magnet, being connected to one of the segments of the ring 6 of the transmitting-sunflower, by which segment an electric circuit is completed through the said magnet once in each revolution of the transmitting-trailer. At each time that the current is thus sent through the coils of the magnet 20 it will draw in its core and remove the clapper 21 from above the lugs 22 of the key-bows, allowing a key to be operated, the clapper remaining out of engagement with the lugs 22 until the transmitting-trailer has passed off of the clapper-segment connected to the magnet 20; but as soon as the trailer passes off that segment the circuit will be broken through the magnet and will allow the clapper to return to its first position. In doing this it will engage the lower side of the lip 164 of the raised lug 22 and hold it up until the circuit is again made through the magnet and another key operated, as above described, when the first lugs will return to their original positions beneath the clapper. In this way the keys of any keyboard may be operated only once in each revolution of the trailer at the transmitter and when operated will remain locked in that position until the trailer makes another revolution. It will be shown, however, that the keys necessary to transmit two characters in some instances may be operated at the same time. In any event the keys will be locked as above described. By this arrangement the signals cannot become mixed by the indiscriminate operation of the keys, as it requires each key to be set and locked previous to the time at which the trailer passes over the segments connected to the keyboard.

It will be noted that the clapper-locking mechanism does not act directly to lock the keys, but prevents their effective operation by locking the key-lever bows.

The keyboard is provided also with a counting mechanism for visually indicating to the operator of the keyboard the exact position on a line at the printer of the last character printed, which indicates the position of the printer-carriage. This mechanism comprises, among other parts, a hollow cylinder 180, mounted fast on a shaft 181, which is journaled to rotate in the bearings 182 and 183, the said shaft extending all the way through the cylinder. Upon this shaft 181 is a coil-spring 184, fixed at one end to the bearing 182 and at the other to the shaft 181, the said spring normally forcing the cylinder and shaft toward the bearing 183 as the cylinder is made fast to the shaft at its end near the said bearing. Upon that end of the cylinder nearest the bearing 183 is a crown-toothed clutch member 185, which is adapted to engage a similar member 186, mounted on a sleeve 187, carried loosely in the bearing 183. This sleeve 187 carries a ratchet-wheel 188, the teeth of which are engaged by a pawl 189, carried by an arm 190 and held against the teeth by the spring 191. (See Fig. 21.) A second pawl 192, pivoted to the upright 193, also engages the teeth of the ratchet 188, being held against them by the spring 194, preventing any retrograde motion of the ratchet when the pawl 189 travels backward. The arm 190 is loosely pivoted on the outer end of the sleeve 187 and is made integral with an arm 195. To one end of this arm is pivoted a link 196, which is pivotally connected to the upper end of a plunger 197 of the counter-magnet 198. The other end of the arm 195 is held down by a small coil-spring, as shown. This counter-magnet 198 is of the iron-clad-pot type, being generally similar to the clapper-magnet above described, but differing from it in certain respects. This magnet consists of an outer iron shell 199, (see Fig. 25,) held by a split collar 200, which is made integral with the upright 193. This shell 199 surrounds the magnet-coil 201, the said coil being wound upon a brass tube 202 and insulated therefrom. An iron tube 203 is slipped over the brass tube 202 and extends between the coil and the brass tube about half-way of the length of the former. Within the tube 202 and extending not quite half-way of its length is an iron core 204, having a head which is screwed into one end of the shell 199, as shown. This core 204 is provided with a central longitudinal opening which passes all the way through it, and through this opening passes the stem or pin 205 of the plunger. The upper end of the shell 199 is closed by a small German-silver disk 206, resting upon a disk of insulation 207, and just outside of this disk is a flange or collar 208, carried by the plunger. At each time that one of the keys is operated to send a signal a current will be sent through the coil of the counter-magnet 198 and cause it to draw in its plunger. When this is done, pawl 189 will operate the ratchet 188 and rotate the cylinder 180 the distance of one ratchet-tooth. By repeating this operation the cylinder 180 will be rotated a certain distance upon the operation of each key. The cylinder 180 carries upon its surface a spiral band 209, which is so arranged that by noting the position of its graduated edge relative to a flat fixed horizontal bar 210, which extends across the cylinder, the position of the last character in a line at the printer, and therefore the position of the printer-carriage, can be readily determined. This spiral band is so placed upon the cylinder that in passing from one end of the cylinder to the other it passes once around it, so that when the end of a line is reached, assuming that the cylinder was started from its unwound position at the beginning of the full line, the cylinder will have made one complete revolution and all of the graduations along the edge of the spiral strip will have passed the edge of the bar 210. If, then, the operator at the keyboard desires to form a new line, the key marked "Back" is operated, which being pressed down will engage an arm 211, which is made fast to a spindle 212, loosely journaled in the lugs 213 on the upright 193. When the arm 211 is sent down, it will drive an upright arm 214, carried by the spindle 212, into engagement with the end 215 of the cylinder-shaft, driving the cylinder back and disengaging the clutch members 185 and 186. When this takes place, the cylinder, actuated by the spring 184, will be brought back to its initial unwound position and indicate the beginning of a new line. The backward rotation of the cylinder is stopped at the proper time by a lug 216, carried by the cylinder, coming in contact with a small arm 217, secured to the keyboard-frame.

The means by which an electric circuit is completed through the counter-magnet coil 201 at each time that one of the keys is operated comprises, among other parts, a thin metal bar 218, which extends across the key-bows 19, as shown, being secured to two arms 219, which are made fast to a sleeve 220, mounted to turn on the shaft 154. A metal arm 221 is made fast to and insulated from the sleeve 220 and extends from the opposite side thereof from the arms 219 and carries at its end a contact-piece which when any of the key-bows 19 are raised by the operation of the keys will be sent into engagement with a contact-spring 223, which, as indicated in the diagram Fig. 1, is connected to the clapper-circuit of one of the other printers. The bar 218 is held down against the bows 19 by means of a coil-spring 222. When the cylinder 180 has made almost a complete revolution, a lug 224 on an adjustable collar 225 upon one end of the cylinder engages an arm 226 of a striker 227 and causes it to sound a bell 228, indicating the approach of the end of a line. (See Figs. 20 and 24.) The bell-striker and arm are pivotally mounted on a stud 229, fixed to the keyboard-frame. A space-bar 230 is placed in front of the keys and is secured at its ends to two side arms 231, which are secured at their inner ends fast to the collars 232, the said collars being mounted fast on a shaft 233, which is adapted to turn. Secured to the inner faces of these collars are two duplicate key-levers 234, which are in every way similar to the other key-levers, except that instead of being operated by a finger-tip they are operated from the spacer-bar 230. When the operator wishes to cause the printer to space, he presses the spacer-bar 230, which will send the key-levers 234 into engagement with two corresponding bows above them, and this will act to connect two of the contact-springs 11 in the transmitting-circuit, causing the two impulses of the line-current which represent the signal "to space"

to be suppressed. This will so operate a printer, as hereinafter described, as to cause it to space up as many spaces as the number of times the spacer-lever is operated.

The electric circuits of the keyboard were all fully shown and described with reference to Fig. 1. Many obvious modifications may be made in this keyboard without departing from the spirit of the invention. Thus if it is desired to pass the line-current directly through the sunflower and keyboard its impulses may be suppressed by causing the key-levers to break the sunflower-segment circuits at the contacts 11 instead of making them as shown, and, indeed, many other obvious modifications may be made in the construction of the keyboard.

*The receiving line-relay.*—The receiving line-relay, hereinbefore referred to, is shown in detail in Figs. 16 to 19, inclusive. This relay is provided with two partly or semi-independently movable tongues 25 and 41, which are mounted upon and insulated from two upright arms 235 and 236, respectively, the said relay-tongues being each provided with similar silver contact-tips 237 238, respectively. The arm 235 is mounted fast, as by the set-screw 239, upon a sleeve 240, which is in turn mounted upon a spindle 241 and held fast thereto by the same set-screw 239. The arm 236 is mounted on the end of a sleeve 242 and held fast thereto by a set-screw 243. The sleeve 242 is loosely mounted on the spindle 241 and is interiorly tapered at one end, where it receives the exteriorly-tapered portion 244 of the sleeve 240. The spindle 241 is journaled to turn in the split bearings 245 in the upper ends of the stationary uprights 246, secured fast to each end of the relay-base 247. By means of the adjusting-screws 248 the friction between the spindle 241 and the bearings 245 may be varied. The relay-coil 26 44 is wound upon a bobbin 249, into which extend the sleeves 240 and 242, the said sleeves being free to turn within the bobbin. This coil is supported upon the cross-pieces 250, carried by the longitudinal support 251, secured to the uprights 246. The magnets of the relay consist of two U-shaped cast-iron permanent magnets 252, pivotally mounted at their base in the relay-frame by means of the pivot-screws 253, each of the said magnets being cut away, as at 254, which enables their upper ends to be brought close together. A flange or foot 255 is formed along the lower inner edge of each of the magnets, so that when the magnets are in the operative position this flange 255 will act as a support. These magnets are held in the proper position by the milled screws 256, which pass through the upright members of one magnet to those of the other. The contacts 27 28 and 42 43 are adjustably mounted in the split blocks 257, secured to the tops of the magnet-poles, the said poles being provided with the adjustable pole-pieces 258. The binding-posts are secured to insulated plates 259, carried at each end of the relay-frame.

The manner of winding the relay-coil when the relay is used upon a duplex circuit is shown in Fig. 17. This coil is wound in a number of sections—five, for example, as shown in the diagram—and when this number is used the two end sections contain each half as many turns as any one of the three intermediate sections, all of which intermediate sections contain the same number of turns. The separate sections of this relay-coil are separated by disks of insulation, as otherwise there would be danger from the high electromotive force. The two outer and central sections are connected in series and terminate at the binding-posts 260 and 261, and by connecting these coils of the relay as shown it is plain that the two sets of coils have practically equal electromagnetic effects, and therefore a relay so wound can be used differentially and at the same time possess extremely high insulation between the two sets of coils.

By pivoting the magnets of the relay as shown they may be opened, as shown in the dotted lines at 252', Fig. 16, allowing the contacts to be readily gotten at and cleaned. The tongues of this line-relay are independently movable to the extent that if one is held still the other may continue to vibrate; but it is preferable in practice to have enough friction between the sleeve 240 and sleeve 242 to cause one tongue to be vibrated by the other if neither is held fast. The spring of the tongue which produces the local synchronizing-current is made weaker or thinner than the spring of the other tongue, so that the former may be allowed to remain against its contact longer than the latter. The vibration of these relay-tongues may be regulated very accurately by means of the regulating-screws 248.

*The printer.*—One of the printers constructed according to this invention is shown in detail in Figs. 29 to 44, inclusive, in which 264 represents the printer-frame, the front portion 265 of which is provided with the upwardly-extending brackets 266, to the upper faces of which is secured the plate 267. Just in the rear of one of these brackets is an upright 268, and in the upper end of this upright is journaled one end of a shaft 269, preferably triangular in cross-section for a part of its length and circular in cross-section, as at 270, for the rest of its length. The other end of the shaft 269 is journaled in a bracket 271. Upon the triangular portion of this shaft 269 the printer-carriage travels and is supported, the said carriage comprising, among other parts, a thin metal bar 272, preferably of aluminium, to which is secured two hanger-supports 273, having journaled in their upper ends the ends of a sleeve 274, having a triangular bore and adapted to slide on the triangular portion of the shaft 269. Mounted fast upon the center of this sleeve 274 is a roller 275, having a roughened periphery, which is adapted to engage the periphery of a small roller 276, mounted above it on a shaft 277, the said roller 276 turning on the said shaft between two adjustable collars 278, by which it is held from moving laterally. The ends of the shaft 277 are bolted, as at 279, to the upper ends of two curved uprights 280, secured to the ends of the carriage-bar 272. This carriage-bar travels along over the top of a horizontal bar 281, secured to the printer-frame, and is held in a straight course by two small rollers 282, which engage the sides of the bar 281, the said rollers being secured in the supports 283, carried on each side of the carriage-bar.

284 284 represent two curved paper-guides, adjustably secured at their upper ends to the shaft 277.

The paper 285, upon which the characters are printed, is carried by the carriage in the following manner: The carriage is provided with a guide-frame consisting of two depending rods 286, secured at their upper ends to the carriage-bar 272 and having their lower ends joined by the horizontal member 287, which latter is provided with two adjustable paper-guides 288. The edges of the paper pass through the guides 288, while the center of the sheet is held between the rollers 275 and 276. The paper-guides 288 consist each of a metal plate bent back upon itself, forming two lips, between which the paper is held, as shown most clearly in Fig. 35, and provided with the lugs 289, which engage the lower member 287 of the guide-frame and are held fast thereto by the set-screws 290. It has been found that by thus supporting the sheet at a central point, as between the rollers 275 and 276, and providing the side guides 288 below a much more perfect alinement of the printed characters may be had than by the ordinary way of employing two cylinders that extend across the sheet or by employing two sets of rollers at the edges of the paper. The paper thus held upon the carriage passes beneath the type-wheel 140, which is mounted upon the shaft 141, journaled in the uprights 291 and 292. The shaft 141 is driven at a constant speed and regulated by the synchronizing mechanism herein described, being connected to the source of power through the arm 142, secured to the end of the type-wheel shaft, as hereinbefore described, or in any other suitable manner.

In order to prevent blurring of the characters, as well as to prevent the speed of the shaft 141 from being disturbed by the blows of the platen, the type-wheel is mounted upon the said shaft and driven in the following way: The type-wheel is provided with a sleeve-hub 293, (see Fig. 40,) which is loosely mounted upon a sleeve 294, secured fast on the said shaft and having a disk 295 near the face of the type-wheel. This disk is provided with a plurality of apertures 296, through one of which passes a screw 297, located in the path of a lug 298 on the type-wheel. A coil-spring 299 is secured at its outer end to the type-wheel, as by screw 300, and at its inner end to the sleeve 294 and brings the lug 298 of the type-wheel into engagement with the screw 297, so that when the type-wheel is struck by the platen it may momentarily pause in order to allow a clear impression of the type to be made upon the paper, when it is quickly returned to its proper position by the said spring. The tension of the spring 299 may be varied by inserting the screw 297 in different holes in the disk 295.

301 301 indicate the ink-rollers, resting upon the periphery of the type-wheel and rotatably mounted in the forks 302. These forks are provided with lugs 303, which are carried in the oblique slots 304 of the supporting-bracket 305, secured to the upright 292. (See Fig. 29.)

In order to prevent the paper in proximity to the type-wheel from being deranged or flying up, a spring-retaining strip 306 is secured, as at 307, to the plate 267 and provided with adjusting-screws 308. The strip 306 is bifurcated, as at 309, the bifurcations passing on each side of the type-wheel, as shown. The tension of this part of the strip against the paper is regulated by the screw 310, carried in a bracket 311, secured to the upright 292.

312 indicates the printing hammer or platen, pivotally supported, as at 313, in a frame 314, which latter is secured to a support 315, bolted to the front of the printer-frame. (See Fig. 32.) The platen is provided with the depending metallic arm 316, which is located near the pole of an electromagnet 317, secured to the frame 314. This depending arm 316 is provided with the contact-spring 318, which when the magnet 317 attracts the arm 316 will make contact with the contact-screw 319, which completes an electric circuit, hereinafter described, the screw 319 being carried by and insulated from the support 315. The throw of the arm 316 is limited by the screw 320. It will thus be seen that the action of the printer-magnet 317 is twofold. At each time that it is excited it attracts the arm 316, which causes the platen to strike the paper and print a character, and at the same time completes an electric circuit through the contact 319. By closing this circuit 319 several things are accomplished. It actuates a relay that breaks the circuit through the printer-magnet and causes the platen to return to its initial position, while at the same time actuating other relay-magnets which cause the paper to space up and the tongue of the carriage-returning relay or back relay to be carried back, all of which will be fully described hereinafter in the description of the operation of the machine. The contact-spring 318 also has a twofold function. Besides completing the electric circuit above described, the elasticity of the spring causes the hammer to bound back from the type-wheel when the magnet 317 becomes deënergized much quicker than it would were the spring not provided.

Motion is imparted to the printer-carriage, by which the paper is caused to travel beneath the type-wheel in a transverse direction, in the following way: A cord or chain 321 is secured at one end to a hook 322 on the printer-carriage and passes once and a half around the periphery of a wheel 323, and thence around the wheel 324, back to a hook 325, secured to the other end of the carriage-bar, the said cord or chain having the spring 326 inserted in its length. The annular flanges 327 (see Fig. 42) on the wheel 323 keep the cord or chain in place. This wheel 323 is provided with a sleeve-hub 328, which is loosely mounted on a shaft 329, revolubly journaled at one end in an arm 330 of the printer-frame and at the other end in the bracket 331. Within the wheel 323 is a spiral spring 332, made fast at one end, as at 333, to the sleeve-hub 328 and secured at its outer end to a pin 334, secured fast to the frame-arm 330. A disk 335, mounted upon the wheel-hub, retains the spring 332 in position. The wheel 323 is driven through the medium of a novel form of clutch, by which when the said wheel has been rotated any desired distance and the spring 332 wound up to a corresponding extent the wheel may be released and driven by the spring in an opposite direction, which will return the carriage to the beginning of a line, as will hereinafter be explained. This clutch is shown most clearly in Fig. 42, and comprises, among other parts, a longitudinally-channeled bar 336, mounted at its center fast upon a sleeve 337, which is in turn mounted fast upon the shaft 329. In the channel of each of the arms 338 of this bar 336 is an arm 339, having at its upper end a series of ratchet-teeth 340 and pivoted at its lower end to the bar 336, as at 341. The teeth 340 of these pivoted arms are normally held by the springs 342 into engagement with a circular row of ratchet-teeth 343 on the face of the wheel 323. Each of the pivoted arms 339 carries at its head a screw 344, which passes through the back of the arm in which the pivoted arm is mounted and through a bar 345, loosely mounted at its center upon the sleeve 337, the heads of the screws 344 engaging the back of this bar 345, which is secured fast, as at 346, to the head 347 of an iron plunger-core 348, which is also loosely mounted upon the sleeve 337. The core 348 passes into the bore of a magnet-coil or bobbin 349, and into the other end of this bobbin passes an iron core 350, mounted loose on the shaft 329 and provided with a flange or head 351, which screws into one end of an iron casing or shell 352, which incloses the magnet-coil and extends over the end of the same, as at 353, the end of the magnet-coil next to the clutch-arms being covered by a small German-silver disk 354. The head 351 of the fixed core is secured to an insulating-base 355. The said magnet-coil, shell, and cores constitute an iron-clad-pot magnet 356, the same in principle as those described with reference to the keyboard. This magnet 356 will be designated the "back" magnet.

The end of the shaft 329 opposite the wheel 323 is journaled, as above stated, to rotate in a bracket 331, and carries close to one side of the bracket a ratchet-wheel 357, keyed to the said shaft and shown most clearly in Figs. 31 and 38.

Just outside of the ratchet-wheel 357 and loosely mounted on the end of the shaft 329 is a collar or hub 358, having four arms 359, 360, 361, and 362. The arm 360 carries a pawl 363, held in engagement with the teeth of the ratchet-wheel 357 by means of a spring 364, carried upon the upper end of the arm 361, the said spring engaging a pin 365, carried by the upper curved end of the pawl. The end of the arm 359 is pivotally connected to a link 366, which is in turn pivotally secured to the upper end of the core 367 of the spacer-magnet 368. This core is provided with a flanged head or cap 369, below which the core is cylindrical, as at 370, for a short distance, then conical, as at 371, when it is turned down to a small stem 372. This magnet has an outer iron shell 373, held fast at its upper end in the split-ring portion 374 of the bracket 331, and this shell incloses a magnet-coil 375, wound upon an iron tube 376, into which the plunger-core 367 extends. An iron core 377, having a conical interior and a flanged head at one end, extends into the tube 376 to receive the conical portion of the plunger-core, the head of said core 377 being screwed into the lower end of the magnet-shell. A cap 378 of insulation is secured to the bottom of the magnet and carries the contact-pieces or binding-screws 379. A milled nut 380 is screwed on the lower end of the stem of the plunger and acts to limit its upward movement. Over the insulation covering the upper end of the magnet-coil is a small disk of German silver 381. The magnet-shell extends at its upper end, as shown, beyond the end of the coil-bobbin and in connection with the cap 369 secures a much more perfect magnetic circuit and a much greater initial pull than could be obtained with the ordinary form of electromagnet. A coil-spring 381 is secured at one end of the arm 362 and at the other to the bracket 331 and normally holds the arm 359 up into engagement with a stop-screw 382, mounted on the arm 383 of the bracket. To the arm 361 is secured a metal contact-spring 384, the upper end of which is adapted, when the magnet 368 is energized, to engage the end of a contact-screw 385, carried in a split block 386, mounted upon and insulated from the upright 387. The ratchet 357 is prevented from moving in the wrong direction by a pawl 388 behind the spring 381 and is held in engagement with the ratchet-teeth by the spring 389. This electromagnetically-operated ratchet-and-pawl mechanism comprises the means by which the printer-carriage is moved laterally to produce the spaces, the action of this mechanism being as follows: Immediately after a letter has been printed the spacer-magnet 368 becomes energized and draws in its plunger 367. This causes the rocking arm 360 to move forward, and this in turn causes the pawl 363 to rotate the ratchet a corresponding distance—that is, a distance equal to the distance from the point of one ratchet-tooth to the point of the next, which will correspond to the distance of a space upon the paper. The ratchet being fast on the shaft 329 causes the said shaft to rotate to the same extent, and as this shaft carries the clutch-arms 338, which rotate with it, the latter will transmit their motion through the tooth-clutch connection to the wheel 323. This wheel 323 being thus caused to rotate a certain distance will cause the carriage to travel a corresponding distance, being connected thereto by the cord or chain 321, as described, this distance being also, as described, that of a space. This step-by-step movement of the carriage may be kept up until it is desired to return it or allow it to travel back in the opposite direction, as when the end of a line is reached. This is accomplished by energizing the back magnet 356, which is caused thereby to draw in its plunger-core 348, which being attached to the bar 345 will cause it to act through the screws 344 and pull the arms 340 out of engagement with the teeth 343 of the wheel 323. The magnet-core 351 is prevented from sliding laterally on the shaft 329 by the sleeve 337, against which the end of the core 351 abuts. This wheel 323 being thus disengaged will be rotated backward under the action of the spring 332 until the carriage is returned to the beginning of a new line. A lug 459 carried by the wheel 323 limits its backward motion by striking a metal contact-piece 460, mounted on the stud 461, bringing it into engagement with a contact-screw 462, carried by the metal plate 463, mounted on and insulated from the stud 461. This completes an electric circuit through the contacts 460 and 462 and causes the carriage to automatically space up at the beginning of each line, as will be hereinafter described.

The paper is fed to the machine and new lines of characters are formed by imparting rotary motion to the shaft 269, through which rotary motion is imparted to the roughened wheel 275. In order to impart this rotary motion to the said roller and rod, the electromagnetically-operating ratchet-and-pawl liner mechanism shown on the left of the printer in Figs. 29, 30, and 31 and in detail in Figs. 36 and 37 is employed. The end of the rod 269 which passes through the frame 271 carries a ratchet-wheel 389, rigidly mounted thereon. This ratchet is actuated by a pawl 390, (see Fig. 36,) which is pivoted upon a rocking arm 391, carried upon a collar 392. The said pawl is held in engagement with the teeth of the ratchet by means of a spring 393, carried by the rocking arm 394, also mounted upon the collar 392. To an arm 395, also carried by the collar 392, is pivotally secured a link 396, which is again pivoted at its lower end to the upper end of the plunger-core 397 of the liner-magnet 398. This plunger-core 397 is similar to the plunger-core 367 of the spacer-magnet, being cylindrical for a portion of its length, then conical, then terminating in the pin 399. The liner-magnet 398 is also similar in all of its essentials to the spacer-magnet, having the hollow iron core 400 surrounded by the iron sleeve 401, upon which the magnet-coil 402 is wound, and provided with an exterior iron shell 403, into the lower end of which is screwed the head of the core 400 and upon the bottom of which is attached an insulating-cap 404. A milled nut 405 is screwed on the lower end of the pin 399 and limits the upward movement of the plunger. Above the upper end of the coil-bobbin is inserted a small disk, of German silver, 406, and around the upper end of the shell 403 is a bronze ring 407, into which the flanged head 408 of the plunger is drawn when the magnet is excited. The plunger is held up in its normal position by means of a spring 409, secured at one end to the arm 394 and at its other end to the upright frame. The outer shell 403 of this magnet is held fast within the split collar 410 and made fast to the printer-frame. A metallic contact-spring 411 is secured fast to the arm 391 and is adapted when the liner-magnet is energized to strike the point of the contact-screw 412, mounted in a split block 413, secured to and insulated from the upper end of an upright 414. In order to prevent retrograde motion of the ratchet-wheel, a secondary pawl 415 is pivoted to the upright frame, being held in engagement with the ratchet by the spring 416. Thus it will be seen that at each time the liner-magnet is excited the ratchet-wheel will be rotated the distance of one tooth to the next and will thus rotate the roughened roller 275 a corresponding distance. This will cause the paper in the printer to feed up to a new line. At each time that this occurs the contact-spring 411 strikes the contact-screw 412 and completes an electric circuit by which the liner mechanism is reset, as will hereinafter be described.

A bar 465 is adjustably secured at its inner ends, as at 466, to the paper-guide rods 286 and carries a series of metal rollers 467, mounted in the metal spring-pieces 468, secured to and insulated from the bar 465, as at 469. (See Figs. 30 and 32.) These rollers 467 normally make contact with one side of the paper 285 and press it into engagement with a metal roller 470, mounted on the rod 287. The paper is provided at suitable intervals with transverse rows of perforations 471, (see Fig. 29,) and the rollers 467 are so spaced that when the paper has been fed to the printer until the perforations are brought beneath these rollers they will make contact through the perforations with the roller 470 and complete an electric circuit to the liner-magnet and cause the paper to automatically feed up until the paper having the message printed upon it has passed to a position to be torn off and the next succeeding sheet placed in position to receive the next message or continuation of the former one.

A plate 482 is secured to the printer-frame and carries upon its back a frame 483, the latter frame carrying the resistance-coils. (Represented in diagram in Fig. 43 and numbered 451, 454, 476, 484, and 477.)

Electric currents are allowed to pass to the various electromagnetic parts of the printer—that is to say, to the printer, liner, spacer, and back magnets—at such times as to cause them to properly perform their functions relative to the printing of each character by means of a circuit-combining device operated in conjunction with a system of selecting and distributing relays.

The circuit-combining mechanism or combination device for effecting the above is mounted on the same shaft 141 with the type-wheel and consists, among other parts, of a cylindrical body 417, having three rings of segments 418, 419, and 420, all of these segments being mounted in insulation, but electrically connected together in combinations, as hereinafter described, and shown most clearly in the diagram of the printer-circuits, Fig. 43. This cylinder 418 is rigidly secured to a sleeve 421, which is loosely mounted on the shaft 141 and is held from rotating by the arm 422, held between the nuts 423, the said arm being provided near one end with a slot 424, through which passes a set-screw 425, engaging a stationary upright 426. By means of this arm the angular position of the cylinder 417 may be adjusted without interfering with the rotation of the shaft 141. 427, 428, and 429 represent contact-rollers, which are adapted to pass over and in contact with the rings of segments 418, 419, and 420, respectively, the said rollers being mounted in the spring-supports 430, each of which is secured to a block of insulating material 431, secured fast to one end of an arm 432, which is secured at its center to a collar 433, made fast upon the shaft 141 by means of a set-screw 434, the said arm carrying at its end opposite the contact-rollers a counterbalance-weight 435 to offset the weight of the said rollers and their supports. These contact-rollers being thus driven by the shaft 141 will pass around the periphery of the cylinder 417 at a constant speed and over and in contact with the segments of the said cylinder. The construction and electrical connections of this combination and distribution device, as well as its operation, will be more particularly described hereinafter with reference to the diagram of the printer-circuits, Fig. 43.

Mounted upon the printer-frame are two sets of distributing polarized relays, one set comprising relays 436 and 437 and the other set the relays 438, 439, and 440. These relays are similar to each other in construction, with the exception of relay 440, which differs slightly from the rest in that its tongue is provided with an insulated metal contact-piece 479. Each one of these relays comprises two magnet-coils mounted upon a magnetic iron casting 341, which is curved at its lower extremity, as shown, and passes upward to a lug 442, where it is secured to the printer-frame, and terminates in the upright 443. This upright is provided with a longitudinal slot 444, in which the tongues of the relays are pivoted, so that they may have side-to-side motion in a horizontal plane. The contacts between which the tongues of the relays vibrate are carried in the brass uprights 445 and 446, the latter being insulated from the former, as at 447.

In order to describe the complete operation of the printer, which includes the method of combining the electric circuits and the distribution of the electric current and also in order to understand the electrical connections of the various parts of the printer, reference will be had particularly to Figs. 43 and 44 first as to the method of combining the local printer-circuits through the selecting-relays. It was shown in the description of Fig. 1 relative to the process of transmitting and receiving a message that the receiving-sunflower was divided up into a number of separate groups of segments, and each group operating a printer was composed of, for example, eleven segments, and that each of these groups of eleven segments were connected to a corresponding group of eleven local selecting-relays, and, further, that for each signal received upon any group of segments two of these eleven selecting-relays acted to partly close two circuits, it being assumed that two line impulses are suppressed for each signal, though this number may be varied, as will be hereinafter shown. Now if it be assumed that these eleven circuits closed by the local selecting-relays are represented by a b c d e f g h i j k they may be combined two-and-two in forty-five different ways without counting contiguous combinations—that is to say, these circuits may be connected together in the following combinations: a c, a d, a e, a f, a g, a h, a i, a j, a k; b d, b e, b f, b g, b h, b i, b j, b k; c e, c f, c g, and so on through the series, getting forty-five combinations without counting combinations of circuits represented by contiguous letters of the alphabet—such as a b, b c, c d, &c. The completion of these local circuits in the above combinations is accomplished by so distributing the segments of the rings 418 and 419 that when the contact-makers arrive simultaneously upon two segments corresponding to the combination of the signal received a circuit will be established through the contact-makers corresponding to that combination, the completion of said circuit either causing the printer to print a character or operating some of the electromagnetic printer mechanism, such as the spacer, liner, or back magnets.

Fig. 45 is a diagram which represents the system of combinations very clearly. The small letters along the top and down the left-hand margin of the diagram represent the local circuits closed by the selecting-relay tongues, while the characters in capitals and other signs represent what character or signal will be printed or pass to the printer for each combination of circuits. Thus, for example, if two of the selecting-relays act to close circuits a and c the printer will print "X;" if e and i, the printer will print "M;" if k and b, the paper in the printer will be fed up to a new line, and so on for each combination. Based upon this system of combinations the segments composing the rings 418 and 419 of the combination device are divided into twelve groups, the first group or set comprising those represented by a, the second set those represented by b, the third set those represented by c, and so on through the series to the odd segments m.

It will be seen by referring to Figs. 43 and 44 that the ring 418 of the circuit-combining device is composed of twenty-four insulated metallic segments arranged in the following order: c, d, e, f, g, f, e, i, j, h, i, h, j, e, h, g, f, i, h, g, k, j, k, and m, that the ring 419 is composed of twenty insulated metallic segments arranged in the following order: a d b d e f a c d j b d i a c e f g h m, and the ring 420 of eight insulated metal segments arranged in the following order: n o p o q r s o. The breadth of each of these segments on any of the three rings is a multiple of one forty-fourth of the total circumference of that ring. All of the segments represented by the same letters in each of these rings are electrically connected together, as shown, while the segments of the ring 418 are electrically connected, respectively, to those indicated by the same letters on the ring 419, only a few of the segments being actually shown in the diagram as so connected, as this is believed to be a sufficient number to illustrate the principle of the idea without rendering the drawings difficult to understand by reason of a multiplicity of connections. We therefore have, as above described, twelve sets of segments distributed between the rings 418 and 419, the first set comprising those segments represented by a, the second set those represented by b, the third set those represented by c, and so on through the series to the set m. Each separate set of these segments, except the set m, is electrically connected to the forward contact-post of a corresponding receiving selecting polarized relay, there being a bank of eleven such relays 24 for each printer. For the reason hereinbefore given only a limited number of segments are shown connected, the rest being connected in practice to their corresponding relays in a similar way. The relays 24 of each bank of selecting-relays are all mounted upon a magnetized cast-iron base 448 and have their tongues pivoted in a common frame 449. The contact-makers 427, 428, and 429 occupy corresponding positions on the rings and rotate together, the contact-makers 428 and 429 being electrically connected together, while the contact-maker 427 is connected to the negative pole of the local current-supply, being the frame of the printer through which all of its return-circuits pass. The positive pole of the local current-supply is indicated at the binding-post 450, from which the wires lead to the various printer-circuits. The distribution of the segments of the rings 418, 419, and 420 and the position that they occupy relative to the characters on the type-wheel is most clearly shown by the diagram Fig. 44. From this diagram it will be seen that for each character on the type-wheel there is a corresponding combination between the said segments—that is to say, the letter "X," for example, can be printed only when the contact-makers 427, 428, and 429 pass simultaneously over the segments c, a, and o, the letter "Z" when the contact-makers pass simultaneously over the segments f, a, and o, a comma when the contact-makers pass simultaneously over the segments h, j, and o, the numeral "4," for example, when the contact-makers pass simultaneously over the segments k, e, and o, and so on. The spaces on the type-wheel indicated by Sp, Li, Bk, and Bl correspond to combinations of segments on the rings 418, 419, and 420, which operate the spacer, liner, back, and blank-paper feed-magnets, respectively. The arranging and grouping of these segments may be varied, if other combinations are found be to better, without departing from the spirit of my invention. At the instants that the electric circuits are completed, which have previously been partially completed by the tongues of relays 24 between the respective combinations of segments above described by the reception of telegraphic signals, the platen will be caused to strike the paper in front of that character on the type-wheel which at that instant corresponds to the combination of circuits established. As each of the segments of this combination device is a multiple of one forty-fourth of the circumference of the cylinder upon which they are mounted, they may be cut so as to leave forty-four metallic surfaces exposed to the contact-makers, causing the outer surface of the cylinder to have the appearance of a commutator having segments of a uniform width.

*The operation of the printer.*—The operation of the printer in printing these characters is as follows, reference being had particularly to Figs. 43 and 44: The relays 24, constituting a bank of local selecting-relays, normally receive electric impulses of alternate polarity—that is to say, when no signal is received relay number one, for example, would always receive from the receiving-current distributer or sunflower a negative impulse, number two a positive impulse, and so on, the evenly-numbered relays receiving positive impulses, while the relays having odd numbers receive negative impulses. These relays are, however, so wound that the impulses passing as above described send all of their tongues against their back-stop contacts, and thus normally keep the local printer-circuits open; but if a signal is received as described with reference to Fig. 1—as, for example, a signal represented by the suppression of the first and third impulses of a group of line impulses corresponding to the printer now being described—the first and third of these selecting-relays would not receive their normal impulses, but impulses of opposite polarity. Hence their tongues would be sent against their forward contacts. Therefore for each telegraphic signal that is received upon the selecting-relays 24 two of these relays, which are non-adjacent with respect to the order in which they are acted upon by the receiving-current, receive impulses of opposite polarity to their normal impulses, owing to the fact that the tongue of the line-relay when a line impulse is suppressed remains against the contact to which it was sent by the impulse next preceding the suppressed one, causing the relays thus acted upon to send their tongues against their forward contacts. Let it be assumed, for example, that the signal received is the letter "X"—that is, the one which we assumed, according to Fig. 1, to be transmitted by operating the keys of the keyboard connected to the first and third segments of the first group of transmitting sunflower-segments. The reception of this signal will cause the relays 24, having their forward contacts electrically connected, respectively, to segments $a$ and $c$ of the rings 418 and 419, to send their tongues against their forward contacts, and therefore when the contact-makers 427, 428, and 429, as shown in Fig. 43, arrive upon segments $a$, $c$, and $o$ an electric circuit will be completed which, beginning at the positive pole 450 of the local-current supply, passes through a suitable resistance 451, thence through the right-hand magnet-coil of the printer-relay 438 to the segment $o$ of the ring 420, thence through the contact-maker 429 to the contact-maker 428, through one of the segments $a$ of the ring 419 to the forward contact of the relay 24, connected to one of the segments $a$, thence through the tongue of this relay (it being assumed that the tongue is against its forward stop) to the frame 449 of the relays 24 to the tongue of the relay which has its forward contact connected to the segment $c$, thence through the contact of that relay to the segment $c$ of the ring 418, and out through the contact-maker 427 to the negative pole of the current-supply. The completion of this circuit will cause the tongue of the relay 438 to be sent against its forward or right-hand contact, which will complete a circuit 452, passing through the coil of the printer-magnet 317 and including the proper resistance 477. The printer-magnet thus becoming energized will attract the arm 316 and cause the contact-spring 318 to be sent against the contact-stop 319, the printing hammer or platen at the same time striking the paper and bringing it in contact with the type-wheel. When the contact 318 thus engages the stop 319, it completes the circuit 453, which, beginning at the positive pole of the current-supply, passes through a suitable resistance 454, and thence through the left-hand magnet-coil of the relay 438, causing this relay to send its tongue against the left-hand or back-stop contact, which, as will be seen, breaks the circuit through the printer-magnet, thus allowing the platen of the printer to return to its initial position, which at the same time will break the circuit at 319. When the contact-spring 318 completes the circuit 453, besides breaking the printer-magnet circuit it completes a circuit 455 through the right-hand coil of the spacer-relay 436, causing the said relay to send its tongue against its right-hand or forward contact, and this completes a circuit 456, including the resistance 484, through the coil of the spacer-magnet 368, causing it to draw in its core and send its contact-spring 384 against the contact-post 385. When this contact is thus made at 385, a circuit 457 is completed through the left-hand coil of the spacer-relay, causing that relay to send its tongue against its left-hand or back-stop contact, thereby breaking the circuit 456 and de-energizing the spacer-magnet 368. Thus we see that for each character printed the printer and spacer magnets are automatically excited, sending the carriage forward the distance of one space after the printing of each character. If it is desired, however, that the spaces be not made automatically, or, in other words, if the operator at the transmitter wishes to cause the carriage of the printer to space up, he would operate the key upon his keyboard, which would transmit the signal to space, from which it may be seen by referring to the diagram Fig. 44 that the receiving selecting-relays acted upon by the reception of such a signal would be the relays having their contacts connected to segments $g b$ of the rings 418 and 419. If such a signal be transmitted, when the contact-makers 427, 428, and 429 arrive upon segments $g$, $b$, and $q$ a circuit will be completed, which, beginning at the positive pole of the source of local-current supply, passes through the resistance 454, through the right-hand magnet-coil of the spacer-relay 436, thence to the segment $q$ of the ring 420, through the contact-maker 429 to a contact-maker 428, through the segment $b$, (it being assumed that the revolving contact-makers are resting upon these segments,) and thence into the forward contact of the relay connected to that segment, thence to the tongue and through the forward contact of the relay connected to the segment $g$ of the ring 418, and out through the contact 427. This circuit, it will be seen, will cause the spacer-relay 336 to send its tongue against its forward contact, completing the circuit 456 through the spacer-magnet coil 368, which will cause that magnet to draw in its plunger and actuate the spacing mechanism, and at the same time sending the contact-spring 384 against the contact-post 385, which completes the circuit 457 through the left-hand coil of the relay 436, thus causing the said relay to break the circuit 456 at its forward contact and restore the spacer-magnet plunger to its initial position. When the carriage has traveled the length of the line or when the operator desires to return the carriage to the beginning of a new line, a signal, which we will designate the "back" signal, is transmitted. This signal will be received upon the receiving-relays, having their forward contacts connected to the segments $k$ $d$ of the rings 418 and 419, and when this signal is received and the contact-makers 427, 428, and 429 arrive simultaneously upon the segments $k$, $d$, and $s$ a circuit will be made complete through the back magnet 356, which operates the carriage-return mechanism, and which circuit may be traced as follows: Beginning at the positive pole of the source of local-current supply this circuit passes through the suitable resistance 454, through the right-hand coil of the back relay 437, thence to the segment $s$ of the ring 420, through the contact-maker 429, then into the contact-maker 428, and from there through the segment $d$ to the forward contact of the selecting-relay connected to that segment, thence through that relay tongue and frame to the relay-tongue and contact thereof connected to the segment $k$ of the ring 418, and thence out through the contact-maker 427. This circuit will cause the tongue of the back relay 437 to be set against its forward contact, and thus complete a circuit 458 through the coil of the back magnet 356, causing it to draw in its core and separate its clutch 338 from the wheel 323, thus releasing the wheel and allowing it to return to its initial position, which allows the printer-carriage to travel back to the beginning of the line. A lug 459, carried by this wheel, will be brought into engagement with a contact-spring 460, mounted upon a metal post 461, and, striking this contact-spring, the said lug will drive it into engagement with a contact-screw 462, carried by a metal plate 463, mounted upon and insulated from the post 461. When the contact-spring 460 is thus brought into engagement with the contact-screw 462, a circuit 464 will be completed, which may be traced from the positive pole of the local source of current-supply through the resistance 454, through the left-hand coil of the back relay 437, and thence through wires 455 464 to the metal plate 463, and thence through contacts 462 and 460 to the frame of the machine. The completion of this last circuit, it will be seen, causes the tongue of the back relay to be sent against its back-stop or left-hand contact, thus breaking the circuit at its forward contact through the coil of the back magnet 356 and allowing the clutch 338 to again engage the wheel 323. Besides causing the clutch to again engage the wheel 323 by the completion of a circuit 464 through the contacts 460 and 462 this at the same time completes a circuit through the right-hand magnet-coil of the spacer-relay, causing it to send its tongue against its forward contact, and thus complete the circuit 456 through the spacer-magnet 368, causing the carriage to space up one space at the beginning of each line. When, as before described, this circuit is made complete through the spacer-magnet coil 368, it will complete the circuit 457 through the contacts 384 and 385 and through the left-hand magnet-coil of the spacer-relay, thus causing the said relay to break the circuit through the spacer-magnet coil and allow its plunger to be returned to its normal position, which breaks the circuit 457 at the contacts 384 and 385.

In case the operator at the transmitter fails to operate the back key when the printer-carriage has reached the end of line the carriage will be returned to the beginning of a line automatically. This is accomplished in the following way: The wheel 323 carries upon its hub a lug 472, which when the wheel 323 is rotated far enough to bring the carriage to the end of a line will be brought into engagement with the contact-spring 473. This completes a circuit 474, which passes through the right-hand coil of the back relay 437, causing it to send its tongue against its forward contact and complete the back-magnet circuit 458. The rest of the operation of sending the carriage back is the same as described when the back signal is sent.

The operation of the mechanism for forming new lines is as follows: The operator at the transmitter desiring to form a new line operates the key which transmits the line-signal. Referring to Fig. 44, it will be seen that the transmission of such a signal will require the combinations of segments $k$ $b$ $r$, or, in other words, the receiving selecting-relays 24, acted upon by the reception of such a signal, would be those having their contacts connected to segments $k$ $b$ of the rings 418 and 419. If such a signal be transmitted, the contact-makers 427, 428, and 429 when arriving upon segments $k$, $b$, and $r$ simultaneously will complete a circuit, which, beginning at the positive pole of the local-current supply, passes through the resistance 454, through the right-hand magnet-coil of the liner-relay 439, thence into the segment $r$ of the ring 420, through the contact-maker 429 to contact-maker 428, and from there into the segment $b$ of ring 419, thence through the contact and tongue of the selecting-relay connected to segment $b$, through the tongue and forward contact of the selecting-relay connected to segment *k* of ring 418, through that segment and out through the contact-maker 427 to the negative pole of the current-supply. The completion of this circuit causes the liner-relay 439 to send its tongue against its forward contact, which completes the circuit 475 through the liner-magnet coil 398 and suitable resistance 476. When the liner-magnet 398 thus becomes energized, it draws in its core and causes the paper to be fed up for a new line and at the same time sends the contact-spring 411 against the contact 412, completing the circuit 478 through the left-hand magnet-coil of the liner-relay 439, causing its tongue to break the liner-magnet circuit 475 at its forward contact, which allows the liner-magnet mechanism to return to its initial position.

The operation of the device for feeding the blank sheets of paper into position to receive a message is as follows: The operator at the transmitter operates the key indicated "Blank," which sends to the printer a signal which will cause the printer to feed up the blank sheet until it is in the proper position to receive the message and then automatically stop. The combination of selecting-relays 24 acted upon by this signal are those having their forward contacts connected to segments *d* and *f* of the rings 418 and 419, the contact-makers 427, 428, and 429 passing simultaneously over the combination *d f p* of the segments, (see Fig. 44,) where "B" on the type-wheel will be seen to correspond to the above combination. When this signal is thus received, a circuit will be completed which may be traced from the positive pole 450 of the local current-supply, through the resistance 454, and thence through the right-hand coil of the blank-relay 440 to the segment *p* of the ring 420, and thence through the contact-maker 429 to the contact-maker 428, through the segment *d*, and then through the tongue and forward contact of the receiving-relay 24 connected to the segment *d*, through the tongue and forward contact of the relay 24 connected to the segment *f*, thence into that segment of the ring 418, and out through the contact-maker 427 to the negative pole of the local current-supply. The completion of this circuit causes the blank-relay 440 to send its tongue against its forward or right-hand contact, which is connected, as will be seen, to segment *n* of the ring 420, the portion of the relay-tongue thus driven against the forward contact being insulated from the rest of the tongue, as at 479, and connected by the wire 480 to the circuit which passes through the right-hand magnet-coil of the liner-relay 439, so that as long as this signal is sent once in every revolution of the contact-makers 427, 428, and 429 as they come into engagement with segments *m* and *n* a current will be sent through the right-hand coil of the liner-relay 439, causing it to successively complete the circuit through the liner-magnet coil 398, and thus cause the paper to be fed up in the printer line by line until the contact-rollers 467 meet the roller 470 through the perforations in the paper. When this takes place, a circuit 481 is completed, which will be seen to pass through the left-hand magnet-coil of the blank-relay 440, causing it to send its tongue against its back stop and break the circuit to the liner-magnet, and thus automatically stop the paper feeding. Instead of operating one key at a time at the keyboard there are some that may be operated two at one time without interfering with any of the other signals. Thus, for example, if it is desired to transmit the word "The" the "T" and "H" keys may be operated at the same time. By referring to the diagram Fig. 45 it may be readily seen how this is accomplished. The combination necessary to print "T" is "g d," while the combination for "H" is "d i." With the four letters "g d d i" no combination can be formed which will print any other letter, "g i" being the only combination that can be formed besides "g d" and "d i." Other combinations which may be printed by operating two keys at once are "T Sp," "E Sp," "D Sp," "L i" and "B k" and "A N."

In operating the printer it is essential that the contact-makers of the combination device should occupy certain positions relative to the trailer of the receiving-sunflower. These contact-makers are set so as to pass over approximately the middle of segments *m m* and *n* at the same time that the trailer is passing over the sixth segment of the group of sunflower-segments operating this particular printer. (See the diagram Fig. 44.) It will be seen from an inspection of this diagram that the segments are so arranged on the combination device that when the receiving-trailer is passing over the first sunflower-segments of the group the contact-makers of the combination device will be passing over segments connected to the contacts of the selecting-relays actuated from the last segments of the group of sunflower-segments, and when the said contact-makers are passing over the segments of the combination device connected to the contacts of the selecting-relays actuated by the first segments of the group of sunflower-segments the trailer will be passing over the last of the said sunflower-segments. By this arrangement the tongues of any selecting-relays which have been set for the printing of a letter will not be returned to their normal positions before the combination contact-makers arrive upon the proper segments to print the letter, and at the same time the combination contact-makers will not arrive upon combinations formed by the combination of the tongues acting for this letter with those of those of the preceding letter before the trailer of the sunflower has had an opportunity to return the tongues of the selecting-relays to their normal positions.

*Duplexing.*—In describing the principle of transmitting and receiving messages according to this invention reference was had particularly to the diagram Fig. 1, where is shown a simple main line connecting two terminal stations, one a transmitting and the other a receiving station. By duplexing such a line the total number of messages which may be transmitted over it at the same time may be doubled, thus rendering the line shown in Fig. 1 octoplex or capable of transmitting eight messages at the same time. This invention therefore embodies an improved method of duplexing a line, such as is used in this system, by which the above results may be accomplished in the most satisfactory manner, the principle of the method being shown in the diagram Fig. 15, where the apparatus and connections at each end of the line are shown in duplicate. At each of the stations, in addition to the regular transmitting and receiving apparatus above described, but not shown in Fig. 15, is a current-generator 1, normally delivering its current from one pole to the main line 2 through the contact 3 and tongue of a transmitter and through the coils of a differentially wound or connected line receiving-relay 26 to 44. The other pole of each generator is connected through the resistance $t$ to the earth. At each station is an artificial line $w$, having resistances $x$, capacity $z$, and self-induction $y$. The tongue of the transmitter 4 at each station is connected through a resistance $u$ and self-induction $v$ to the earth, said resistance $u$ and self-induction $v$ at each station being adjusted until they are equal, respectively, to the combined resistance and self-induction of the generator and resistance $t$ at their respective stations. The resistance, capacity, and self-induction of the artificial line at both ends of the real line 2 are adjusted until the electrical properties of each artificial line are equal to that of the real line, including the self-induction and resistances at the distant end. When this is accomplished, the current from the generators at both ends of the line divides equally in the receiving line-relays 26 to 44, passing around both coils of each relay in opposite directions. The line receiving-relay at either end, therefore, will not be affected by the current from the generator at that end—that is to say, the receiving line-relay at either end is neutral to all signals transmitted from that end, but active for signals from the distant end. As the signals or messages are transmitted by causing the transmitters 4 to break the main-line circuit at their contacts 3, the balance or adjustment of the line would naturally be disturbed if it were not provided for. This disturbance is obviated by the introduction into the line at each time that it is broken by a transmitter of the resistance $u$ and self-induction $v$ to compensate for the resistance and self-induction of the generator and resistance $t$ at the end from which the signal is transmitted, the said resistance $u$ and self-induction $v$ being connected to the transmitter-hammer, and therefore connected into the line at each time that the hammer breaks the line at contact 3. In this way the electrical properties of the line remain practically unaltered, whether the tongue of the transmitter is in engagement with the contact 3 or the transmitter-hammer.

The principle of the invention is in no wise altered if for the differential method of duplexing above described the Wheatstone method is substituted, and provision is made for the introduction into the line of the resistance $u$ and self-induction $v$ at times when the line is broken, as above described.

*The printed telegram.*—A message printed upon a sheet according to this invention and ready to be delivered is shown in Figs. 46 and 47. The method adopted in printing these messages upon the sheets is to print the name and address of the person to whom the message is to be delivered upon the upper portion of the sheet, the message proper occurring several spaces below. The sheet is then folded twice, once as at 485 and again at 486, Fig. 46, leaving the name and address of the person to whom the message is to be delivered upon the outer face of the top fold. A sheet folded in this manner is then placed in a transparent envelop, (see Fig. 47,) with the name and address of the person to whom the message is to be delivered next to the outer face of the envelop, so that the name and address may be read through the envelop. This obviates the necessity of addressing envelops, saving thereby a great deal of time, labor, and expense which would necessarily be required in addressing them. These transparent envelops may be made of paraffin-paper or any other suitable material.

Envelops may be dispensed with entirely by folding the sheets as shown in Fig. 46 and sealing the ends, and in order to assist in opening the sheet when so sealed a line of perforations may be made across the folded sheet near each end thereof, when the ends may be readily torn off and the sheet opened.

Having thus fully described a commercial form of this invention, a few remarks will be made concerning the difference between this system and those telegraphs employing so-called "synchronously-operated step-by-step devices." This invention is in no sense a step-by-step system—the generators of the current are continuously rotating or operating, the current-distributers or sunflower devices are continuously rotating, and the printer type-wheel and circuit-combining device are continuously rotating, none of them having a step-by-step or intermittent motion.

With the continuously-operated system herein described the inertia of the parts is taken advantage of in obtaining synchronism, so that if the synchronizing-current is interrupted the synchronism will not be disturbed, whereas with the step-by-step systems the inertia is dispensed with, which renders impracticable the production of synchronous motion under any but the most favorable circumstances. There are, indeed, other differences between these two forms of telegraphs which will suggest themselves to those skilled in the art to which they relate.

It will also be stated in conclusion that while the system herein described is a commercially practicable one, yet there are many changes which may be made in the details of the invention without departing from the spirit thereof.

Having now particularly described and ascertained the nature of my said invention and in what manner the same is to be performed, I declare that what I claim is—

1. In a telegraphic circuit, a main-line conductor and electric generators delivering to said conductor periodically-varying electric currents, means for modifying for each signal a predetermined number of the impulses delivered to the line by any generator and means for preserving the electrical properties of the main line intact, substantially as described.

2. A telegraph system having a main-line conductor, generators delivering electric currents thereto, and means located at any station for disconnecting the generator at that station from the main line for predetermined lengths of time and substituting for the said generator and its local circuit, a circuit having subsantially the same electrical properties by which the electrical properties of the main line are preserved intact, substantially as described.

3. A telegraph-line, comprising a main-line conductor, a continuously-operating generator delivering to said line periodic impulses of an electric current, a contact located in the main line at a desired station, a transmitter located at the same station and adapted to break the main-line circuit through said contact for each signal transmitted, and a line having substantially the same electrical properties as said generator and its local circuit introduced into said main-line circuit at each time that the circuit is broken at said contact, substantially as described.

4. A telegraph-line comprising a main-line conductor, a continuously-operating generator delivering to said line impulses of an alternating electric current, a contact located in the main line at a desired station, a transmitter located at the same station and adapted to break the main-line circuit through said contact for each signal transmitted, and a line having substantially the same electrical properties as said generator and its local circuit introduced into said main-line circuit at each time that the circuit is broken at said contact, substantially as described.

5. A telegraph system having a main-line conductor, generators delivering electric currents thereto, and means located at any station for disconnecting the generator at that station from the main line for predetermined lengths of time and substituting for the said generator and its local circuit a circuit having substantially the same self-induction and resistance by which the electrical properties of the main line are preserved, substantially as described.

6. In a system of telegraphy, a main-line conductor, generators delivering to said conductor alternating electric currents, means for modifying for each signal a predetermined number of the wave impulses of the current produced by any generator and means for preserving the electrical properties of the main line, substantially as described.

7. In a system of telegraphy, a main-line conductor, generators delivering to said conductor alternating electric currents, means located at any station for suppressing a predetermined number of the impulses of any generator by disconnecting that generator from the main line and substituting for the said generator and its local circuit a circuit having substantially the same electrical properties as the said generator and its local circuit, by means of which the electrical properties of the main line are preserved, substantially as described.

8. In a system of telegraphy, the combination with a main-line conductor carrying periodically-varying electric impulses, transmitting apparatus located at different stations and adapted to suppress a determinate number of the said electric impulses to produce a signal, and receiving apparatus neutral to the signals produced by the transmitting apparatus located at the same station but operated by those transmitted from a distant station, substantially as described.

9. In a system of telegraphy, the combination with a main-line conductor carrying periodically-varying electric impulses, transmitting apparatus located at different stations and adapted to suppress a determinate number of the said electric impulses to produce a signal, and receiving apparatus operated by the current in the said line conductor and neutral to the signals produced by the transmitting apparatus located at the same station but operated by those transmitted from a distant station, substantially as described.

10. In a system of telegraphy, the combination with a main-line conductor carrying alternating electric currents, transmitting apparatus located at different stations upon said line and each acting to suppress a definite number of the impulses of the line-current to represent a signal, a continuously-operating sunflower and trailer device forming a part of the transmitting apparatus at each station, means for driving the same in synchronism with the generator of the current which it operates upon, receiving apparatus located at the several stations and operated by the main-line current, means for rendering said apparatus neutral to the signals transmitted from its home station and operative for the signal from a distant station, and means for preserving the electrical properties of the line, substantially as described.

11. In a system of telegraphy, a duplex line, generators delivering periodically-varying electric currents to said line, transmitters for suppressing a definite number of said impulses to represent a character, a line whose electrical properties are known introduced into the main line when the said impulses are suppressed, and means for receiving the message, substantially as described.

12. In a system of telegraphy, a duplex line, generators delivering periodically-varying electric currents to said line, transmitters for suppressing a definite number of said impulses to represent a character, a line whose resistance and self-induction are known introduced into the circuit of the main line at times of the suppression of the impulses thereof, and means for receiving the signals, substantially as described.

13. In a system of telegraphy, a balanced duplex line, in combination with the following elements located at the desired stations upon said line, a generator delivering impulses of an electric current to the main line, a transmitter and means for operating the same, a receiving-relay located in the main line, and a local receiving-circuit relayed from said main line by said relay, and receiving apparatus operated by said circuit, substantially as described.

14. In a system of telegraphy, a duplex line, in combination with the following elements located at the desired stations upon said line, a generator delivering electric impulses to the said line, a transmitter and means for operating the same, a receiving-relay located in the main line and neutral to the signals produced by its home transmitter but operated by signals from a distant point, a local receiving-circuit and a local synchronizing-circuit both relayed from the main line by said relay, a source of direct-current supply for the said local circuits, and receiving apparatus for recording the signals, substantially as described.

15. In a system of telegraphy, a duplex line, in combination with the following elements located at the desired stations on said line; an alternating-current generator delivering its current to said line, a transmitter and means for operating the same, a receiving-relay located in the main line, and a local receiving-circuit relayed from said main line by said relay, and receiving apparatus operated by said circuit, substantially as described.

16. In a system of telegraphy, a duplex line, in combination with the following elements located at the desired stations on said line; an alternating-current generator delivering its current to said line, a transmitter and means for operating the same, a receiving-relay located in the main line and neutral to the signals produced by its home transmitter but operated by signals from a distant point, a local receiving-circuit and a local synchonizing-circuit both relayed from the main line by said relay, a source of direct-current supply for the said local circuits, and receiving apparatus for recording the signals, substantially as described.

17. A duplex electric-telegraph line in which one or more of the impulses of the current generated by a particular generator are suppressed by changing the line-circuit from said generator to a line having substantially the same electrical properties as said generator and its local circuit, substantially as described.

18. In a system of multiplex telegraphy, a duplex line upon which is impressed an electric current, a series of local transmitting and receiving instruments, and means for allowing each of said instruments the use of the main line at rapidly-recurring periods of time, substantially as described.

19. In a system of multiplex telegraphy, a duplex line upon which is impressed alternating electric currents, a series of local transmitting and receiving instruments located at desired stations upon the said line, and means for allowing each of the said instruments the use of the main line at rapidly-recurring periods of time, substantially as described.

20. In a system of multiplex telegraphy, a duplex line upon which is impressed impulses of electric currents, a series of local transmitting and receiving instruments located at desired stations upon the said line, and continuously-operating means for allowing each of the said instruments the use of the main line at rapidly-recurring periods of time, substantially as described.

21. In a system of multiplex telegraphy, a duplex line upon which is impressed impulses of electric currents, a series of local transmitting and receiving instruments located at the desired stations upon said line, continuously-operated means located at each of the said stations for allowing each of the said instruments the use of the main line for rapidly-recurring periods of time, and means for operating the receiving apparatus at any station in synchronism with its corresponding transmitting apparatus at a distant station, substantially as described.

22. In a system of multiplex telegraphy, a duplex line having impulses of electric currents impressed upon it, a make-and-break contact located in the main line at the desired stations, a series of local transmitting instruments for operating said contact, and a series of receiving instruments, means for allowing each of the transmitting instruments at a station the use of said contact at rapidly-recurring periods of time, and means for allowing the corresponding receiving apparatus at any station the use of the main line at corresponding periods of time, substantially as described.

23. In a system of multiplex telegraphy, a duplex line upon which are impressed impulses of electric currents, a series of local transmitting and receiving instruments located at the desired stations upon the said line, continuously-operated means located at each of the said stations for allowing each of the said instruments the use of the main line for rapidly-recurring periods of time, and continuously-operated synchronizers for operating the receiving apparatus at any station in synchronism with its corresponding transmitting apparatus at a distant station, substantially as described.

24. In a system of telegraphy, a balanced main line connecting two stations, in combination with the following elements located at each of said stations: a generator delivering an electric current to the said main line, a transmitter located in the main line and adapted to suppress the impulses of the current therein, and a receiving-relay neutral to the home transmitter but operated by the transmitter at the distant station, substantially as described.

25. In a system of telegraphy, a balanced main line connecting two stations, in combination with the following elements located at each station: an alternating-current generator delivering its current to said main line, a transmitter having a make-and-break contact located in said main line and adapted to suppress a desired number of the impulses of the main-line current for a signal, a receiving-relay located in the main-line circuit neutral to the signals produced by its home transmitter but operated by those from a distant station and means for maintaining the electrical properties of the line the same whether the current is suppressed or not, substantially as described.

26. In a system of telegraphy, a balanced main line connecting two stations, in combination with the following elements located at each of the said stations: an electric generator delivering electric currents to said line, a transmitter having a make-and-break contact located in the main line, a receiver located in the main-line circuit neutral to signals produced by the home transmitter but operated by signals from a distant point, substantially as described.

27. In a system of telegraphy, a balanced main line connecting two stations, in combination with the following elements located at each of the said stations: an electric generator delivering electric currents to said line, a transmitter having a make-and-break contact located in the main line, a receiving-relay located in the main-line circuit neutral to signals produced by the home transmitter but operated by signals from a distant point, substantially as described.

28. In a system of telegraphy, a balanced main line connecting two stations, in combination with the following elements located at each station: a generator delivering electric currents to said main line, a transmitter having a make-and-break contact located in the main line, a line having substantially the same electrical properties as the generator and its local circuit connected from one side of the main line to the transmitter and introduced into the main line in the place of said generator and its local circuit when the said transmitter breaks its line contact, and a receiver neutral to the signals produced by its home transmitter but operated by those from a distant point, substantially as described.

29. In a system of telegraphy, a balanced main line connecting two stations, in combination with the following elements located at each station: a generator delivering electric currents to said main line, a transmitter having a make-and-break contact located in the main line, a line having substantially the same resistance and self-induction as the said generator and its local circuit connected from one side of said main line to the said transmitter, the said transmitter shunting the main-line current through said second line when the said transmitter breaks its line contact to said generator, and a receiving-relay located in the main line neutral to the signals produced by its home transmitter but operated by those received from a distant point, substantially as described.

30. In a system of telegraphy, a balanced main line connecting two stations, in combination with the following elements located at each station: a generator delivering an alternating electric current to said main line, a transmitter having a make-and-break contact located in the main line, a line having substantially the same resistance and self-induction as the said generator and its local circuit connected from one side of said main line to the said transmitter, the said transmitter shunting the main-line current through said second line when the said transmitter breaks its line contact to said generator, and a receiving-relay located in the main line neutral to the signals produced by its home transmitter but operated by those received from a distant point, substantially as described.

31. In a system of telegraphy, a main line connecting two stations, in combination with the following elements located at each station: a generator delivering electric currents to the main line, a transmitter having a make-and-break contact located in the main-line circuit, a line having substantially the same resistance and self-induction as that of the generator and its local circuit, said circuit being connected from one side of the main line to the transmitter and being substituted for said generator and its local circuit in the main line when the transmitter breaks its line contact, a receiving-relay having its coil traversed by the main-line circuit, and an artificial line traversing a coil on said relay whereby the relay is made neutral to the signals of the home transmitter and operated by those from a distant point, substantially as described.

32. In a system of telegraphy, a main line connecting two stations, in combination with the following elements located at each station: a generator delivering an alternating electric current to the main line, a transmitter having a make-and-break contact located in the main-line circuit, a line having substantially the same resistance and self-induction as that of the generator and its local circuit, said circuit being connected from one side of the main line to the transmitter and being substituted for said generator and its local circuit in the main line when the transmitter breaks its line-contact, a receiving-relay having its coil traversed by the main-line circuit, and an artificial line traversing a coil on said relay whereby the relay is made neutral to the signals of the home-transmitter and operated by those from a distant point, substantially as described.

33. The combination with a conductor carrying a periodically-varying electric current, a local circuit connected to a source of direct current, properly-adjusted resistances connected across said local circuit, electrical contacts located in said circuit, a synchronizer-circuit connected between said resistances and means for alternately connecting the said synchronizer-circuit with first one and then the other of said contacts in unison with the periodically-varying current, substantially as described.

34. The combination with a conductor carrying a periodically-varying electric current, a main local circuit connected to a source of direct current, electrical contacts located in said local circuit, a synchronizer-circuit connected through properly-adjusted resistances to said main local circuit, and means for alternately connecting and disconnecting the said synchronizer-circuit to and from said contacts in unison with the periodically-varying current, substantially as described.

35. The combination with a conductor carrying a periodically-varying electric current, a main local circuit connected to a source of direct current, electrical contacts located in said local circuit, a relay located in the main-line circuit and vibrating its tongue between said contacts, a synchronizing-circuit and properly-adjusted resistances through which said circuit is connected to the said main local circuit, substantially as described.

36. The combination with a conductor carrying an electric current, a main local circuit connected to an independent source of current, a vibrating contact-maker located in said local circuit and a synchronizer connected to said contact-maker and through properly-adjusted divided resistances with said local circuit, substantially as described.

37. The combination with a conductor carrying a periodically-varying electric current, a local circuit connected to a source of direct current, properly-adjusted resistances connected across said local circuit, contacts located in said local circuit, a relay having its tongue vibrated between said contacts by said periodically-varying current, a synchronizer electrically connected to said relay-tongue and to a point between said adjusted resistances, substantially as described.

38. The combination with a conductor carrying a periodically-varying electric current, a relay having its tongue vibrated by said current between contacts, a local circuit connected to a source of direct current and to said contacts, a synchronizer-circuit connected from said relay-tongue to said local circuit and comprising means whereby local periodically-varying electric impulses are caused to traverse said synchronizer-circuit, substantially as described.

39. The combination with a duplex telegraph-line carrying a periodically-varying electric current, a local circuit connected to a source of direct current, properly-adjusted resistances connected across said local circuit, electrical contacts located in said circuit, a synchronizer-circuit connected between said resistances, and means for alternately connecting the said synchronizer-circuit with first one and then the other of said contacts in unison with the periodically-varying current, substantially as described.

40. The combination with a duplex telegraph-line carrying a periodically-varying electric current, a main-line circuit connected to a source of direct current, electrical contacts located in said local circuit, a synchronizer-circuit connected through properly-adjusted resistances to said main local circuit, and means for alternately connecting and disconnecting the said synchronizer-circuit to and from said contacts in unison with the periodically-varying current, substantially as described.

41. The combination with a duplex telegraph-line carrying an electric current, a main local circuit connected to an independent source of current, a vibrating contact-maker located in said local circuit, and a synchronizer connected to said contact-maker and through properly-adjusted divided resistances to said local circuit, substantially as described.

42. The combination with a duplex telegraph-line carrying a periodically-varying electric current, a local circuit connected to a source of direct current, properly-adjusted resistances connected across said local circuit, contacts located in said local circuit, a relay having its tongue vibrated between said contacts by said periodically-varying current, a synchronizer electrically connected to said relay-tongue and to a point between said adjusted resistances, substantially as described.

43. The combination with a duplex telegraph-line carrying a periodically-varying electric current, a relay having its tongue vibrated by said current between contacts, a local circuit connected to a source of direct current and to said contacts, a synchronizer-circuit connected from said relay-tongue to said local circuit and comprising means whereby local periodically-varying electric impulses are caused to traverse said synchronizer-circuit, substantially as described.

44. A duplex telegraph-line in combination with a local receiving-circuit relayed from said duplex line, and a current-distributer located in said local circuit, substantially as described.

45. A duplex telegraph-line, in combination, at any station upon said line, with a local receiving-circuit relayed from the main line, a current-distributer located in said local circuit, and a plurality of receiving instruments located in the circuits of the current-distributer, substantially as described.

46. In a system of telegraphy, the combination with a duplex line, of the following elements located at any desired station upon said line: a local circuit relayed from the main line, a current-distributer located in said local circuit, a series of receiving-relays operated by the current-distributer, and a series of printers operated by said relays, substantially as described.

47. In a system of telegraphy, the combination with a duplex line, of the following elements located at desired stations upon said line: a local circuit relayed from the main line, a continuously-operating current-distributer located in the local circuit, receiving instruments located in the circuits of the current-distributer and a synchronizer regulating said current-distributer, substantially as described.

48. A duplex line carrying an alternating electric current, in combination with a local circuit relayed from the main line, and a receiving instrument operated by the relayed circuit, substantially as described.

49. A duplex line carrying an alternating electric current, in combination with a local circuit relayed from the main line, a current-distributer located in the local circuit, and receiving instruments controlled by said current-distributer, substantially as described.

50. A duplex telegraph-line in combination with the following elements located at desired points upon said line: a relay operated by the main line, a local circuit and a source of direct current supplying current thereto, said local circuit connected to the contacts of said relay, properly-adjusted resistances connected across said local circuit, a conductor connected between said resistances and to the tongue of said relay, substantially as described.

51. In a system of telegraphy, a duplex main line carrying periodically-varying electric currents, in combination with the following elements located at the desired stations on said line: a main local circuit carrying a direct current, a balanced relay located in said main line and having contacts connected in said local circuit, a shunt-circuit connected across the main local circuit, properly-adjusted resistances in said shunt-circuit, a circuit passing from said shunt-circuit at a point intermediate between said resistances to the tongue of said relay, substantially as described.

52. A duplex telegraph-line, in combination with a local circuit, and means including a condenser for periodically varying the current in said local circuit, substantially as described.

53. A duplex telegraph-line, in combination with a local circuit, and a source of direct current connected thereto, of means for varying the current periodically in a part of the local circuit, said means comprising a condenser and relay, substantially as described.

54. A duplex telegraph-line, in combination with a local circuit and a source of direct current connected thereto, of means for varying the current periodically in a part of the local circuit, said means comprising condensers and a relay, substantially as described.

55. A duplex telegraph-line carrying an alternating electric current, in combination with a local circuit and a source of direct current connected thereto, of means for varying the current periodically in a part of the local circuit, said means comprising a condenser and relay, substantially as described.

56. A duplex telegraph-line carrying an alternating electric current, in combination with a local circuit and a source of direct current connected thereto, of means for varying the current periodically in a part of the local circuit, said means comprising condensers and a relay, substantially as described.

57. A duplex telegraph-line carrying a periodically-varying electric current, a vibrating contact-maker operated by the said current, a local circuit connected to the contacts of said contact-maker, and a condenser connected to one side of said local circuit and to said contact-maker, substantially as described.

58. The combination with a synchronizer, of a condenser connected in circuit therewith, a relay, and a duplex telegraph-line traversing said relay whereby the said condenser is caused to discharge through the synchronizer, substantially as described.

59. The combination with a synchronizer, of a plurality of condensers connected in circuit with said synchronizer, a relay, and a duplex telegraph-line traversing said relay whereby said condensers are caused to discharge through said synchronizer, substantially as described.

60. The combination with a synchronizer, of a plurality of condensers connected in circuit with said synchronizer, a relay, and a duplex telegraph-line carrying an alternating electric current traversing said relay whereby said condensers are caused to discharge through said synchronizer, substantially as described.

61. A duplex telegraph-line carrying a periodically-varying electric current, a vibrating contact-maker operated by the said line, a local circuit having a direct electromotive force impressed upon it and connected to the contacts of said contact-maker, and a condenser connected to one side of said local circuit and to said contact-maker, substantially as described.

62. A duplex telegraph-line carrying a periodically-varying electric current, a relay operated by the said line, a local circuit having a direct electromotive force impressed upon it and connected to the contacts of said relay, condensers connected in shunt with said local circuit, and a conductor connected to the condenser-circuit intermediate between the condensers and connected to the tongue of said relay, substantially as described.

63. A duplex telegraph-line carrying an alternating electric current, a relay operated by the said line, a local circuit having a direct electromotive force impressed upon it and connected to the contacts of said relay, condensers connected in shunt with said local circuit, and a conductor connected to the condenser-circuit intermediate between the condensers and connected to the tongue of said relay, and a synchronizer operated by the current in said conductor, substantially as described.

64. A synchronizer and its operating-circuit, substantially as described, in combination with means for audibly indicating the accuracy of the synchronism of said synchronizer.

65. A synchronizer and its operating-circuit, substantially as described, in combination with a signaling device located in the said circuit for indicating the accuracy of the synchronism.

66. A synchronizer and its operating-circuit, substantially as described, in combination with a telephone-receiver, and means for connecting said receiver into the circuit of said synchronizer and disconnecting it therefrom.

67. The combination with a synchronizer, of a condenser connected in circuit therewith, a relay, a duplex telegraph-line traversing said relay whereby the said condenser is caused to discharge through the synchronizer, and a device for detecting the accuracy of the synchronism, located in the circuit with the synchronizer, substantially as described.

68. The combination with a synchronizer, of a plurality of condensers connected in circuit with said synchronizer, a relay, a duplex telegraph-line traversing said relay whereby said condensers are caused to discharge through said synchronizer, and means connected in the synchronizer-circuit for indicating the accuracy of the synchronism, substantially as described.

69. The combination with a synchronizer, of a plurality of condensers connected in circuit with said synchronizer, a relay, and a duplex telegraph-line carrying an alternating electric current traversing said relay whereby said condensers are caused to discharge through said synchronizer, and means located in the synchronizer-circuit for indicating the accuracy of the synchronism, substantially as described.

70. A duplex line carrying a periodically-varying electric current, a vibrating contact-maker operated by the said line, a local circuit having a direct electromotive force impressed upon it and connected to the contacts of said contact-maker, and a condenser connected to one side of said local circuit and to said contact-maker, substantially as described.

71. A duplex-telegraph line carrying a periodically-varying electric current, a relay operated by the said line, a local circuit having a direct electromotive force impressed upon it and connected to the contacts of said relay, condensers connected in shunt with said local circuit, a conductor connected to the condenser-circuit intermediate between the condensers and connected to the tongue of said relay, and a telephone-receiver connected to said conductor for indicating the accuracy of the synchronism, substantially as described.

72. A duplex-telegraph line, in combination at any station upon said line with a local relayed circuit and a synchronizer operated by said circuit, substantially as described.

73. A duplex-telegraph line carrying a periodically-varying electric current, in combination with a local circuit relayed from said main line, and a synchronizer operated by said local relayed circuit, substantially as described.

74. A duplex-telegraph line, in combination at any station upon said line with a local relayed circuit, a synchronizer regulated by the current in said relayed circuit and driven by an independent source of power, substantially as described.

75. A duplex-telegraph line, in combination at any station upon said line with a local relayed circuit, a synchronizer regulated by the current in said relayed circuit and driven by an independent source of power, and a current-distributer regulated by said synchronizer, substantially as described.

76. A duplex-telegraph line carrying an alternating electric current, in combination at any station upon said line with a local circuit relayed from the main line, a continuously-moving synchronizer regulated by the current in said local circuit and driven by an independent source of power, substantially as described.

77. The combination with a synchronizer regulated by an electric current and driven by an independent source of power, of a mercury damper for steadying the motion of said synchronizer, substantially as described.

78. The combination with a synchronizer regulated by a periodically-varying electric current and driven by an independent source of power, of a mercury damper acting to steady the motion of the synchronizer, substantially as described.

79. The combination with a synchronizer regulated by an alternating electric current and driven by an independent source of power, of a mercury damper acting to steady the motion of the synchronizer, substantially as described.

80. In a system of telegraphy, a current-distributing sunflower, a trailer operating therewith and means for automatically adjusting the angular position of said trailer relative to said sunflower, substantially as described.

81. In a system of telegraphy, a current-distributing sunflower, a trailer operating therewith, a shaft having a steady motion from which said trailer is driven, and means for automatically adjusting the angular position of said trailer, substantially as described.

82. In a system of telegraphy, a current-distributing sunflower, a trailer operating therewith, means for causing relative movements between the sunflower and trailer, a steady moving shaft for operating the moving member, and means for automatically adjusting the angular position of the trailer relative to a point upon the sunflower without interfering with the motion of the said shaft, substantially as described.

83. In a system of telegraphy, a current-distributing sunflower and trailer, a relay receiving signals from a distant point at predetermined intervals and means controlled by said relay for adjusting the angular position of the said trailer relative to the sunflower, substantially as described.

84. In a system of telegraphy, a current-distributer comprising a series of electric contacts, a trailer passing over said contacts, a driving-shaft, electromechanical means for connecting said trailer with said driving-shaft, a relay connected in circuit with one of the contacts of said sunflower and controlling the action of said electromechanical connecting means whereby the trailer is automatically adjusted, substantially as described.

85. In a system of telegraphy, the combination with a current-distributing sunflower, a trailer operating therewith, a shaft driving the trailer, gearing having a steady motion, a driving-shaft connected thereto, electromagnetically-operated means for connecting the trailer with said gearing and means for automatically operating the electromagnet whereby the trailer is adjusted to the proper angular position upon the sunflower, substantially as described.

86. In a system of telegraphy, the combination with an adjustably-mounted current-distributing sunflower, a trailer operating therewith, a shaft driving the trailer, gearing having a steady motion, a driven shaft connected thereto, a disk connected to said gearing and having a series of equidistant apertures therein, an electromagnet carried by said trailer, a plunger carried by said magnet and adapted to engage the apertures of said disk, and automatic means for operating the said magnet and causing it to adjust the angular position of the trailer when the same has become displaced, substantially as described.

87. In a system of telegraphy, a transmitting-sunflower and trailer and a receiving-sunflower and trailer, the two operating in synchronism, and the trailers of each making contact simultaneously with corresponding segments of the sunflowers, and self-acting means for restoring one of the trailers to its proper position when the same has become displaced, substantially as described.

88. In telegraph system, the combination with a main line and a periodically-varying electric current carried thereby, a transmitting-sunflower and trailer, and means operated thereby for suppressing one or more of the impulses of the line-current at regularly-recurring intervals, a receiving-sunflower and trailer, a receiving device operating therewith and operated by the suppression of the said impulses, and means controlled by said receiving device for automatically restoring the receiving-trailer to its proper position relative to the transmitting-trailer when the former has become displaced, substantially as described.

89. In a system of telegraphy, the combination with a transmitting-current-distributing sunflower and trailer, of a receiving-current-distributing sunflower and trailer operating in synchronism with the transmitting-sunflower and trailer, the trailers of both devices being adapted to make contact simultaneously with identical segments of their sunflowers, a magnetic device operative when the receiving-trailer is displaced relative to the transmitting-trailer and inoperative when the trailers occupy the proper angular positions, and means controlled by said device for automatically adjusting the receiving-trailer to the proper position, substantially as described.

90. The combination with a shaft having a steady motion, of a second shaft, an electric motor driving the second shaft, an electromagnetic brake carried by the said motor, means for varying the electrical condition of the armature, field and brake circuits of said motor as the speed between said shafts varies, substantially as described.

91. The combination with a shaft having a steady motion, of a second shaft, a printer driven by said second shaft, an electric motor driving the second shaft, an electromagnetic brake carried by the said motor, means for varying the electrical conditions of the armature, field and brake circuits of said motor as the speed between said shafts varies, substantially as described.

92. The combination with a shaft having a steady motion, of a second shaft, an electric motor driving said second shaft and provided with an electromagnetic brake, electrical contacts operated by one of said shafts and connected to the armature, field and electric brake circuits of the motor, a contact-maker operated by the other of said shafts and in engagement with the aforesaid contacts, whereby the electrical condition of the brake, armature and field circuits of the said motor are varied as the difference in speed between the two shafts varies, substantially as described.

93. The combination with a shaft having a steady motion, of a second shaft, an electric motor driving the said second shaft and provided with an electromagnetic brake, electrical contacts carried by the said shafts and adapted to vary the electric condition of the circuits controlling the field, armature and brake circuits of said motor whereby the speed of the said motor is regulated, substantially as described.

94. The combination with a shaft and synchronizing mechanism for steadying the motion of said shaft, an independently-driven shaft, printers driven by said shaft, an electric motor driving said shaft and having an electromagnetic damper, and means operated by said shafts for varying the electrical condition of the armature, field and brake circuits of said motor as the speed of the two shafts varies, substantially as described.

95. The combination with a shaft having a steady motion, two insulated contact-segments carried by said shaft, an independently-driven shaft, a contact-maker carried by said shaft and adapted to engage said segments, an electric motor driving the second shaft, an electromagnetic damper or brake comprising a metallic disk driven by said motor in a magnetic field, the armature field and brake circuits of said motor connected to said segments, the said circuits having their electrical condition varied as the speed between the said shafts varies, substantially as described.

96. In a system of telegraphy, the combination with a main-line conductor, of a generator delivering to said conductor a periodically-varying electric current, stations located along the main line, and transmitters at the several stations located in the main-line circuit and adapted to vary the electrical properties thereof, a local sunflower and trailer for each transmitter comprising groups of transmitter-segments, and key-locking segments corresponding to the groups of transmitter-segments but displaced angularly relative thereto, segment-circuits connecting the groups of transmitter-segments with the transmitter-coil, a separate keyboard for each group of said transmitter-segments and located in the segment-circuits thereof, a key-locking mechanism carried by each keyboard and controlled by the key-locking segments of said sunflower, a local source of direct current located at each station and connected in the sunflower and trailer circuits, and telegraphic receivers located at each station, substantially as described.

97. In a transmitting-keyboard, a series of electrical contacts, a series of keys and means operated by said keys for making and breaking the electrical connection with said contacts, an auxiliary contact-maker, and counting mechanism operated through the medium of said auxiliary contact-maker upon the operation of the transmitting-keys, substantially as described.

98. In a transmitting-keyboard, a series of electrical contacts, a series of keys and a series of conducting-bows operated by said keys to make and break electrical connection with said contacts, an auxiliary contact-maker operated by said bows, an electrically-actuated counting mechanism operated by said auxiliary contact-maker and acting to indicate the number and position of the signals transmitted, substantially as described.

99. In a transmitting-keyboard, a series of electrical contacts, a series of keys and a series of conducting-bows operated by said keys to make and break electrical connection with said contacts, an auxiliary contact-maker operated by said bows, an electrically-actuated counting mechanism operated by said auxiliary contact-maker and acting to indicate the number and position of the signals transmitted, a signal actuated by the counting mechanism indicating the transmission of a predetermined number of signals, substantially as described.

100. In a transmitting-keyboard, a series of electrical contacts, a series of keys and means operated by said keys for making and breaking electrical connection with said contacts, means for locking the keys for predetermined lengths of time both before and after operation, comprising a series of lugs, a clapper-bar, a plunger carrying said clapper-bar and an iron-clad magnet-coil operating said plunger, substantially as described.

101. In a transmitting-keyboard, a series of electrical contacts, a series of keys and means operated by said keys for making and breaking electrical connection with said contacts, means for locking the keys for predetermined lengths of time both before and after operation, said means comprising a series of lugs, a clapper-bar adapted to engage said lugs, a plunger carrying said clapper-bar, an exciting-coil surrounding said plunger, a stationary iron shell inclosing the said coil and extending over the end thereof, a stationary iron core connected to said shell and extending into the coil, and springs normally pressing the clapper-bar outward from the magnet, substantially as described.

102. In a transmitting-keyboard, a suitable frame, a series of key-levers pivoted thereon, each of said key-levers having key-tips upon one end and lugs upon the other, a series of pivoted bows located above the lugs on said key-levers, a series of electrical contacts having their electrical connection with said bows made and broken by the operation of said key-levers, means for locking the keys for a predetermined length of time both before and after operation, said means comprising a series of lugs located upon said bows, a clapper-locking bar adapted to engage said lugs, a plunger carrying said clapper-locking bar, an iron-clad electromagnet actuating said plunger and means for adjustably securing said magnet to the keyboard-frame, substantially as described.

103. In a transmitting-keyboard, a suitable frame, a series of key-levers pivoted upon said frame, said key-levers having key-tips upon one end and lugs upon the other, a series of pivoted bows located above the lugs of said key-levers, the lugs of each key-lever engaging a different combination of said bows, a series of electrical contacts having their electrical connection with said bows made and broken in combinations by operating said key-levers, an auxiliary contact-maker comprising a pivoted lever extending across said bows and a contact-piece with which said pivoted lever makes contact upon the operation of the keys, a counter operated by said contact-maker, and means for locking the keys for a predetermined length of time, both before and after their operation, substantially as described.

104. In a transmitting-keyboard, the combination with the keys thereof, of a counting mechanism comprising a cylinder mounted to rotate on its longitudinal axis, means for indicating the rectilinear travel of a point from each portion of a revolution of the cylinder, a clutch carried by said cylinder and means operating through said clutch for rotating said cylinder a predetermined amount upon the operation of each of said keys, a striker operated by one of said keys for separating the clutch member, and means for rotating the cylinder back to its initial position, substantially as described.

105. In a transmitting-keyboard, the counting mechanism, comprising a revoluble cylinder having a spiral line upon its surface, a stationary strip extending longitudinally of said cylinder for reading the positions of the spiral line, means for rotating the said cylinder a certain distance upon the operation of the keys, and means for rotating the cylinder back to its initial position after it has been rotated to a desired extent, substantially as described.

106. In a transmitting-keyboard, the combination with the keys thereof, of a counting mechanism comprising a cylinder mounted to rotate on its longitudinal axis and having a spiral line upon its surface, a strip extending longitudinally of said cylinder for reading the positions of a point upon the said spiral line, a clutch, means acting through said clutch for rotating the said cylinder to a certain extent upon the operation of said keys, and means for disengaging the clutch members and allowing the cylinder to rotate backward to its initial position, substantially as described.

107. In a transmitting-keyboard, the combination with the keys thereof, of a counting mechanism comprising a cylinder mounted to rotate on its longitudinal axis, means for indicating the rectilinear travel of a point for each portion of a revolution of the cylinder, a ratchet-and-pawl mechanism for rotating the cylinder, an electromagnet operating said mechanism, means for energizing said magnet at each time that a key is operated whereby said cylinder is rotated to a predetermined extent, and means for rotating the cylinder back to its initial position, substantially as described.

108. In a transmitting-keyboard, the combination with the keys thereof, of a counting mechanism comprising a cylinder mounted to rotate on its longitudinal axis, means for indicating the rectilinear travel of a point for each portion of a revolution of the cylinder, a ratchet-and-pawl mechanism for rotating said cylinder, a plunger operating said ratchet-and-pawl mechanism, a magnet-coil surrounding said plunger, an iron shell inclosing said coil, means for energizing said magnet-coil at each time that a key is operated whereby said cylinder is rotated to a predetermined extent, and means for rotating the cylinder back to its initial position, substantially as described.

109. In a transmitting-keyboard, the combination with the keys thereof, of a counting mechanism, comprising a cylinder mounted to rotate upon its longitudinal axis, means for indicating the rectilinear travel of a point for each portion of a revolution of said cylinder, a clutch through which said cylinder is rotated, a spring holding the members of said clutch together and adapted to be wound up by the forward rotation of said cylinder, means acting through said clutch for rotating the said cylinder a predetermined amount upon the operation of said keys, a striker having an arm engaged by one of said keys whereby the clutch members are separated and the cylinder is rotated backward by said spring to its initial position, substantially as described.

110. In a transmitting-keyboard, the counting mechanism, comprising a revoluble cylinder having a spiral line upon its surface, a stationary strip extending longitudinally of said cylinder for reading the positions of the spiral line, means for rotating the said cylinder a certain distance upon the operation of the keys, and means for rotating the cylinder back to its initial position after it has been rotated to a desired extent, and a signal-bell adapted to sound when the cylinder has rotated to a predetermined extent, substantially as described.

111. In a transmitting-keyboard, the combination with the keys thereof, of a counting mechanism comprising a cylinder mounted to rotate on its longitudinal axis and having a spiral line upon its surface, a strip extending longitudinally of said cylinder for reading the positions of a point upon the said spiral line, a clutch, means acting through said clutch for rotating the said cylinder to a certain extent upon the operation of the keys, means for disengaging the clutch members and allowing the cylinder to rotate backward to its initial position, and a signal-bell adapted to sound when the said cylinder has reached a predetermined point in its rotation, substantially as described.

112. In a transmitting-keyboard, the combination with the keys thereof, of a counting mechanism comprising a cylinder mounted to rotate on its longitudinal axis, means for indicating the rectilinear travel of a point for each portion of a revolution of the cylinder, a ratchet-and-pawl mechanism for rotating said cylinder, an electromagnet operating said mechanism, means for energizing said magnet at each time that a key is operated whereby said cylinder is rotated to a predetermined extent, and means for rotating the cylinder back to its initial position, and a signal-bell adapted to sound when the cylinder has reached a predetermined point in its rotation, substantially as described.

113. In a transmitting-keyboard, a key-lever bow comprising a metal U-shaped bow having one of its side members prolonged, a lug having a lip and located upon the portion connecting the side members, and a depending hooked lug, substantially as described.

114. In a transmitting-keyboard, a key-lever comprising a strip of metal or other suitable material having at one end a finger-tip bearing a representation of the character transmitted by said key, and the other end of the said lever being cut away to leave a plurality of lugs, substantially as described.

115. In a transmitting-keyboard, the auxiliary contact-maker comprising a metal strip, two arms with one end of each secured to said strip, a sleeve secured to the other ends of said arms, and an insulated contact-arm secured to said sleeve between said arms, substantially as described.

116. In a printing-machine, the combination with a horizontal shaft, a sleeve adapted to slide longitudinally on said shaft, and to rotate therewith, a paper-feed roller mounted on said sleeve, and means for imparting rotary motion to said shaft and sleeve whereby the said roller is caused to rotate, substantially as described.

117. In a printing-machine, the combination with a horizontal shaft, a sleeve adapted to slide longitudinally on said shaft, and to rotate therewith, a paper-feed roller mounted on said sleeve, and an electromagnetic device for imparting rotary motion to said shaft whereby the paper-feed roller is caused to rotate, substantially as described.

118. In a printing-machine, the combination with a horizontal shaft, a sleeve adapted to slide longitudinally on said shaft, and to rotate therewith, a paper-feed roller mounted on said sleeve, a ratchet secured to said shaft, a pawl engaging said ratchet, an electromagnet operating said pawl for imparting rotary motion to said shaft, substantially as described.

119. In a printing-machine, the combination with a shaft and a paper-feed roller carried thereby, of means for imparting rotary motion to said shaft and roller, comprising a ratchet and a pawl, a rocking arm carrying said pawl, a plunger secured to said arm, a magnet-coil surrounding said plunger, and an iron shell inclosing said magnet-coil, substantially as described.

120. In a printing-machine, the combination with a shaft and paper-feed roller carried thereby, of means for imparting a rotary motion to said shaft and roller, comprising a ratchet and pawl, a rocking arm carrying said pawl, a second pawl engaging said ratchet to prevent backward movement thereof, a plunger having a flanged head and secured to said rocking arm, a non-magnetic tube into which said plunger passes, a magnet-coil wound upon said tube, an iron shell inclosing said coil and extending over the ends thereof, a stationary iron core extending into said tube and secured to said shell and a split metal collar holding said shell, and secured to the frame of the machine, substantially as described.

121. In a printing-machine, a paper-feed roller, and means for imparting rotary motion thereto, comprising a shaft, ratchet-and-pawl mechanism for actuating said shaft, an iron-clad electromagnet and plunger for operating said ratchet-and-pawl mechanism, comprising a magnet-coil, a non-magnetic tube upon which said coil is wound, an iron shell surrounding said coil, an iron core extending into the said tube, and provided with a longitudinal tapered cavity in its end within said tube, and secured at its other end to said iron shell, a plunger having a flanged head and tapered within said tube to conform to the contour of the said cavity, a stem formed on said plunger and extending through said core, a thumb-nut on said stem for limiting the travel of the plunger, and a copper collar around the upper end of said shell and adapted to inclose the said flanged head of the plunger, substantially as described.

122. In a printing-machine, the combination with a horizontal shaft, a sleeve adapted to slide upon said shaft, paper-supporting carriages suspended from said sleeve, means for imparting rotary motion to said roller-shaft, and means for imparting lateral motion to said carriage, substantially as described.

123. In a printing-machine, the combination with a horizontal shaft, a sleeve adapted to slide on said shaft, a paper-supporting carriage, suspended from said sleeve, means for imparting rotary motion to said shaft and electromagnetically-operated mechanism for imparting lateral motion to said carriage, substantially as described.

124. In a printing-machine, the combination with a horizontal shaft, of a sleeve adapted to slide on said shaft, a paper-supporting carriage suspended from said sleeve, electromagnetically-operated spacing mechanism for imparting a lateral step-by-step motion to said carriages, and a releasing mechanism for returning the carriage to the initial position, substantially as described.

125. In a printing-machine, the combination with a horizontal shaft, of a sleeve mounted to slide longitudinally on said shaft and rotate therewith, a paper-feed roller mounted fast on said sleeve, means for imparting rotary motion to said roller, electromagnetically-operated spacing mechanism for imparting a lateral step-by-step motion to said carriage, and a releasing mechanism for returning the carriage to its initial position, substantially as described.

126. In a printing-machine, the combination with a rotatable shaft, of a paper-supporting carriage suspended from said shaft and adapted to slide longitudinally thereon a wheel located approximately at each end of the carriage travel, flexible connecting means secured to said carriage and passing around said wheels, means for imparting rotary step-by-step motion to one of said wheels in one direction to move the carriage forward, and release and return mechanism for returning the carriage to its initial position, substantially as described.

127. A printing-machine having a horizontal movable paper-feed carriage, with means for imparting forward and backward motion to said carriage, said means comprising a rotating wheel, flexible connection between said wheel and said carriage, ratchet-and-pawl mechanism for imparting a forward step-by-step rotary motion to said wheel, a magnet-plunger operatively connected to said ratchet-and-pawl mechanism, a magnet-coil surrounding said plunger and an iron shell inclosing said coil, and means for releasing the carriage and causing it to move in an opposite direction, substantially as described.

128. In a printing-machine, the combination with a paper-supporting carriage, of means for imparting horizontal forward and backward motion to said carriages, said means comprising a wheel, flexible connections between said wheel and said carriage, a shaft carrying said wheel, a ratchet mounted on said shaft, a pawl operating said ratchet, a rocking arm carrying said pawl, a magnet-plunger connected to said arm, a tube into which said plunger passes, a magnet-coil wound upon said tube, an iron shell inclosing said coil, a stationary iron core extending into said tube and secured to said wheel, and means for securing said shell fast to the frame of the machine, and means for releasing and returning the carriage in an opposite direction, substantially as described.

129. In a printing-machine, the combination with a paper-supporting carriage, of means for imparting horizontal motion to said carriage, said means comprising a wheel, flexible connection between said wheel and said carriage, a shaft carrying said wheel, ratchet-and-pawl mechanism for rotating said shaft, an iron-clad electromagnet and plunger operatively connected to said ratchet-and-pawl mechanism, comprising a magnet-coil, a magnetic metal tube upon which said coil is wound, an iron shell surrounding said coil, an iron core extending into said tube, said core provided with a longitudinal tapered cavity in its end extending into said tube and secured at its other end to said shell, a plunger having a flanged head and tapered within said tube to conform to the contour of the cavity of the said core, a stem formed on said core and extending through said core, and a thumb-nut on said stem for limiting the throw of said plunger, substantially as described.

130. In a printing-machine, the carriage release and return mechanism, comprising a rotatable wheel, operative connection between said wheel and carriage, a clutch adapted to engage said wheel for rotating it forward, an electromagnet and an armature operatively connected to said clutch whereby the said clutch may be thrown into or out of engagement with said wheel, and means for rotating the said wheel backward when the clutch is out of engagement, substantially as described.

131. In a printing-machine, the carriage release and return mechanism, comprising a rotatable wheel with operative connection between said wheel and carriage, a clutch adapted to engage said wheel for rotating it forward, an electromagnet having a plunger-core connected to said clutch, said magnet being adapted to draw in said core and disengage said clutch from said wheel, and means for rotating the said wheel backward when the clutch is thus disengaged, substantially as described.

132. In a printing-machine, the carriage release and return mechanism, comprising a wheel with operative connection between said carriage and wheel, a shaft upon which said wheel rotates, a clutch mounted on said shaft, a magnet-plunger mounted on said shaft and secured to said clutch, an iron magnet-core mounted on said shaft, a magnet-coil into which said plunger and core extend, an iron shell surrounding said coil and secured to said core, means for rotating said shaft in one direction and means for rotating said wheel in the opposite direction when released by the clutch, substantially as described.

133. In a printing-machine, the carriage release and return mechanism, comprising a wheel with operative connection between said wheel and carriage, a shaft upon which said wheel is adapted to rotate, a coil-sping secured to the wheel for rotating in one direction, means for rotating said shaft, and means consisting of an electromagnet-clutch for transmitting the rotary motion of said shaft to said wheel and disconnecting the one from the other, substantially as described.

134. In a printing-machine, the carriage release and return mechanism comprising a wheel with operative connection between said carriage and wheel, a shaft upon which said wheel is rotatably mounted, a coil-spring secured to said wheel and to the frame of the machine, an annular row of teeth upon one face of said wheel, means for rotating said shaft, and an electromagnetically-operated clutch adapted to engage said teeth, substantially as described.

135. In a printing-machine, the combination with a horizontal shaft, of a paper-carriage mounted to slide longitudinally on said shaft, a depending guide-frame carried by said carriage, paper-guides carried by said guide-frame and located beneath said carriage, a type-wheel rotating in proximity to the paper, and means for printing the characters of the type-wheel on the said paper, substantially as described.

136. In a printing-machine, the combination with a horizonal shaft and means for rotating the same, a sleeve adapted to slide longitudinally on said shaft and to rotate therewith, a paper-feed roller mounted fast on said sleeve, a paper-supporting carriage suspended from said sleeve, a depending paper-guide frame carried by said carriage, paper-guides carried by said frame and located beneath the said carriage, a type-wheel rotating in proximity to the paper and means for printing the characters of the type-wheel on the said paper, substantially as described.

137. In a printing-machine, the combination with a paper-supporting carriage, a horizontal shaft and means for rotating the same, means for suspending said carriage from said shaft and allowing the carriage to travel longitudinally thereon, a paper-feeding device carried by said carriage and engaging the paper at a point approximaetly midway between its sides, substantially as described.

138. In a printing-machine, the combination with a paper-supporting carriage, a horizontal shaft and means for rotating the same, means for suspending said carriage from said shaft and allowing the carriage to travel longitudinally thereon, a paper-feeding device carried by said carriage and engaging the paper at a point approximately midway between its sides, a depending guide-frame carried by said carriage, and paper-guides carried by said frame below the carriage and engaging the edges of the said paper, substantially as described.

139. A printer-carriage, comprising a horizontal bar, uprights secured to said bar near its ends, a rod extending longitudinally of said carriage and secured to the upper ends of said uprights, a roller carried by said rod, a rotatable sleeve, a roller carried upon said sleeve, and bearings in which said sleeve is journaled, said bearings being carried by said carriage, substantially as described.

140. A printer-carriage, comprising a horizontal bar, uprights secured to said bar near its ends, a rod extending longitudinally of said carriage and secured to the upper ends of said uprights, a roller carried by said rod, a rotatable sleeve, a roller mounted in said sleeve and adapted to engage the aforesaid roller, uprights in which the ends of said sleeve are journaled, said uprights secured to said carriage-bar between the end uprights, and paper-guides secured to said bar, substantially as described.

141. In a printer, the combination with a horizontal shaft, of a paper-supporting carriage suspended from said shaft and adapted to slide longitudinally thereon, means carried by said carriage for engaging the paper at a point approximately midway between its sides, a depending guide-frame also carried by said carriage, paper-guides carried by said frame below said carriage and engaging the edges of said paper, a rotating type-wheel located in proximity to said paper, and an electrically-operated platen adapted to print the characters of said type-wheel on said paper, substantially as described.

142. In a printer, the combination with a horizontal shaft and means for rotating the same, of a paper-supporting carriage mounted on said shaft and adapted to travel longitudinally on said shaft, means for imparting the longitudinal travel to said carriage, a rotating type-wheel located in close proximity to the paper carried by said carriage, and an electrically-operated platen adapted to print the characters of said type-wheel on said paper, substantially as described.

143. A printing-machine provided with the blank-paper-feed mechanism comprising means for automatically feeding the paper up upon which the matter is printed until a fresh blank sheet is in position to be printed upon, substantially as described.

144. A printing-machine provided with the blank-paper-feed mechanism comprising electrically-operated means for automatically feeding the paper up upon which the matter is printed until a fresh blank sheet is in position to be printed upon, substantially as described.

145. In a printing-machine having a paper-supporting carriage and paper carried thereby, said paper being perforated at intervals, electrically-operated paper-feed mechanism, an electric circuit controlling the action of said paper-feed mechanism, electrical contacts located in said circuit, said circuit having its electrical condition changed by the paper and contacts, whereby the said mechanism may be put in continuous motion and automatically stopped when a fresh blank sheet has come into position to be printed upon, substantially as described.

146. In a printing-machine having a paper-supporting carriage and paper carried thereby, said paper being perforated at intervals, electrical contacts between which said paper passes, paper-feeding mechanism, means for putting said mechanism into continuous operation until said contacts are brought into engagement by means of said perforations when a blank sheet will be placed in position to be printed upon, substantially as described.

147. In a printing-machine, the combination with a paper-supporting carriage, of electrically-operated spacing mechanism, electrically-operated lining mechanism, electrically-operated release and return mechanism whereby the carriage is caused to travel backward, and the blank-paper-feed mechanism by which a fresh sheet of paper is automatically placed in position to receive the printing, substantially as described.

148. In a printing-machine, the combination with a paper-supporting carriage, of a lining mechanism whereby the paper is fed up from line to line, and means for automatically setting said lining mechanism in motion and automatically stopping the same when a fresh blank sheet of paper has come into the operating position, substantially as described.

149. In a printing-machine in which the paper to be operated upon is provided with perforations located at intervals with respect to the length of the paper, an electric circuit, contacts in said circuit normally separated by said paper, an electrically-operated paper-feed mechanism controlled by said circuit and means for setting said mechanism in operation when the said contacts are thus separated and automatically stopping said mechanism when said contacts meet through a perforation, substantially as described.

150. In a printer having the printing, paper-feed, blank-paper-feed, and paper release and return mechanisms, substantially as described, in combination with a circuit-combining and a current-distributing device adapted to combine a plurality of local circuits for each combination of signals received and to distribute the current to the electromagnetic parts of the printer during each cycle of operations accompanying the printing of a character, and a plurality of selecting-relays connected to said circuit-combining device and closing-circuits therethrough in combinations for each signal received.

151. In a telegraphic printer, the combination with a type-wheel and an electromagnetically-operated platen, of the electromagnetically-operated paper-feed, spacing and release mechanisms, a circuit-combining device consisting of a plurality of sets of conducting segments having contact-makers which pass over said segments, a source of electric current connected to the electromagnets of said printing, spacing, paper-feed, and release mechanisms, a plurality of electromagnetic devices each having one contact connected in the circuit with the printing, spacing, paper-feed, and return magnets respectively, one magnet-coil of each of said magnetic devices being connected to a set of segments of the said circuit-combining device, the flow of the current which actuates the magnets of the said printing, paper-feed, spacing, and release mechanisms being governed by prearranged combinations of segments passing simultaneously in contact with said contact-makers, and means for automatically continuing the operation of the paper-feed mechanism, and automatically stopping the same when a fresh sheet of paper has come into position to be printed upon, substantially as described.

152. In a telegraphic printer having the electromagnetically-operated printing, paper-feed, spacing, and release mechanisms, substantially as described, in combination with a circuit-combining device, consisting of a plurality of sets of conducting-segments arranged in combinations and having contact-makers passing over said segments; a source of electric current connected to the electromagnets of the said printing, paper-feed, spacing and release mechanisms, the flow of the said current to the said mechanisms being governed by prearranged combinations of said segments passing simultaneously in contact with said contact-makers, and means for automatically continuing the operation of the paper-feed mechanism, and automatically stopping the same when a fresh sheet of paper has come into position to be printed upon, substantially as described.

153. In a telegraphic printer, the combination with a plurality of selecting-relays, of a circuit-combining device consisting of a plurality of groups of conducting-segments, the said selecting-relays each having one contact connected to a corresponding set of segments of the said combining device, contact-makers passing over and in contact with said segments, the said relays closing the circuits from one group of segments to another in combinations for each signal received, and printing, paper-feed, spacing and release mechanisms operated at such times as the several contact-makers rest simultaneously on the segments of the combining devices which have their circuits completed by said relays, and means for automatically continuing the operation of the paper-feed mechanism, and automatically stopping the same when a fresh sheet of paper has come into position to be printed upon, substantially as described.

154. In a printing-machine, the combination with a paper-supporting carriage, of the electrically-operated spacing, lining, blank-paper-feed and carriage-return mechanisms, an electrical contact operated by said spacing mechanism and completing the electric circuit through said return mechanism when the carriage has traveled forward to a predetermined point and completing a circuit to the spacing mechanism when the said carriage has reached a predetermined point in its travel backward, substantially as described.

155. In a printing-machine, the combination with a paper-supporting carriage, of spacing mechanism for imparting a forward lateral movement to the said carriage, a lining mechanism whereby the paper is fed from line to line, blank-paper-feed mechanism for automatically feeding new sheets of paper into position, a release and return mechanism whereby the carriage is returned to its initial position, and means operated by said spacing mechanism for automatically operating the return mechanism when the carriage has reached the end of its forward travel, and means for automatically operating the spacing mechanism when the carriage has reached the end of its travel backward, substantially as described.

In testimony whereof I affix my signature in presence of two witnesses.

HENRY A. ROWLAND.

Witnesses:
PERCY C. BOWEN,
FRANK D. BLACKISTONE.